United States Patent
Fullerton et al.

(10) Patent No.: US 8,514,046 B1
(45) Date of Patent: Aug. 20, 2013

(54) METHOD FOR DETACHMENT OF TWO OBJECTS

(71) Applicant: Correlated Magnetics Research, LLC., New Hope, AL (US)

(72) Inventors: Larry W. Fullerton, New Hope, AL (US); Mark D. Roberts, Huntsville, AL (US); Ryan Fechner, Madison, AL (US); Kelly Loum, Athens, AL (US)

(73) Assignee: Correlated Magnetics Research, LLC., New Hope, AL (US)

( * ) Notice: Subject to any disclaimer, the term of this patent is extended or adjusted under 35 U.S.C. 154(b) by 0 days.

(21) Appl. No.: 13/629,879

(22) Filed: Sep. 28, 2012

Related U.S. Application Data

(63) Continuation of application No. 13/426,909, filed on Mar. 22, 2012, now Pat. No. 8,279,032.

(51) Int. Cl.
*H01H 7/02* (2006.01)
(52) U.S. Cl.
USPC .......................................... 335/306; 335/285
(58) Field of Classification Search
USPC ......... 335/285, 296, 306, 205–207; 310/90.5
See application file for complete search history.

(56) References Cited

U.S. PATENT DOCUMENTS

| | | | |
|---|---|---|---|
| 381,968 A | 5/1888 | Tesla | |
| 493,858 A | 3/1893 | Edison | |
| 996,933 A | 7/1911 | Lindquist | |
| 1,236,234 A | 8/1917 | Troje | |
| 2,389,298 A | 11/1945 | Ellis | |
| 2,438,231 A | 3/1948 | Shultz | |
| 2,471,634 A | 5/1949 | Vennice | |
| 2,570,625 A | 10/1951 | Zimmerman et al. | |
| 2,722,617 A | 11/1955 | Cluwen et al. | |
| 3,102,314 A | 9/1963 | Alderfer | |
| 3,208,296 A | 9/1965 | Baermann | |
| 3,238,399 A | 3/1966 | Johanees et al. | |
| 3,288,511 A | 11/1966 | Tavano | |
| 3,408,104 A | 10/1968 | Raynes | |

(Continued)

FOREIGN PATENT DOCUMENTS

| DE | 2938782 A1 | 4/1981 |
|---|---|---|
| EP | 0 345 554 A1 | 12/1989 |

(Continued)

OTHER PUBLICATIONS

Series BNS, Compatible Series AES Safety Controllers, http://www.schmersalusa.com/safety_controllers/drawings/aes.pdf, pp. 159-175, date unknown.

(Continued)

*Primary Examiner* — Ramon Barrera
(74) *Attorney, Agent, or Firm* — William J. Tucker

(57) ABSTRACT

A method is described herein for detachment of two objects. The method comprising the steps of: (a) associating a bias field source with a first magnetic structure associated with a first object, the first magnetic structure comprising one or more magnetic field sources, the first magnetic structure being magnetically attached to a second magnetic structure associated with a second object, the second magnetic structure comprising one or more magnetic field sources; and (b) using the bias field source to produce a repel force large enough to cause detachment of the first magnetic structure from the second magnetic structure thereby causing detachment of the first object from the second object.

18 Claims, 59 Drawing Sheets

(56) References Cited

U.S. PATENT DOCUMENTS

| | | | |
|---|---|---|---|
| 2,932,545 A | 4/1969 | Foley | |
| 3,468,576 A | 9/1969 | Beyer et al. | |
| 3,474,366 A | 10/1969 | Barney | |
| 3,684,992 A | 8/1972 | Huguet et al. | |
| 3,696,258 A | 10/1972 | Anderson et al. | |
| 3,790,197 A | 2/1974 | Parker | |
| 3,791,309 A | 2/1974 | Baermann | |
| 3,802,034 A | 4/1974 | Bookless | |
| 3,845,430 A | 10/1974 | Petkewicz et al. | |
| 3,893,059 A | 7/1975 | Nowak | |
| 4,079,558 A | 3/1978 | Gorham | |
| 4,129,846 A | 12/1978 | Yablochnikov | |
| 4,222,489 A | 9/1980 | Hutter | |
| 4,416,127 A | 11/1983 | Gomez-Olea Naveda | |
| 4,453,294 A | 6/1984 | Morita | |
| 4,535,278 A | 8/1985 | Asakawa | |
| 4,547,756 A | 10/1985 | Miller et al. | |
| 4,629,131 A | 12/1986 | Podell | |
| 4,849,749 A | 7/1989 | Fukamachi et al. | |
| 4,912,727 A | 3/1990 | Schubert | |
| 4,941,236 A | 7/1990 | Sherman et al. | |
| 5,020,625 A | 6/1991 | Yamauchi et al. | |
| 5,050,276 A | 9/1991 | Pemberton | |
| 5,302,929 A * | 4/1994 | Kovacs | 335/229 |
| 5,345,207 A | 9/1994 | Gebele | |
| 5,367,891 A | 11/1994 | Furuyama | |
| 5,383,049 A | 1/1995 | Carr | |
| 5,440,997 A | 8/1995 | Crowley | |
| 5,461,386 A | 10/1995 | Knebelkamp | |
| 5,492,572 A | 2/1996 | Schroeder et al. | |
| 5,495,221 A | 2/1996 | Post | |
| 5,512,732 A | 4/1996 | Yagnik et al. | |
| 5,570,084 A | 10/1996 | Ritter et al. | |
| 5,604,960 A | 2/1997 | Good | |
| 5,631,093 A | 5/1997 | Perry et al. | |
| 5,631,618 A | 5/1997 | Trumper et al. | |
| 5,637,972 A | 6/1997 | Randall et al. | |
| 5,852,393 A | 12/1998 | Reznik et al. | |
| 5,956,778 A | 9/1999 | Godoy | |
| 5,983,406 A | 11/1999 | Meyerrose | |
| 6,072,251 A | 6/2000 | Markle | |
| 6,115,849 A | 9/2000 | Meyerrose | |
| 6,118,271 A | 9/2000 | Ely et al. | |
| 6,170,131 B1 | 1/2001 | Shin | |
| 6,205,012 B1 | 3/2001 | Lear | |
| 6,275,778 B1 | 8/2001 | Shimada et al. | |
| 6,285,097 B1 | 9/2001 | Hazelton et al. | |
| 6,387,096 B1 | 5/2002 | Hyde, Jr. | |
| 6,414,577 B1 * | 7/2002 | Hoffman | 335/229 |
| 6,457,179 B1 | 10/2002 | Prendergast | |
| 6,467,326 B1 | 10/2002 | Garrigus | |
| 6,607,304 B1 | 8/2003 | Lake et al. | |
| 6,653,919 B2 | 11/2003 | Shih-Chung et al. | |
| 6,720,698 B2 | 4/2004 | Galbraith | |
| 6,842,332 B1 | 1/2005 | Rubenson et al. | |
| 6,847,134 B2 | 1/2005 | Frissen et al. | |
| 6,850,139 B1 | 2/2005 | Dettmann et al. | |
| 6,862,748 B2 | 3/2005 | Prendergast | |
| 6,927,657 B1 | 8/2005 | Wu | |
| 6,971,147 B2 | 12/2005 | Halstead | |
| 7,016,492 B2 | 3/2006 | Pan et al. | |
| 7,031,160 B2 | 4/2006 | Tillotson | |
| 7,065,860 B2 | 6/2006 | Aoki et al. | |
| 7,066,778 B2 | 6/2006 | Kretzschmar | |
| 7,362,018 B1 | 4/2008 | Kulogo et al. | |
| 7,444,683 B2 | 11/2008 | Prendergast et al. | |
| 7,583,500 B2 | 9/2009 | Ligtenberg et al. | |
| 7,775,567 B2 | 8/2010 | Ligtenberg et al. | |
| 7,808,349 B2 | 10/2010 | Fullerton et al. | |
| 7,812,697 B2 | 10/2010 | Fullerton et al. | |
| 7,839,246 B2 | 11/2010 | Fullerton et al. | |
| 7,868,721 B2 | 1/2011 | Fullerton et al. | |
| 2004/0003487 A1 | 1/2004 | Reiter | |
| 2004/0155748 A1 | 8/2004 | Steingroever | |
| 2004/0244636 A1 | 12/2004 | Meadow et al. | |
| 2004/0251759 A1 | 12/2004 | Hirzel | |
| 2005/0102802 A1 | 5/2005 | Sitbon et al. | |
| 2005/0231046 A1 | 10/2005 | Aoshima | |
| 2006/0066428 A1 | 3/2006 | McCarthy et al. | |
| 2006/0189259 A1 | 8/2006 | Park et al. | |
| 2006/0214756 A1 | 9/2006 | Elliott et al. | |
| 2006/0290451 A1 | 12/2006 | Prendergast et al. | |
| 2007/0075594 A1 | 4/2007 | Sadler | |
| 2007/0138806 A1 | 6/2007 | Ligtenberg et al. | |
| 2008/0139261 A1 | 6/2008 | Cho et al. | |
| 2008/0181804 A1 | 7/2008 | Tanigawa et al. | |
| 2008/0186683 A1 | 8/2008 | Ligtenberg et al. | |
| 2008/0272868 A1 | 11/2008 | Prendergast et al. | |
| 2008/0282517 A1 | 11/2008 | Claro | |
| 2009/0021333 A1 | 1/2009 | Fiedler | |
| 2010/0033280 A1 | 2/2010 | Bird et al. | |
| 2011/0210636 A1 | 9/2011 | Kuhlmann-Wilsdorf | |

FOREIGN PATENT DOCUMENTS

| | | |
|---|---|---|
| EP | 0 545 737 A1 | 6/1993 |
| FR | 823395 | 1/1938 |
| GB | 1 495 677 A | 12/1977 |
| JP | 60-091011 U | 5/1985 |
| WO | WO-02/31945 A2 | 4/2002 |
| WO | WO-2007/081830 A2 | 7/2007 |
| WO | WO-2009/124030 A1 | 10/2009 |

OTHER PUBLICATIONS

BNS 33 Range, Magnetic safety sensors, Rectangular design, http://www.farnell.com/datasheets/36449.pdf, 3 pages, date unknown.

Series BNS-B20, Coded-Magnet Sensor Safety Door Handle, http://www.schmersalusa.com/catalog_pdfs/BNS_B20.pdf, 2 pages, date unknown.

Series BNS333, Coded-Magnet Sensors with Integral Safety Control Module, http://www.schmersalusa.com/machine_guarding/coded_magnet/drawings/bns333.pdf, 2 pages, date unknown.

Wikipedia, "Barker Code", Web article, last modified Aug. 2, 2008, 2 pages.

Wikipedia, "Kasami Code", Web article, last modified Jun. 11, 2008, 1 page.

Wikipedia, "Linear feedback shift register", Web article, last modified Nov. 11, 2008, 6 pages.

Wikipedia, "Golomb Ruler", Web article, last modified Nov. 4, 2008, 3 pages.

Wikipedia, "Costas Array", Web article, last modified Oct. 7, 2008, 4 pages.

Wikipedia, "Walsh Code", Web article, last modified Sep. 17, 2008, 2 pages.

Wikipedia, "Gold Code", Web article, last modified Jul. 27, 2008, 1 page.

Wikipedia, "Bitter Electromagnet", Web article, last modified Aug. 2011, 1 page.

Pill-soo Kim, "A future cost trends of magnetizer systems in Korea", Industrial Electronics, Control, and Instrumentation, 1996, vol. 2, Aug. 5, 1996, pp. 991-996.

United States Office Action, dated Aug. 26, 2011, issued in counterpart U.S. Appl. No. 12/206,270.

United States Office Action, dated Mar. 12, 2012, issued in counterpart U.S. Appl. No. 12/206,270.

United States Office Action, dated Feb. 22, 2011, issued in counterpart U.S. Appl. No. 12/476,952.

United States Office Action, dated Oct. 12, 2011, issued in counterpart U.S. Appl. No. 12/476,952.

United States Office Action, dated Mar. 9, 2012, issued in counterpart U.S. Appl. No. 13/371,280.

International Search Report and Written Opinion, dated May 14, 2009, issued in related International Application No. PCT/US2009/038925.

International Search Report and Written Opinion, dated Jul. 13, 2010, issued in related International Application No. PCT/US2010/021612.

International Search Report and Written Opinion dated Jun. 1, 2009, issued in related International Application No. PCT/US2009/002027.

International Search Report and Written Opinion, dated Aug. 18, 2010, issued in related International Application No. PCT/US2010/036443.

International Search Report and Written Opinion, dated Apr. 8, 2011 issued in related International Application No. PCT/US2010/049410.

* cited by examiner

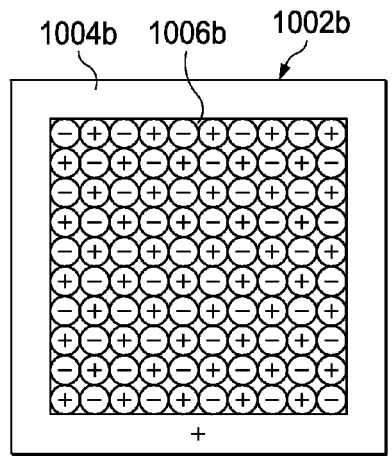
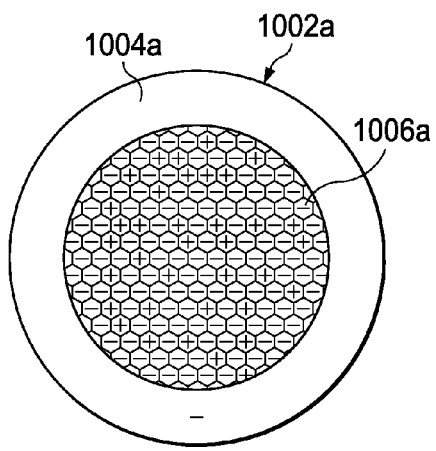
FIG. 13B  FIG. 13C
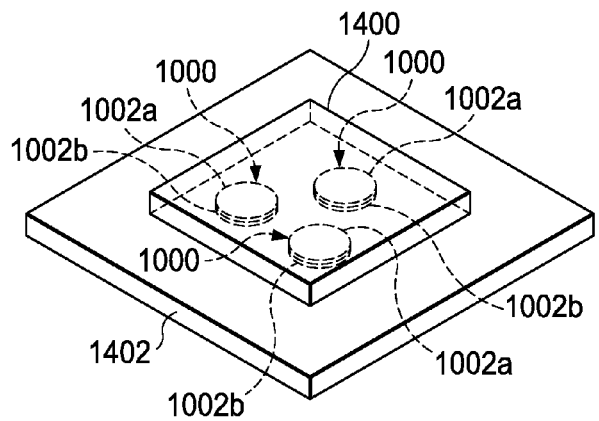
FIG. 14A
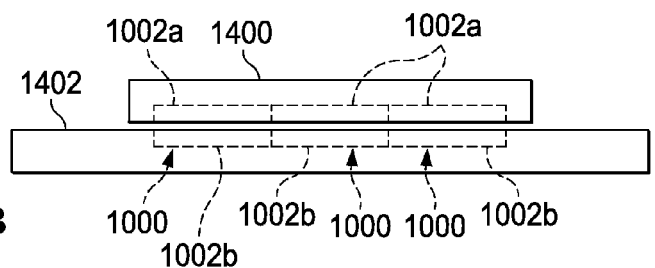
FIG. 14B

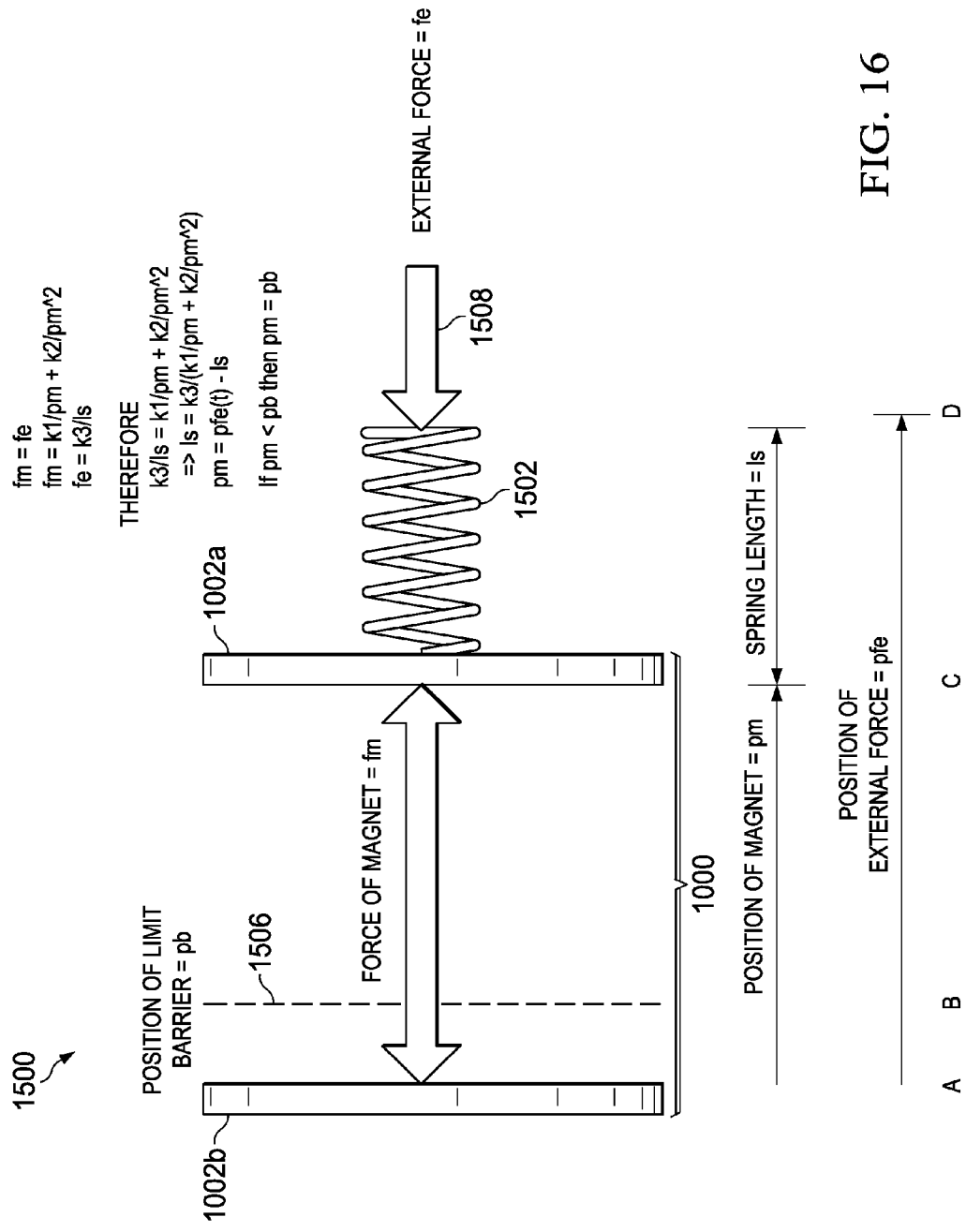

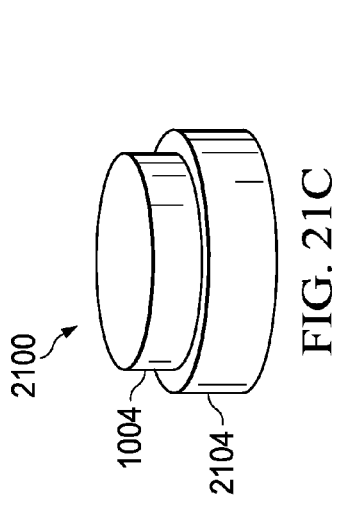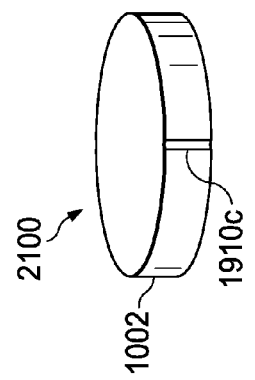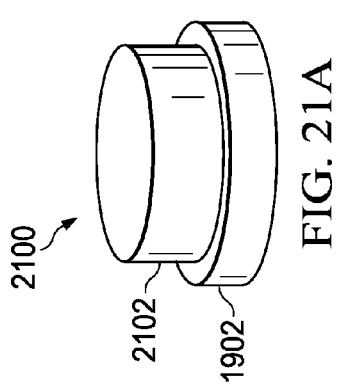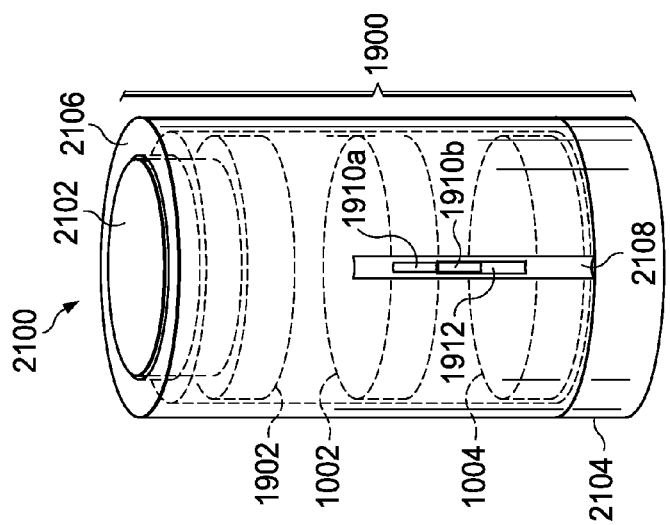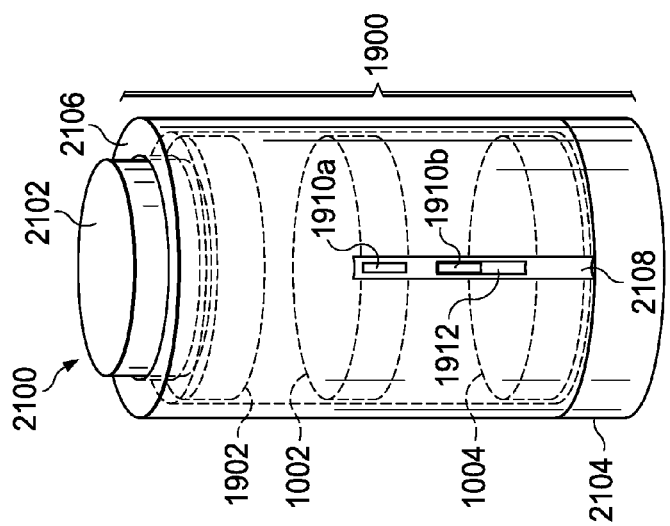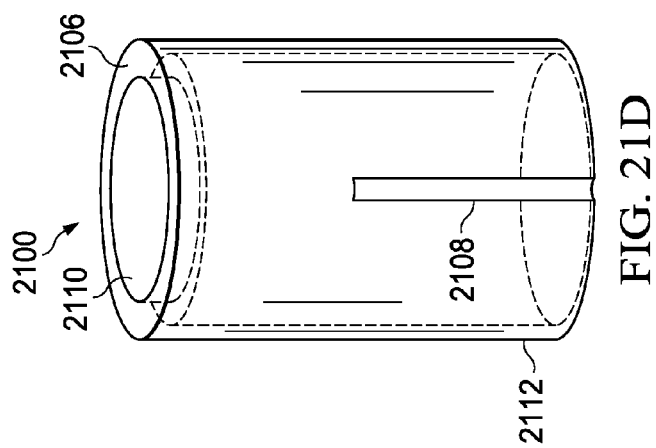

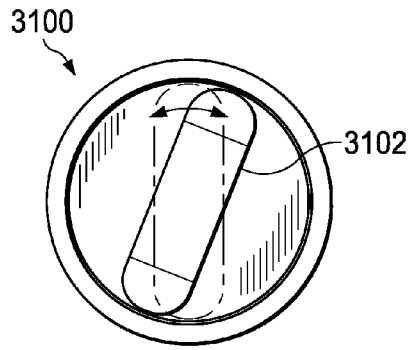
FIG. 31E
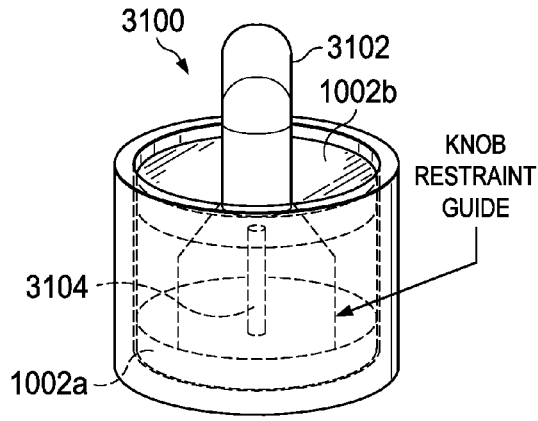
FIG. 31F
FIG. 31G    FIG. 31H
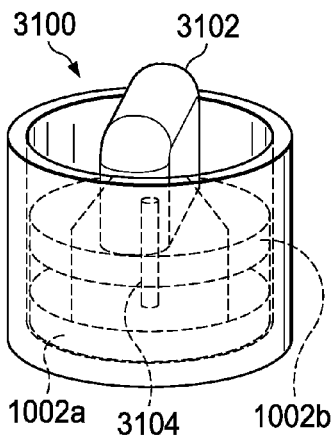 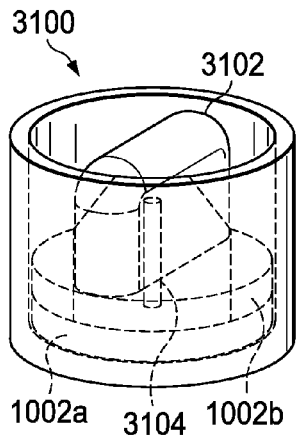 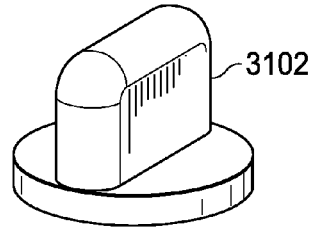
FIG. 31I
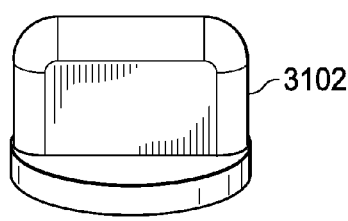
FIG. 31J
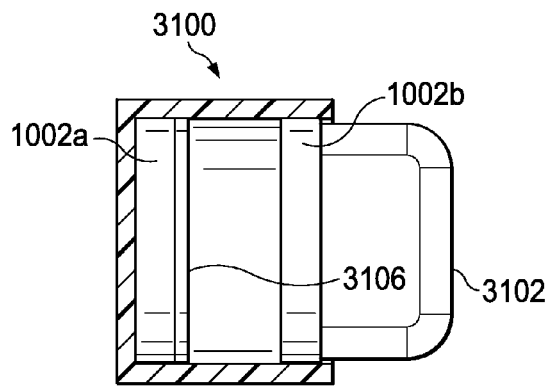
FIG. 31K

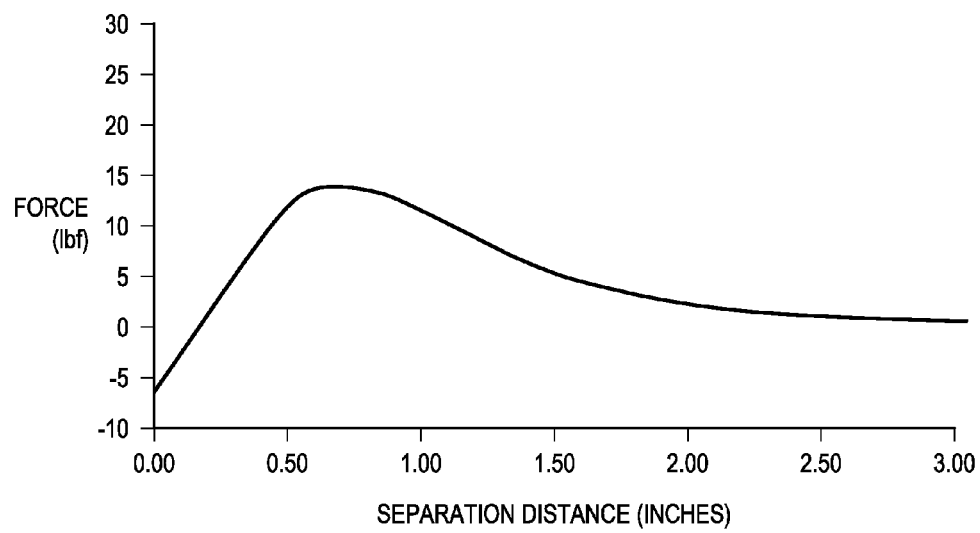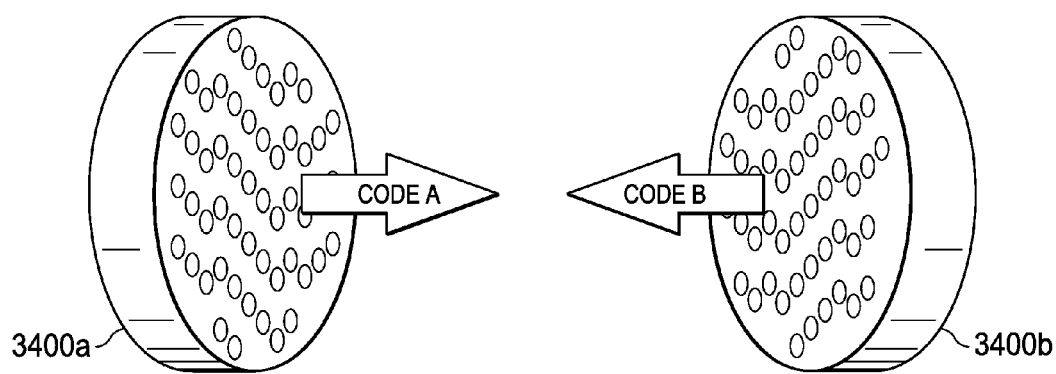
FIG. 34

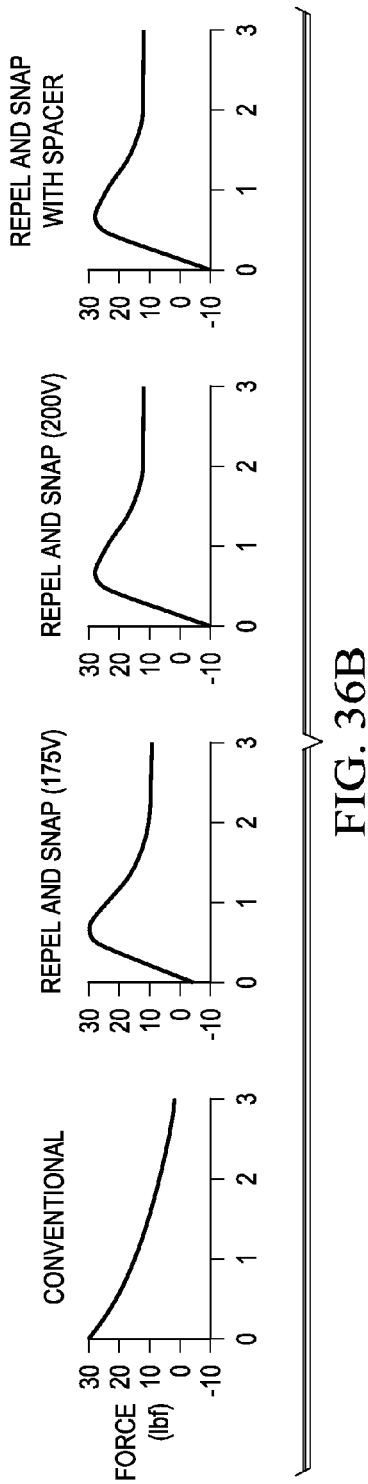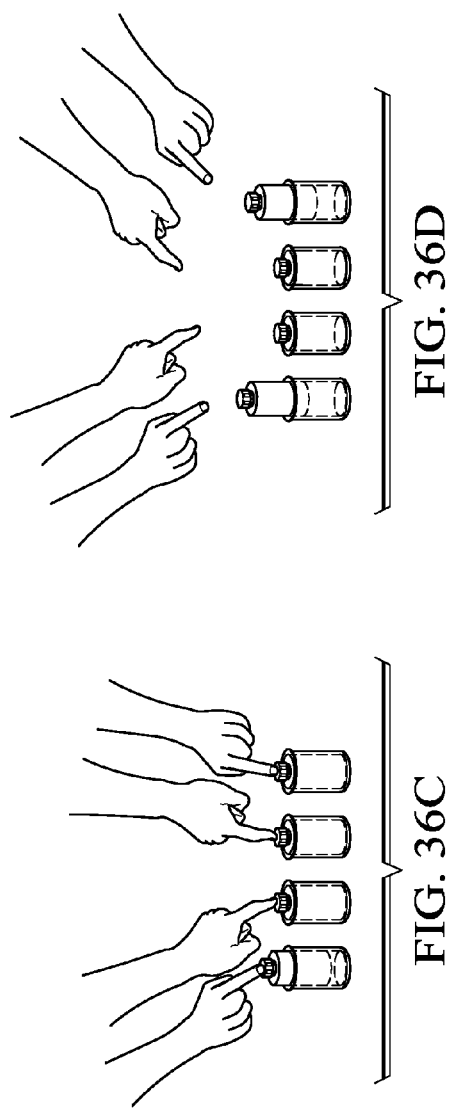

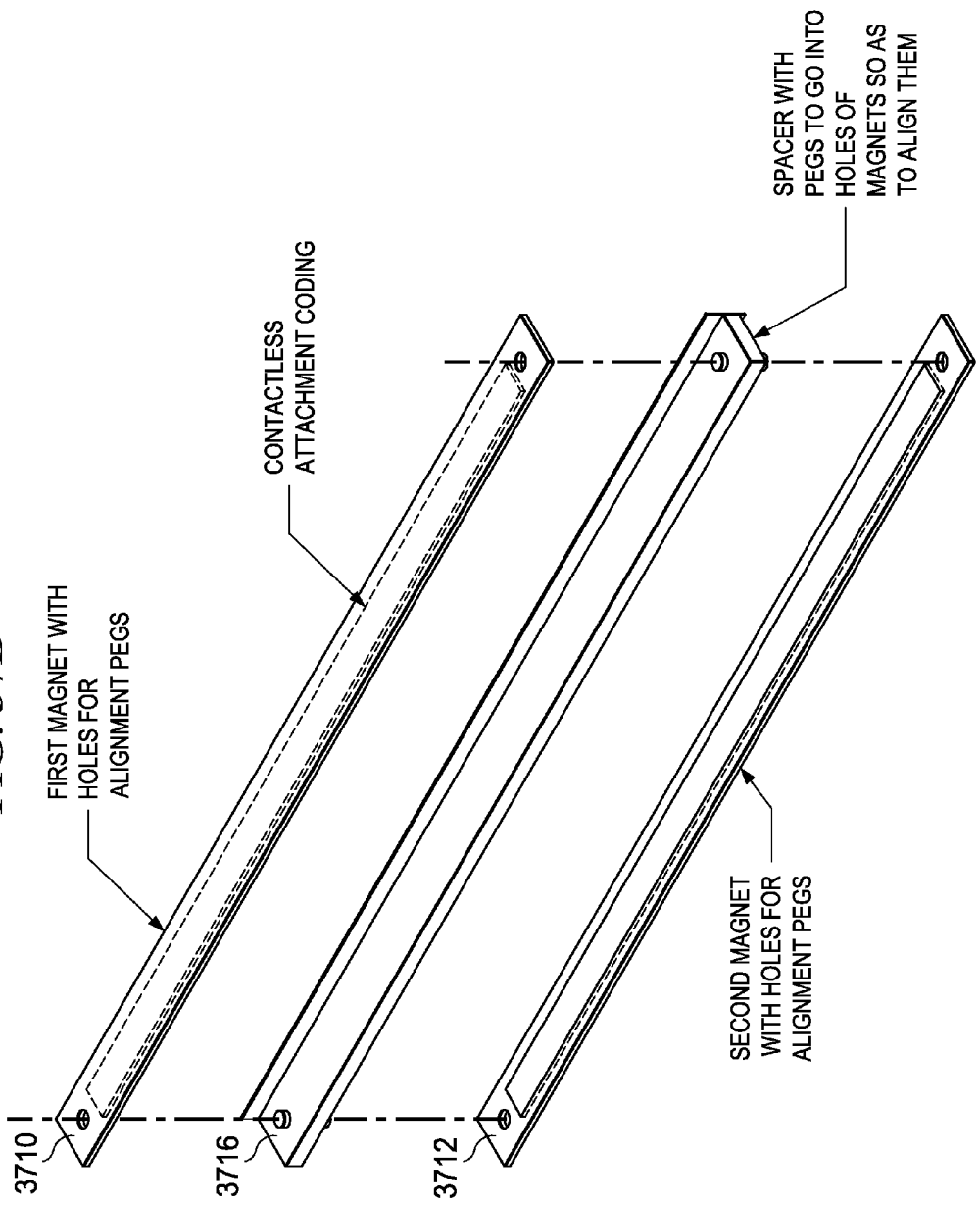

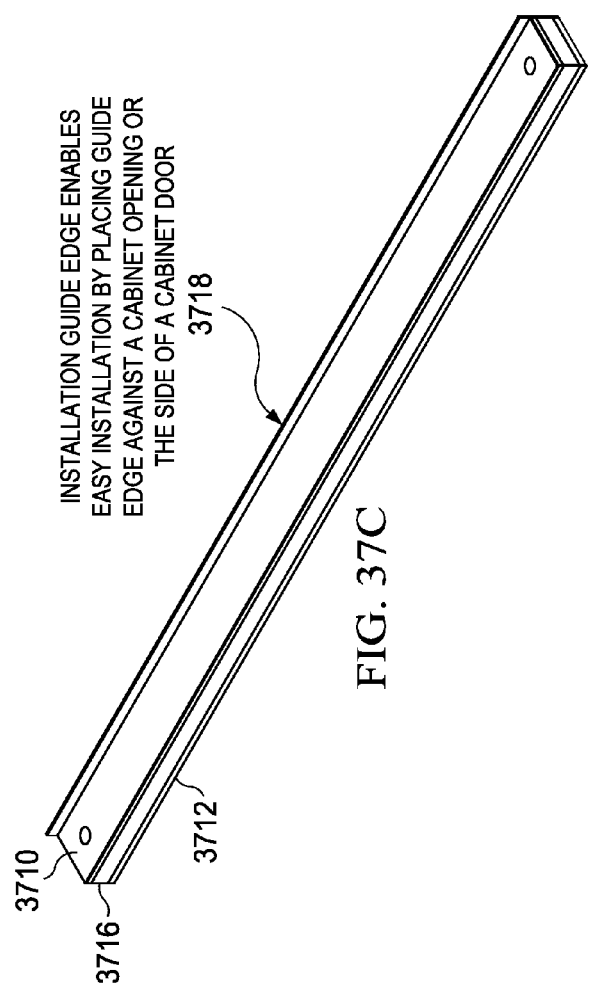

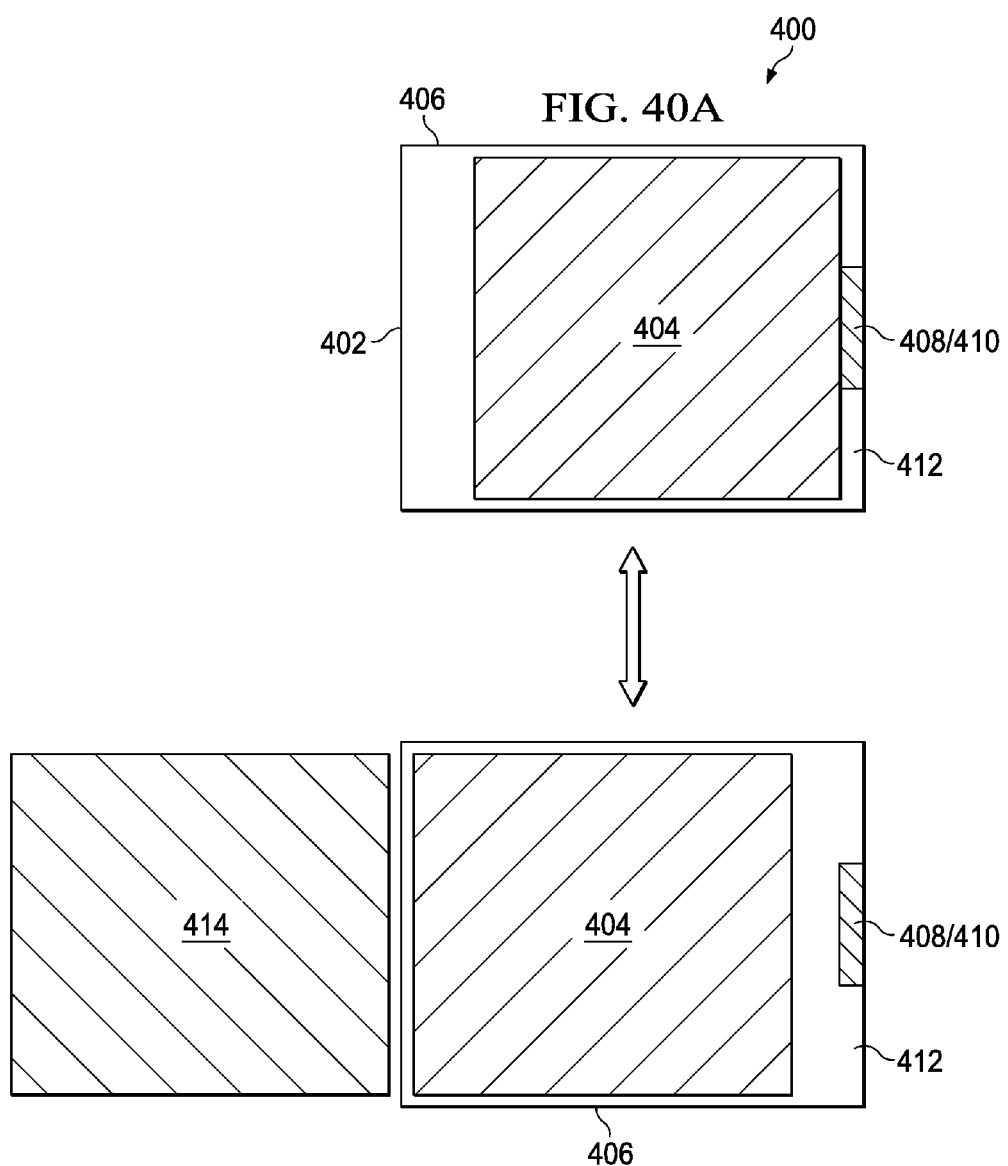

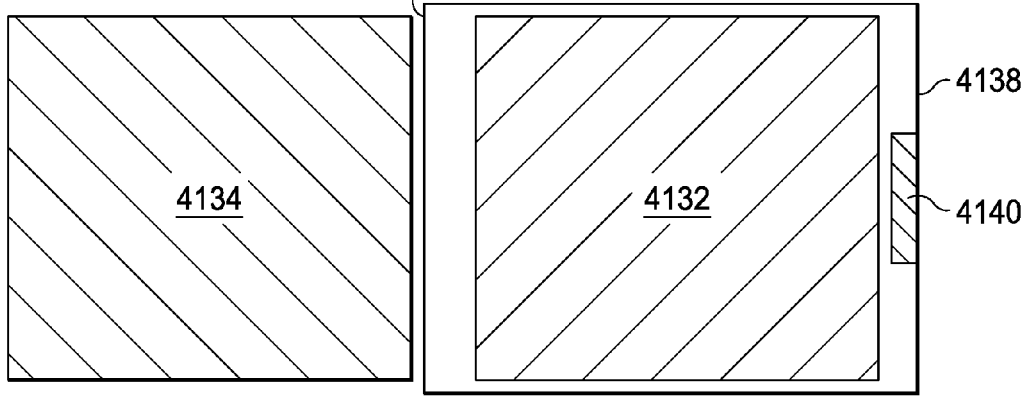
FIG. 41D

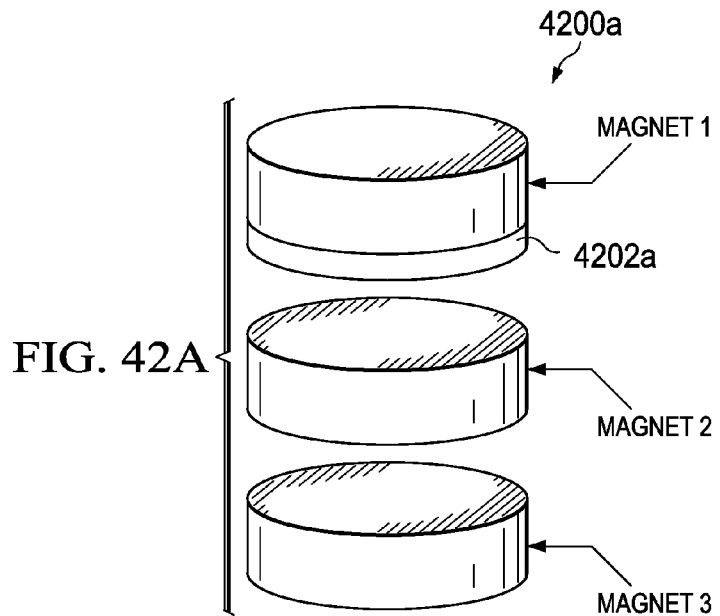
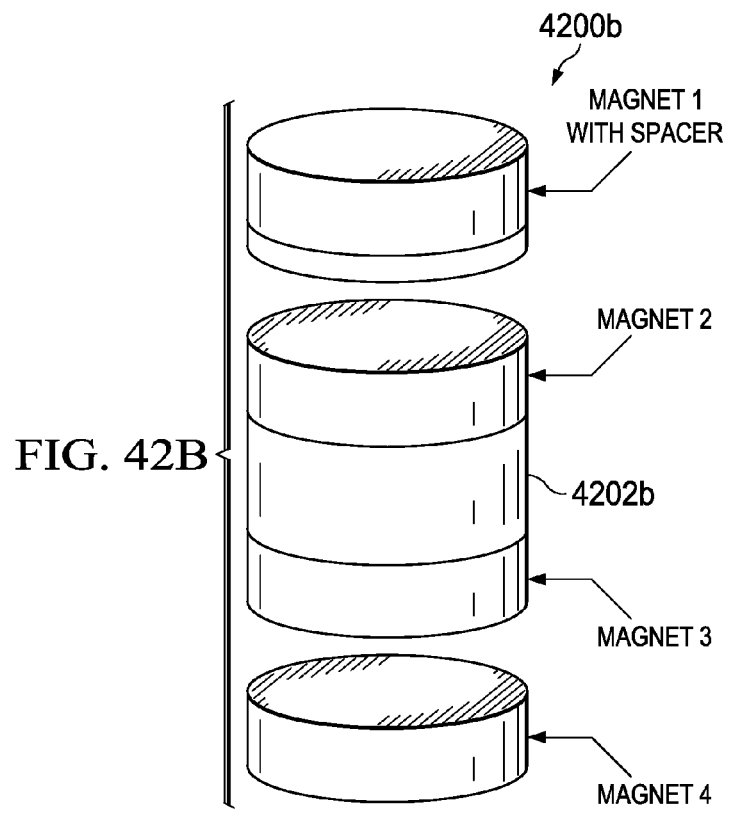

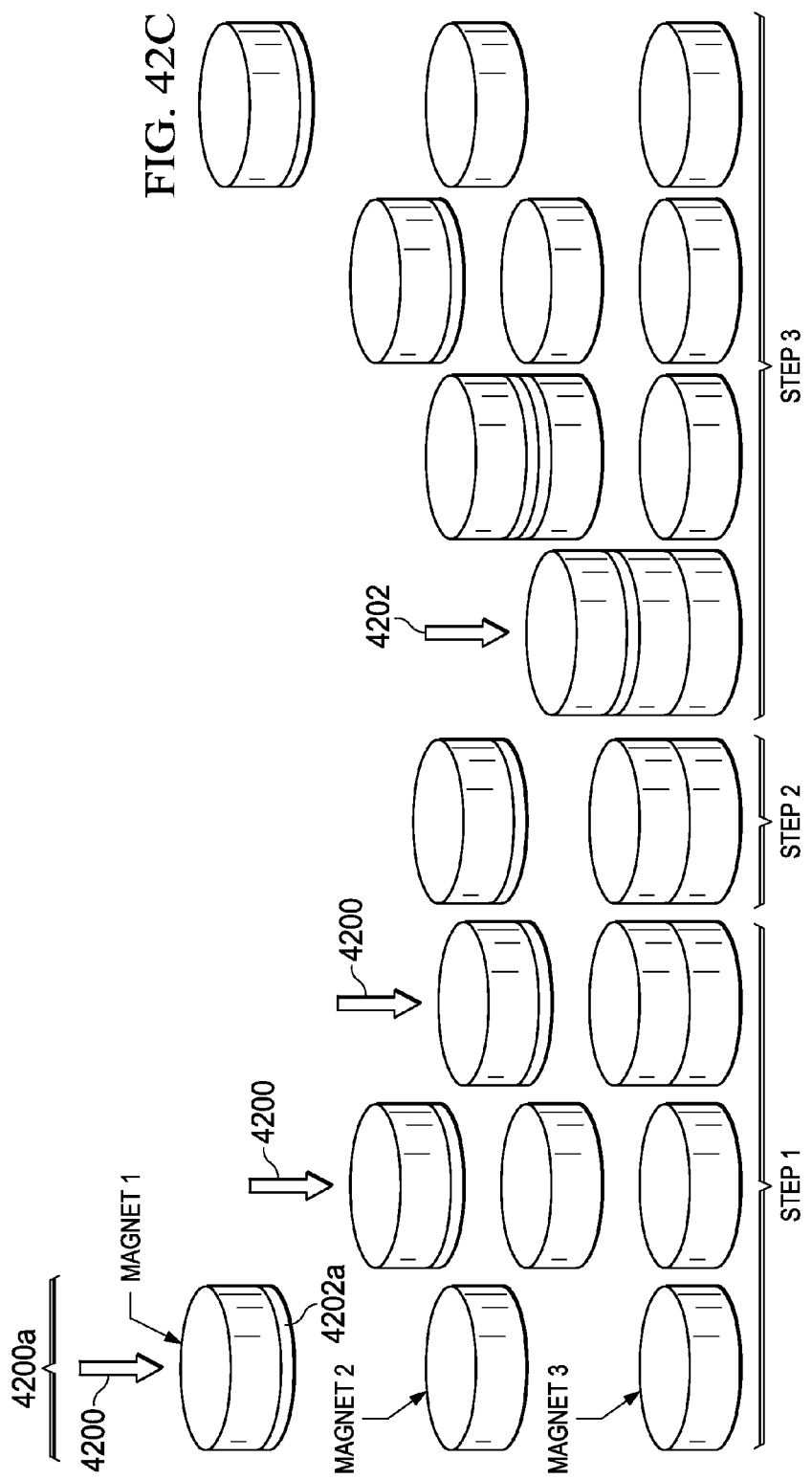

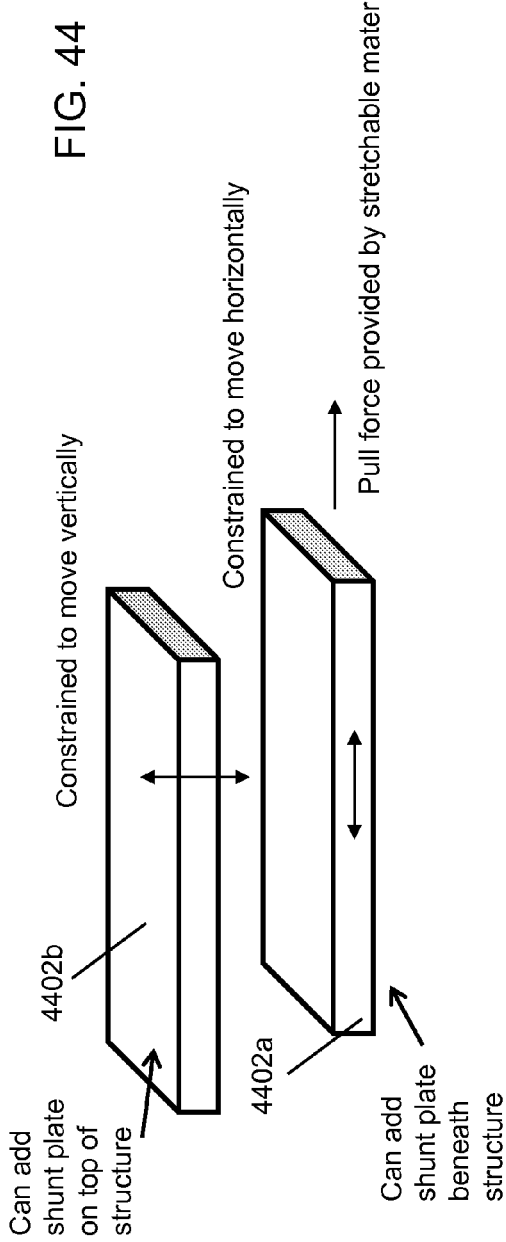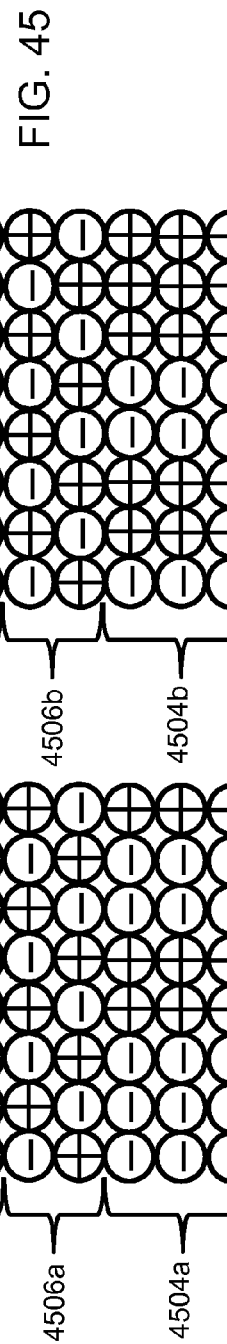

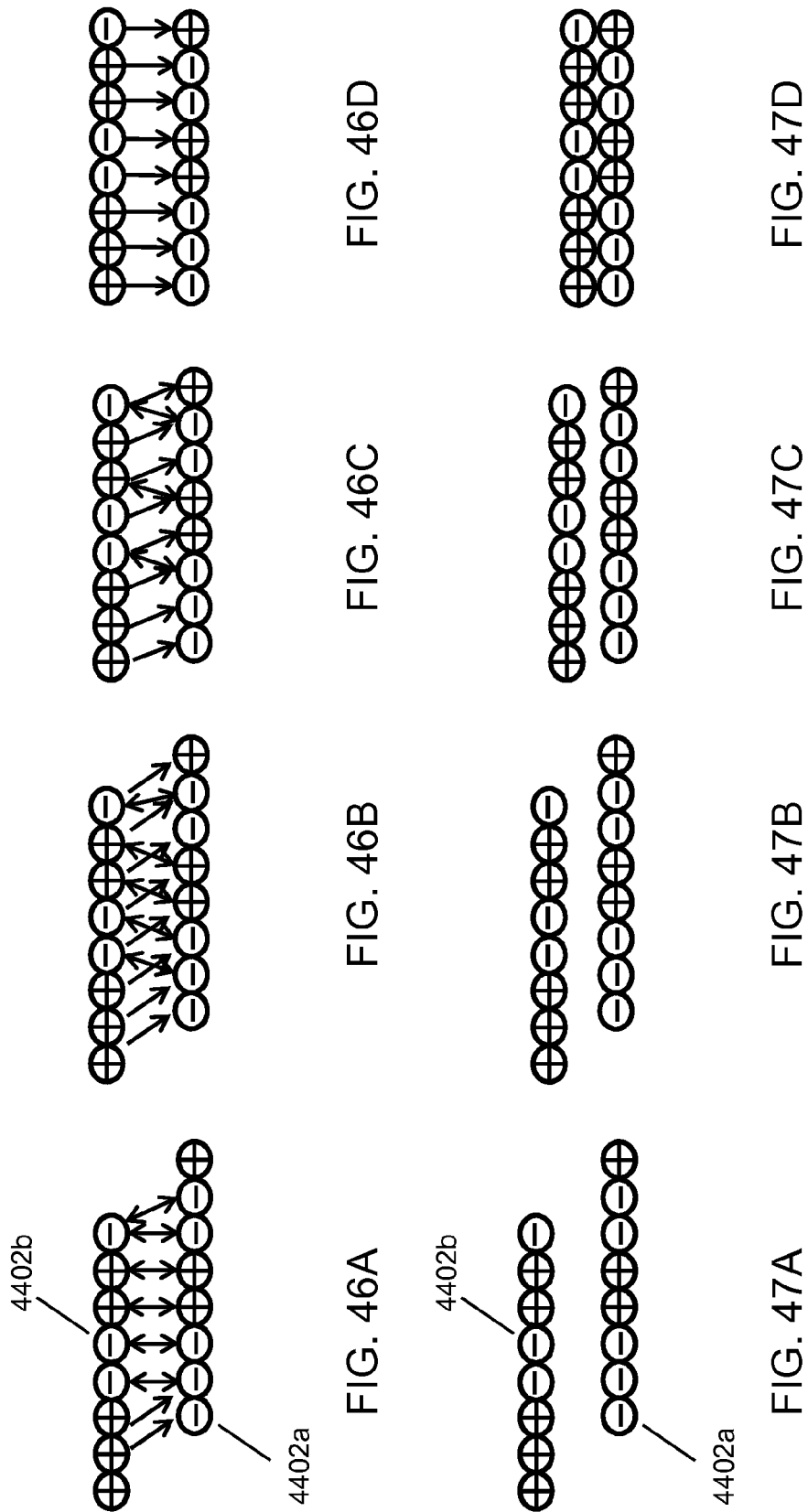

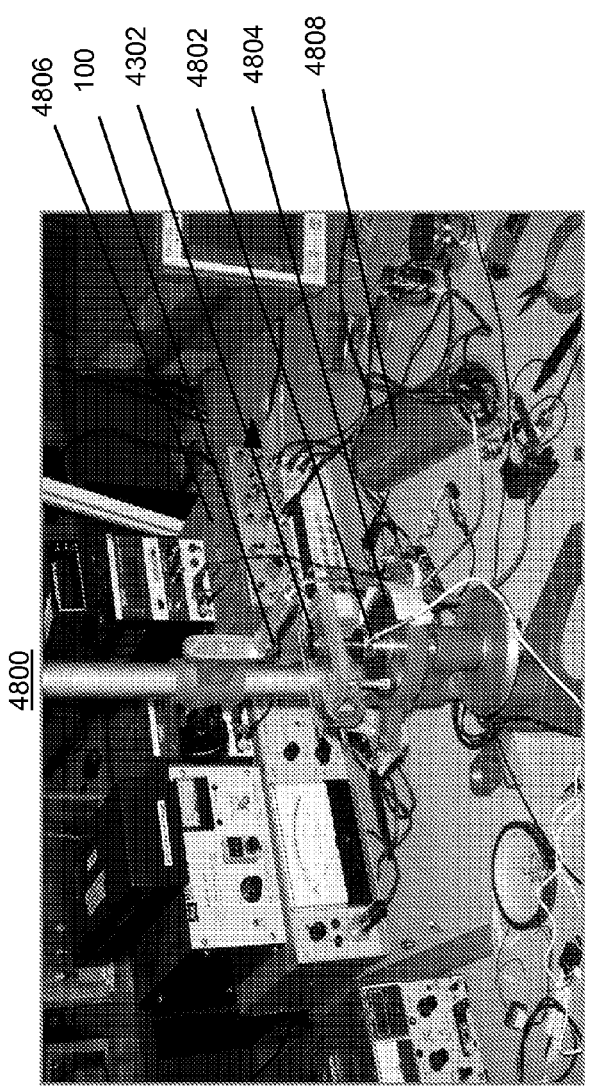
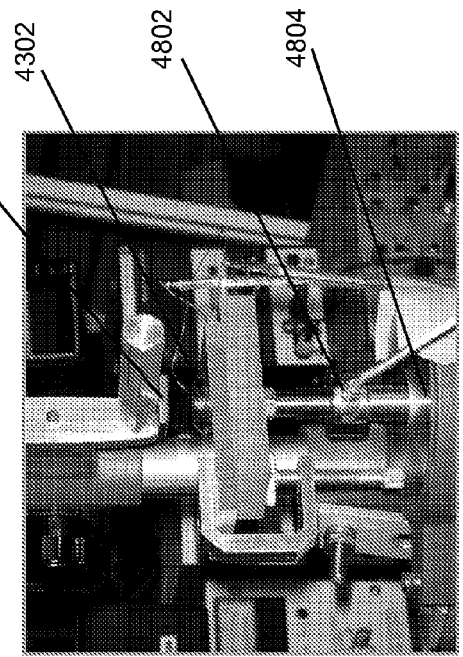
FIG. 48A
FIG. 48B

METHOD FOR DETACHMENT OF TWO OBJECTS

CLAIMING BENEFIT OF PRIOR FILED U.S. APPLICATION

This patent application is a continuation of U.S. patent application Ser. No. 13/426,909 (filed Mar. 22, 2012), now U.S. Pat. No. 8,279,032, which claims the benefit of U.S. Provisional Application Ser. No. 61/465,810 (filed Mar. 24, 2011), and which is a continuation-in-part of U.S. Non-Provisional patent application Ser. No. 13/179,759 (filed Jul. 11, 2011), now U.S. Pat. No. 8,174,347. The contents of these documents are hereby incorporated by reference herein.

TECHNICAL FIELD

The present invention relates generally to a system for detaching correlated magnetic structures. More particularly, the present invention relates to detaching correlated magnetic structures using a bias magnetic field produced by a permanent magnet or an electromagnet.

SUMMARY OF THE INVENTION

In one aspect, the present invention provides a correlated magnetic system comprising a first correlated magnetic structure including a first plurality of magnetic sources, a second correlated magnetic structure including a second plurality of magnetic sources, the second plurality of magnetic sources being complementary to the first plurality of magnetic sources, and a tool that applies a bias magnetic field to cause a transition of the first and second magnetic structures from a closed state in which the first and second magnetic structures are attached to an open state in which the first and second magnetic structures are detached.

The tool may also apply another bias magnet field to cause a transition of the first and second magnetic structures from the open state to the closed state. The tool may include one or more permanent magnets. The tool may include one or more electromagnets. The bias field may be a coded bias field so that the tool will function only when in a desired orientation with the first and second magnetic structures.

The correlated magnetic system may further comprise one or more movement constraining structures which constrain the movement of at least one of the first correlated magnetic structure or the second correlated magnetic structure.

The correlated magnetic system may further comprise a spacer between the first correlated magnetic structure and the second correlated magnetic structure that prevents the first correlated magnetic structure from contacting the second correlated magnetic structure.

The first plurality of magnetic sources may include first field emission sources and the second plurality of magnetic sources may include second field emission sources, each of said first and second field emission sources having positions and polarities relating to a desired spatial force function that corresponds to a relative alignment of the first and second correlated magnetic structures within a field domain, said spatial force function being in accordance with a code, said code corresponding to a code modulo of the first field emission sources and a complementary code modulo of the second field emission sources.

The code may define a peak spatial force corresponding to a substantial alignment of the code modulo of the first field emission sources with the complementary code modulo of the second field emission sources, where the code also defines a plurality of off peak spatial forces corresponding to a plurality of different misalignments of the code modulo of the first field emission sources and the complementary code modulo of the second field emission sources, the plurality of off peak spatial forces having a largest off peak spatial force, the largest off peak spatial force being less than half of the peak spatial force.

The positions and the polarities of each of said field emission sources may be determined in accordance with at least one correlation function. The at least one correlation function may be in accordance with the code that may be one of a pseudorandom code, a deterministic code, or a designed code. The code may be one of a one dimensional code, a two dimensional code, a three dimensional code, or a four dimensional code.

Each of the field emission sources may have a corresponding field emission amplitude and vector direction determined in accordance with the desired spatial force function, wherein a separation distance between the first and second magnetic field emission structures and relative alignment of the first and second correlated magnetic structures creates a spatial force in accordance with the desired spatial force function.

The spatial force may include at least one of an attractive spatial force or a repellant spatial force.

The tool may include an electromagnet having a U-shaped core, the U-shaped core including two side portions that extend upward and around the second magnetic structure, the first magnetic structure having a central portion that is the same size as the second magnetic structure and having two outer portions that overlap the two side portions of the U-shaped core.

The central region of the first magnetic structure may include the first plurality of magnetic sources. The two outer portions of the first magnetic structure can be coded to maximize the repel force once said electromagnet is activated, which produces an electromagnetic field in the regions where the two side portions of said U-shaped core overlap said two outer portions of said first magnetic structure.

Activation of the electromagnet may cause the first magnetic structure and the second magnetic structure to separate by a distance where the first magnetic structure and the second magnetic structure will remain in the open state when the electromagnet is deactivated. Alternatively, activation of the electromagnet may cause the first magnetic structure and the second magnetic structure to separate by a distance where the first magnetic structure and the second magnetic structure will return to the closed state when the electromagnet is deactivated.

Additional aspects of the invention will be set forth, in part, in the detailed description, figures and any claims which follow, and in part will be derived from the detailed description, or can be learned by practice of the invention. It is to be understood that both the foregoing general description and the following detailed description are exemplary and explanatory only and are not restrictive of the invention as disclosed.

BRIEF DESCRIPTION OF THE DRAWINGS

A more complete understanding of the present invention may be obtained by reference to the following detailed description when taken in conjunction with the accompanying drawings wherein:

FIGS. 13B and 13C depict alternative correlated magnetic structures in accordance with an embodiment of the present invention;

FIGS. 14A and 14B depict use of multiple multilevel structures to achieve contactless attachment of two objects in accordance with an embodiment of the present invention;

FIG. 16 is a diagram that depicts the force vs. position relationship between the spring and the two magnets making up the snap correlated magnetic structure of the momentary snap switch of FIG. 15A;

FIG. 21A depicts a push button and a first magnet of an exemplary momentary switch in accordance with an embodiment of the present invention;

FIG. 21B depicts a second magnet having an associated electrical contact of an exemplary momentary switch in accordance with an embodiment of the present invention;

FIG. 21C depicts a third magnet and a base of an exemplary momentary switch in accordance with an embodiment of the present invention;

FIG. 21D depicts an exemplary cylinder having an upper lip, a top hole, and a bottom hole configured to receive the push button and first magnet of FIG. 12A, the second magnet and contact of FIG. 21B, and the third magnet and base of FIG. 21C in accordance with an embodiment of the present invention;

FIG. 21E depicts an assembled exemplary momentary switch in its normal open state with a spacer and contact positioned in the slot and on top of the third magnet in accordance with an embodiment of the present invention;

FIG. 21F depicts the assembled exemplary momentary switch of FIG. 21E in its closed state in accordance with an embodiment of the present invention;

FIGS. 31A-31K depict a child-proof/animal-proof device in accordance with an embodiment of the present invention;

FIG. 34 depicts a force curve corresponding to multi-level repel and snap behavior in accordance with an embodiment of the present invention;

FIGS. 36A-36D depict demonstration devices and their associated force curves in accordance with an embodiment of the present invention;

FIGS. 37A-37C depict use of multi-level contactless attachment devices to produce cabinets that close but do not touch in accordance with an embodiment of the present invention;

FIGS. 40A-40B depict a retractable magnet assembly intended to limit magnetic field effects at an engagement location when a magnet is in its retracted state;

FIG. 41D depicts an exemplary enclosure whereby a given magnet of a repel-snap magnet pair or a hover-snap magnet pair can move from one side of the enclosure when 'snapped' to the other magnet and can move to the other side of the enclosure when 'repelled' away from the other magnet;

FIGS. 42A-42B depict alternative stacked multi-level structures intended to produce a click on-click off behavior;

FIG. 42C depicts the click on-click off behavior of the stacked multi-level structure of FIG. 42A;

FIG. 44 depicts movement constraints of two magnetic structures;

FIG. 45 depicts complementary codes intended to produce a desirable movement behavior of two magnetic structures;

FIGS. 46A-46D depict exemplary repel and attract forces of magnetic structures coded in accordance with the codes of FIG. 45;

FIGS. 47A-47D depict exemplary vertical and horizontal movement of the magnetic structures of FIGS. 46A-46D;

FIGS. 48A and 48B depict an exemplary test apparatus;

DETAILED DESCRIPTION

The present invention includes a system for detachment of correlated magnetic structures. The system of the present invention is made possible, in part, by the use of an emerging, revolutionary technology that is called correlated magnetics. This revolutionary technology referred to herein as correlated magnetics was first fully described and enabled in the co-assigned U.S. Pat. No. 7,800,471 issued on Sep. 21, 2010 and entitled "A Field Emission System and Method". The contents of this document are hereby incorporated herein by reference. A second generation of a correlated magnetic technology is described and enabled in the co-assigned U.S. Pat. No. 7,868,721 issued on Jan. 11, 2011 and entitled "A Field Emission System and Method". The contents of this document are hereby incorporated herein by reference. A third generation of a correlated magnetic technology is described and enabled in the co-assigned U.S. patent application Ser. No. 12/476,952 filed on Jun. 2, 2009 and entitled "A Field Emission System and Method". The contents of this document are hereby incorporated herein by reference. Another technology known as correlated inductance, which is related to correlated magnetics, has been described and enabled in the co-assigned U.S. Pat. No. 8,115,581 issued on Feb. 14, 2012 and entitled "A System and Method for Producing an Electric Pulse". The contents of this document are hereby incorporated by reference. A brief discussion about correlated magnetics is provided first before a detailed discussion is provided about the multilevel correlated magnetic system and method of the present invention.

Correlated Magnetics Technology

This section is provided to introduce the reader to basic magnets and the new and revolutionary correlated magnetic technology. This section includes subsections relating to basic magnets, correlated magnets, and correlated electromagnetics. It should be understood that this section is provided to assist the reader with understanding the present invention, and should not be used to limit the scope of the present invention.

A. Magnets

Figure 1:
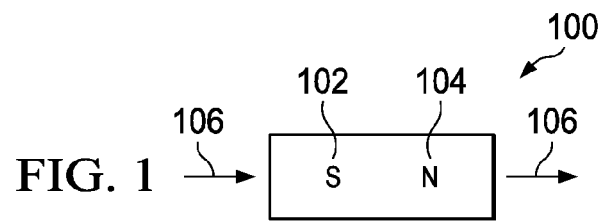
FIGS. 1-9 are various diagrams used to help explain different concepts about correlated magnetic technology which can be utilized in different embodiments of the present invention.

A magnet is a material or object that produces a magnetic field which is a vector field that has a direction and a magnitude (also called strength). Referring to FIG. 1, there is illustrated an exemplary magnet 100 which has a South pole 102 and a North pole 104 and magnetic field vectors 106 that represent the direction and magnitude of the magnet's moment. The magnet's moment is a vector that characterizes the overall magnetic properties of the magnet 100. For a bar magnet, the direction of the magnetic moment points from the South pole 102 to the North pole 104. The North and South poles 104 and 102 are also referred to herein as positive (+) and negative (−) poles, respectively.

Figure 2A:
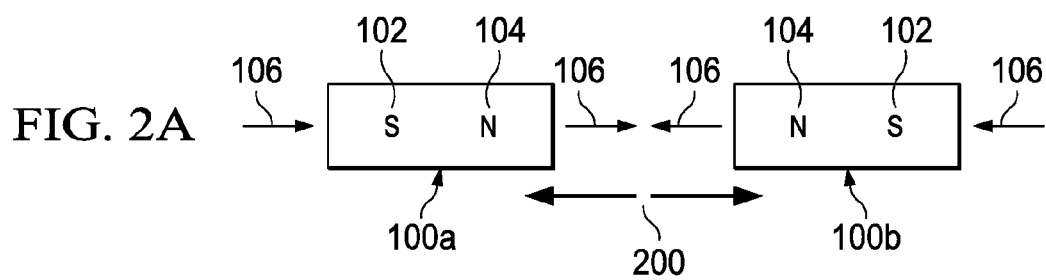
Figure 2B:
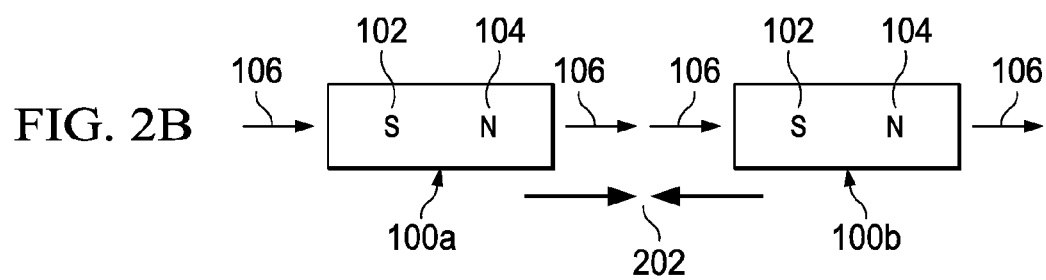
Figure 2C:
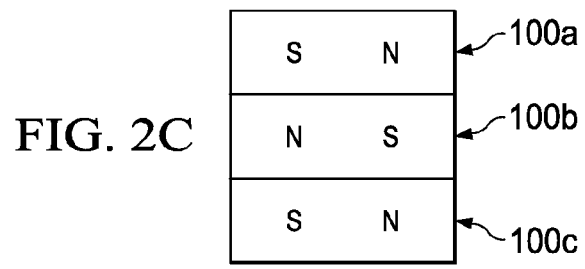

Referring to FIG. 2A, there is a diagram that depicts two magnets 100a and 100b aligned such that their polarities are opposite in direction resulting in a repelling spatial force 200 which causes the two magnets 100a and 100b to repel each other. In contrast, FIG. 2B is a diagram that depicts two magnets 100a and 100b aligned such that their polarities are in the same direction resulting in an attracting spatial force 202 which causes the two magnets 100a and 100b to attract each other. In FIG. 2B, the magnets 100a and 100b are shown as being aligned with one another but they can also be partially aligned with one another where they could still "stick" to each other and maintain their positions relative to each other. FIG. 2C is a diagram that illustrates how magnets 100a, 100b and 100c will naturally stack on one another such that their poles alternate.

B. Correlated Magnets

Correlated magnets can be created in a wide variety of ways depending on the particular application as described in the aforementioned U.S. patent application Ser. Nos. 12/123,718, 12/358,432, and 12/476,952 by using a unique combination of magnet arrays (referred to herein as magnetic field emission sources), correlation theory (commonly associated with probability theory and statistics) and coding theory (commonly associated with communication systems and radar systems). A brief discussion is provided next to explain how these widely diverse technologies are used in a unique and novel way to create correlated magnets.

Basically, correlated magnets are made from a combination of magnetic (or electric) field emission sources which have been configured in accordance with a pre-selected code having desirable correlation properties. Thus, when a magnetic field emission structure is brought into alignment with a complementary, or mirror image, magnetic field emission structure the various magnetic field emission sources will all align causing a peak spatial attraction force to be produced, while the misalignment of the magnetic field emission structures cause the various magnetic field emission sources to substantially cancel each other out in a manner that is a function of the particular code used to design the two magnetic field emission structures. In contrast, when a magnetic field emission structure is brought into alignment with a duplicate magnetic field emission structure then the various magnetic field emission sources all align causing a peak spatial repelling force to be produced, while the misalignment of the magnetic field emission structures causes the various magnetic field emission sources to substantially cancel each other out in a manner that is a function of the particular code used to design the two magnetic field emission structures.

The aforementioned spatial forces (attraction, repelling) have a magnitude that is a function of the relative alignment of two magnetic field emission structures and their corresponding spatial force (or correlation) function, the spacing (or distance) between the two magnetic field emission structures, and the magnetic field strengths and polarities of the various sources making up the two magnetic field emission structures. The spatial force functions can be used to achieve precision alignment and precision positioning not possible with basic magnets. Moreover, the spatial force functions can enable the precise control of magnetic fields and associated spatial forces thereby enabling new forms of attachment devices for attaching objects with precise alignment and new systems and methods for controlling precision movement of objects. An additional unique characteristic associated with correlated magnets relates to the situation where the various magnetic field sources making-up two magnetic field emission structures can effectively cancel out each other when they are brought out of alignment which is described herein as a release force. This release force is a direct result of the particular correlation coding used to configure the magnetic field emission structures.

A person skilled in the art of coding theory will recognize that there are many different types of codes that have different correlation properties which have been used in communications for channelization purposes, energy spreading, modulation, and other purposes. Many of the basic characteristics of such codes make them applicable for use in producing the magnetic field emission structures described herein. For example, Barker codes are known for their autocorrelation properties and can be used to help configure correlated magnets. Although, a Barker code is used in an example below with respect to FIGS. 3A-3B, other forms of codes which may or may not be well known in the art are also applicable to correlated magnets because of their autocorrelation, cross-correlation, or other properties including, for example, Gold codes, Kasami sequences, hyperbolic congruential codes, quadratic congruential codes, linear congruential codes, Welch-Costas array codes, Golomb-Costas array codes, pseudorandom codes, chaotic codes, Optimal Golomb Ruler codes, deterministic codes, designed codes, one dimensional codes, two dimensional codes, three dimensional codes, or four dimensional codes, combinations thereof, and so forth.

Figure 3A:
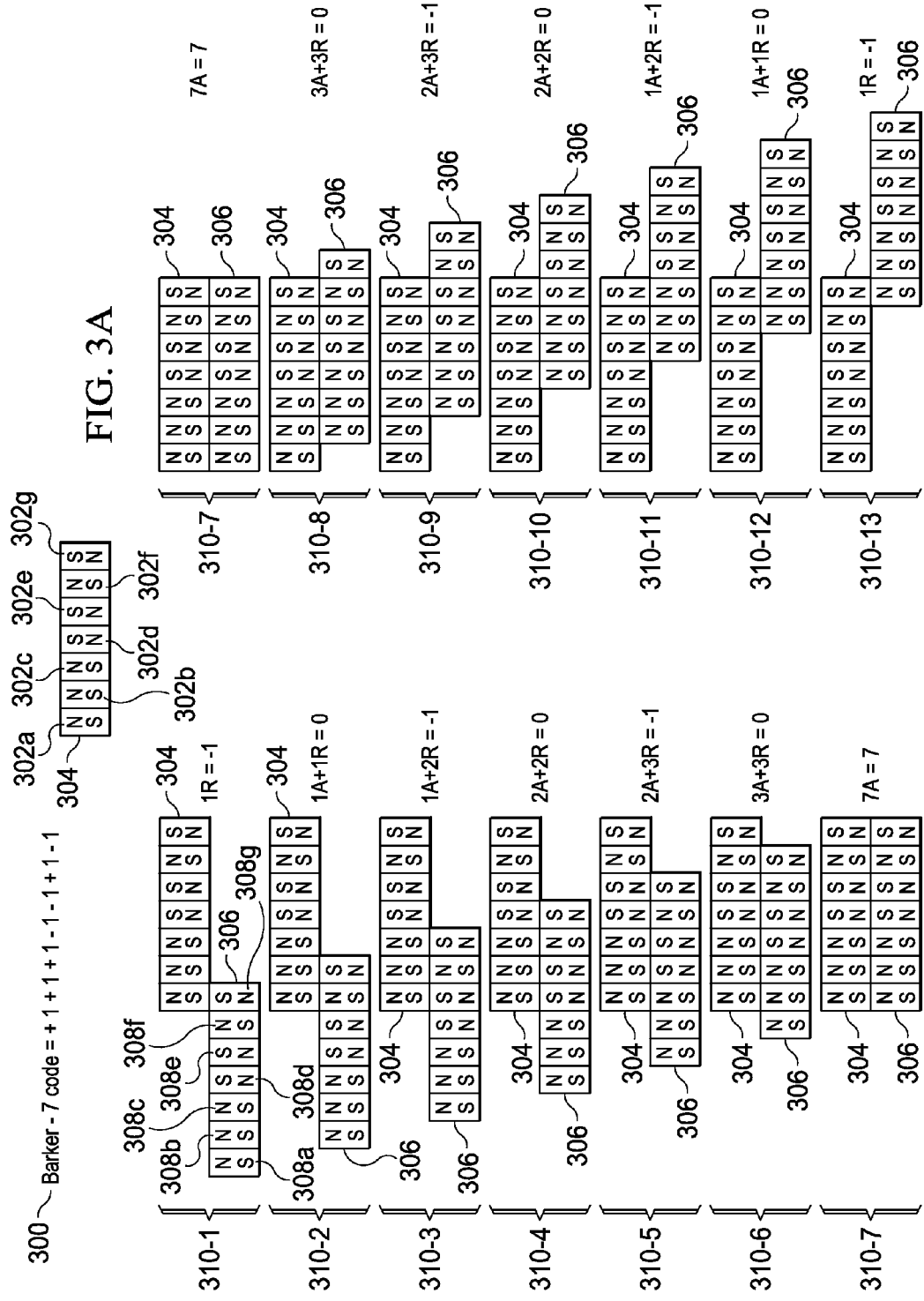

Referring to FIG. 3A, there are diagrams used to explain how a Barker length 7 code 300 can be used to determine polarities and positions of magnets 302a, 302b . . . 302g making up a first magnetic field emission structure 304. Each magnet 302a, 302b . . . 302g has the same or substantially the same magnetic field strength (or amplitude), which for the sake of this example is provided as a unit of 1 (where A=Attract, R=Repel, A=−R, A=1, R=−1). A second magnetic field emission structure 306 (including magnets 308a, 308b . . . 308g) that is identical to the first magnetic field emission structure 304 is shown in 13 different alignments 310-1 through 310-13 relative to the first magnetic field emission structure 304. For each relative alignment, the number of magnets that repel plus the number of magnets that attract is calculated, where each alignment has a spatial force in accordance with a spatial force function based upon the correlation function and magnetic field strengths of the magnets 302a, 302b . . . 302g and 308a, 308b . . . 308g. With the specific Barker code used, the spatial force varies from −1 to 7, where the peak occurs when the two magnetic field emission structures 304 and 306 are aligned which occurs when their respective codes are aligned. The off peak spatial force, referred to as a side lobe force, varies from 0 to −1. As such, the spatial force function causes the magnetic field emission structures 304 and 306 to generally repel each other unless they are aligned such that each of their magnets are correlated with a complementary magnet (i.e., a magnet's South pole aligns with another magnet's North pole, or vice versa). In other words, the two magnetic field emission structures 304 and 306 substantially correlate with one another when they are aligned to substantially mirror each other.

Figure 3B:
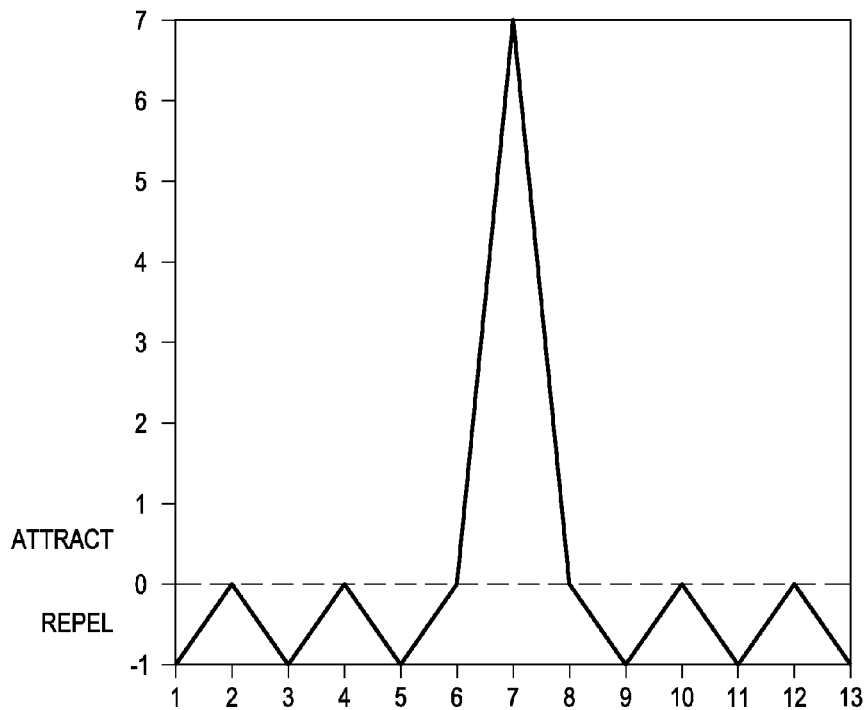

In FIG. 3B, there is a plot that depicts the spatial force function of the two magnetic field emission structures 304 and 306 which results from the binary autocorrelation function of the Barker length 7 code 300, where the values at each alignment position 1 through 13 correspond to the spatial force values that were calculated for the thirteen alignment positions 310-1 through 310-13 between the two magnetic field emission structures 304 and 306 depicted in FIG. 3A. As the true autocorrelation function for correlated magnet field structures is repulsive, and most of the uses envisioned will have attractive correlation peaks, the usage of the term 'autocorrelation' herein will refer to complementary correlation unless otherwise stated. That is, the interacting faces of two such correlated magnetic field emission structures 304 and 306 will be complementary to (i.e., mirror images of) each other. This complementary autocorrelation relationship can be seen in FIG. 3A where the bottom face of the first magnetic field emission structure 304 having the pattern 'S S S N N S N' is shown interacting with the top face of the second magnetic field emission structure 306 having the pattern 'N N N S S N S', which is the mirror image (pattern) of the bottom face of the first magnetic field emission structure 304.

Figure 4A:
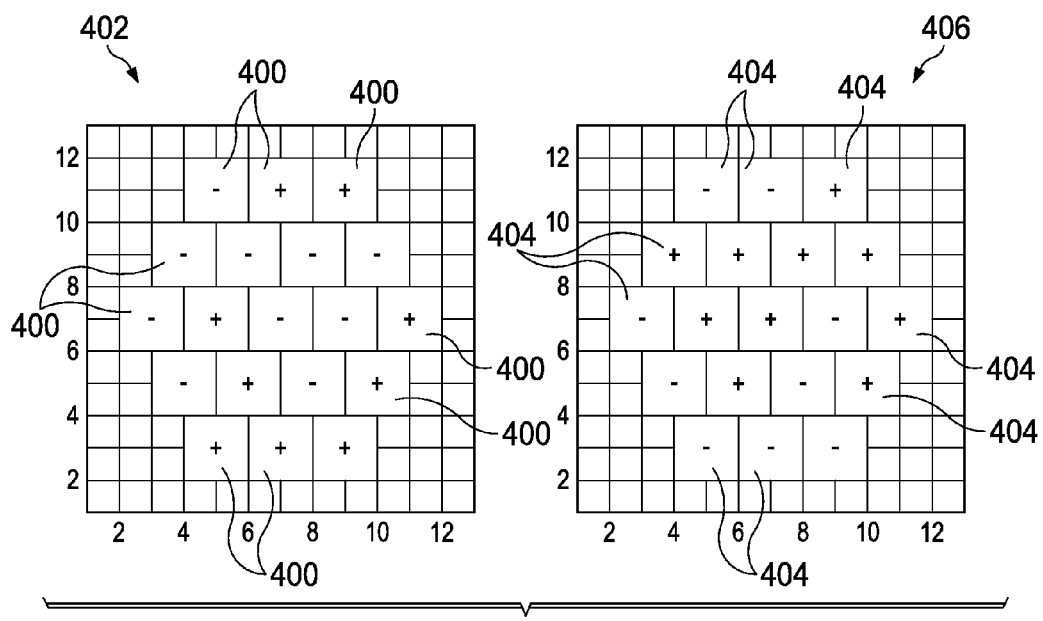
Figure 4B:
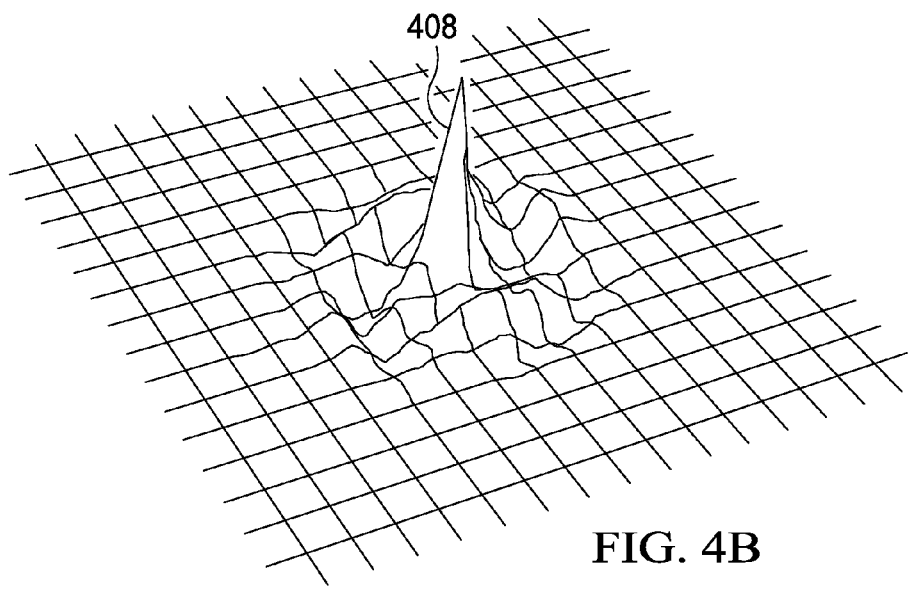
Figure 4C:
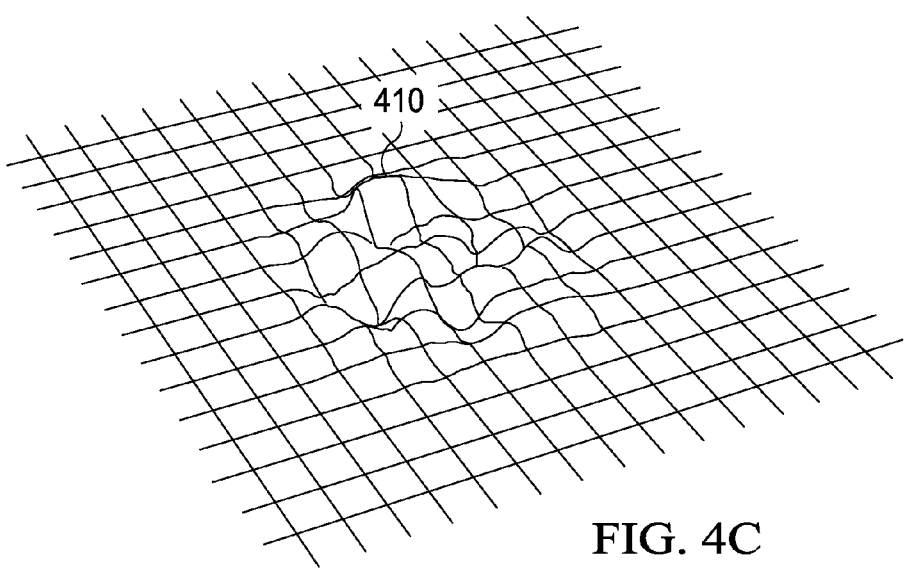

Referring to FIG. 4A, there is a diagram of an array of 19 magnets 400 positioned in accordance with an exemplary code to produce an exemplary magnetic field emission structure 402 and another array of 19 magnets 404 which is used to produce a mirror image magnetic field emission structure 406. In this example, the exemplary code was intended to produce the first magnetic field emission structure 402 to have a first stronger lock when aligned with its mirror image magnetic field emission structure 406 and a second weaker lock when it is rotated 90° relative to its mirror image magnetic field emission structure 406. FIG. 4B depicts a spatial force function 408 of the magnetic field emission structure 402 interacting with its mirror image magnetic field emission structure 406 to produce the first stronger lock. As can be seen, the spatial force function 408 has a peak which occurs when the two magnetic field emission structures 402 and 406 are substantially aligned. FIG. 4C depicts a spatial force function 410 of the magnetic field emission structure 402 interacting with its mirror magnetic field emission structure 406 after being rotated 90°. As can be seen, the spatial force function 410 has a smaller peak which occurs when the two magnetic field emission structures 402 and 406 are substantially aligned but one structure is rotated 90°. If the two magnetic field emission structures 402 and 406 are in other positions then they could be easily separated.

Figure 5:
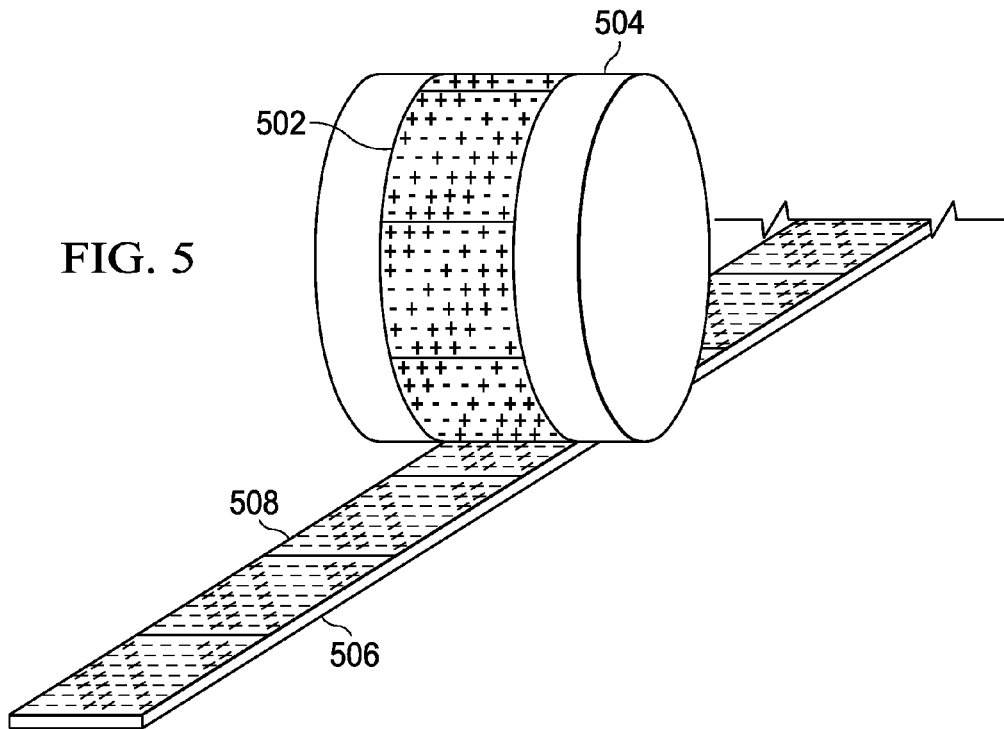

Referring to FIG. 5, there is a diagram depicting a correlating magnet surface 502 being wrapped back on itself on a cylinder 504 (or disc 504, wheel 504) and a conveyor belt/tracked structure 506 having located thereon a mirror image correlating magnet surface 508. In this case, the cylinder 504 can be turned clockwise or counter-clockwise by some force so as to roll along the conveyor belt/tracked structure 506. The fixed magnetic field emission structures 502 and 508 provide a traction and gripping (i.e., holding) force as the cylinder 504 is turned by some other mechanism (e.g., a motor). The gripping force would remain substantially constant as the cylinder 504 moved down the conveyor belt/tracked structure 506 independent of friction or gravity and could therefore be used to move an object about a track that moved up a wall, across a ceiling, or in any other desired direction within the limits of the gravitational force (as a function of the weight of the object) overcoming the spatial force of the aligning magnetic field emission structures 502 and 508. If desired, this cylinder 504 (or other rotary devices) can also be operated against other rotary correlating surfaces to provide a gear-like operation. Since the hold-down force equals the traction force, these gears can be loosely connected and still give positive, non-slipping rotational accuracy. Plus, the magnetic field emission structures 502 and 508 can have surfaces which are perfectly smooth and still provide positive, non-slip traction. In contrast to legacy friction-based wheels, the traction force provided by the magnetic field emission structures 502 and 508 is largely independent of the friction forces between the traction wheel and the traction surface and can be employed with low friction surfaces. Devices moving about based on magnetic traction can be operated independently of gravity for example in weightless conditions including space, underwater, vertical surfaces and even upside down.

Figure 6:
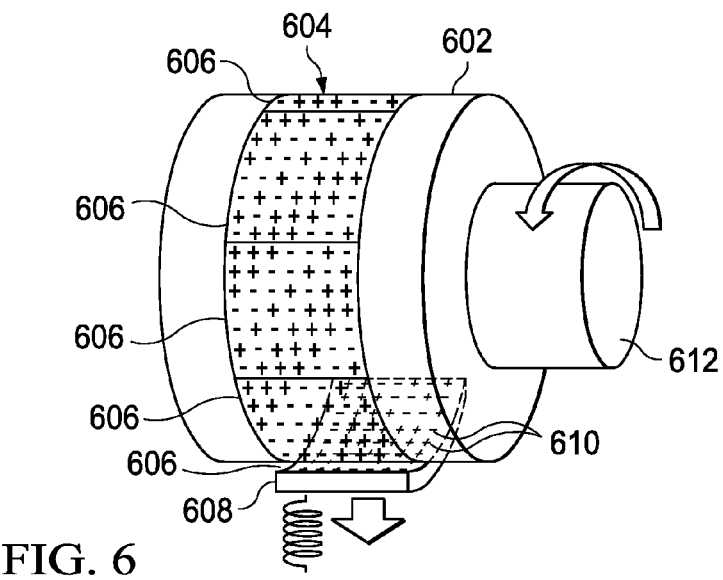

Referring to FIG. 6, there is a diagram depicting an exemplary cylinder 602 having wrapped thereon a first magnetic field emission structure 604 with a code pattern 606 that is repeated six times around the outside of the cylinder 602. Beneath the cylinder 602 is an object 608 having a curved surface with a slightly larger curvature than the cylinder 602 and having a second magnetic field emission structure 610 that is also coded using the code pattern 606. Assume, the cylinder 602 is turned at a rotational rate of 1 rotation per second by shaft 612. Thus, as the cylinder 602 turns, six times a second the first magnetic field emission structure 604 on the cylinder 602 aligns with the second magnetic field emission structure 610 on the object 608 causing the object 608 to be repelled (i.e., moved downward) by the peak spatial force function of the two magnetic field emission structures 604 and 610. Similarly, had the second magnetic field emission structure 610 been coded using a code pattern that mirrored code pattern 606, then 6 times a second the first magnetic field emission structure 604 of the cylinder 602 would align with the second magnetic field emission structure 610 of the object 608 causing the object 608 to be attracted (i.e., moved upward) by the peak spatial force function of the two magnetic field emission structures 604 and 610. Thus, the movement of the cylinder 602 and the corresponding first magnetic field emission structure 604 can be used to control the movement of the object 608 having its corresponding second magnetic field emission structure 610. One skilled in the art will recognize that the cylinder 602 may be connected to a shaft 612 which may be turned as a result of wind turning a windmill, a water wheel or turbine, ocean wave movement, and other methods whereby movement of the object 608 can result from some source of energy scavenging. As such, correlated magnets enables the spatial forces between objects to be precisely controlled in accordance with their movement and also enables the movement of objects to be precisely controlled in accordance with such spatial forces.

In the above examples, the correlated magnets 304, 306, 402, 406, 502, 508, 604 and 610 overcome the normal 'magnet orientation' behavior with the aid of a holding mechanism such as an adhesive, a screw, a bolt & nut, etc. . . . . In other cases, magnets of the same magnetic field emission structure could be sparsely separated from other magnets (e.g., in a sparse array) such that the magnetic forces of the individual magnets do not substantially interact, in which case the polarity of individual magnets can be varied in accordance with a code without requiring a holding mechanism to prevent magnetic forces from 'flipping' a magnet. However, magnets are typically close enough to one another such that their magnetic forces would substantially interact to cause at least one of them to 'flip' so that their moment vectors align but these magnets can be made to remain in a desired orientation by use of a holding mechanism such as an adhesive, a screw, a bolt & nut, etc. . . . . As such, correlated magnets often utilize some sort of holding mechanism to form different magnetic field emission structures which can be used in a wide-variety of applications like, for example, a drill head assembly, a hole cutting tool assembly, a machine press tool, a gripping apparatus, a slip ring mechanism, and a structural assembly. Moreover, magnetic field emission structures may include a turning mechanism, a tool insertion slot, alignment marks, a latch mechanism, a pivot mechanism, a swivel mechanism, or a lever.

C. Correlated Electromagnetics

Correlated magnets can entail the use of electromagnets which is a type of magnet in which the magnetic field is produced by the flow of an electric current. The polarity of the magnetic field is determined by the direction of the electric current and the magnetic field disappears when the current ceases. Following are a couple of examples in which arrays of electromagnets are used to produce a first magnetic field emission structure that is moved over time relative to a second magnetic field emission structure which is associated with an object thereby causing the object to move.

Figure 7:
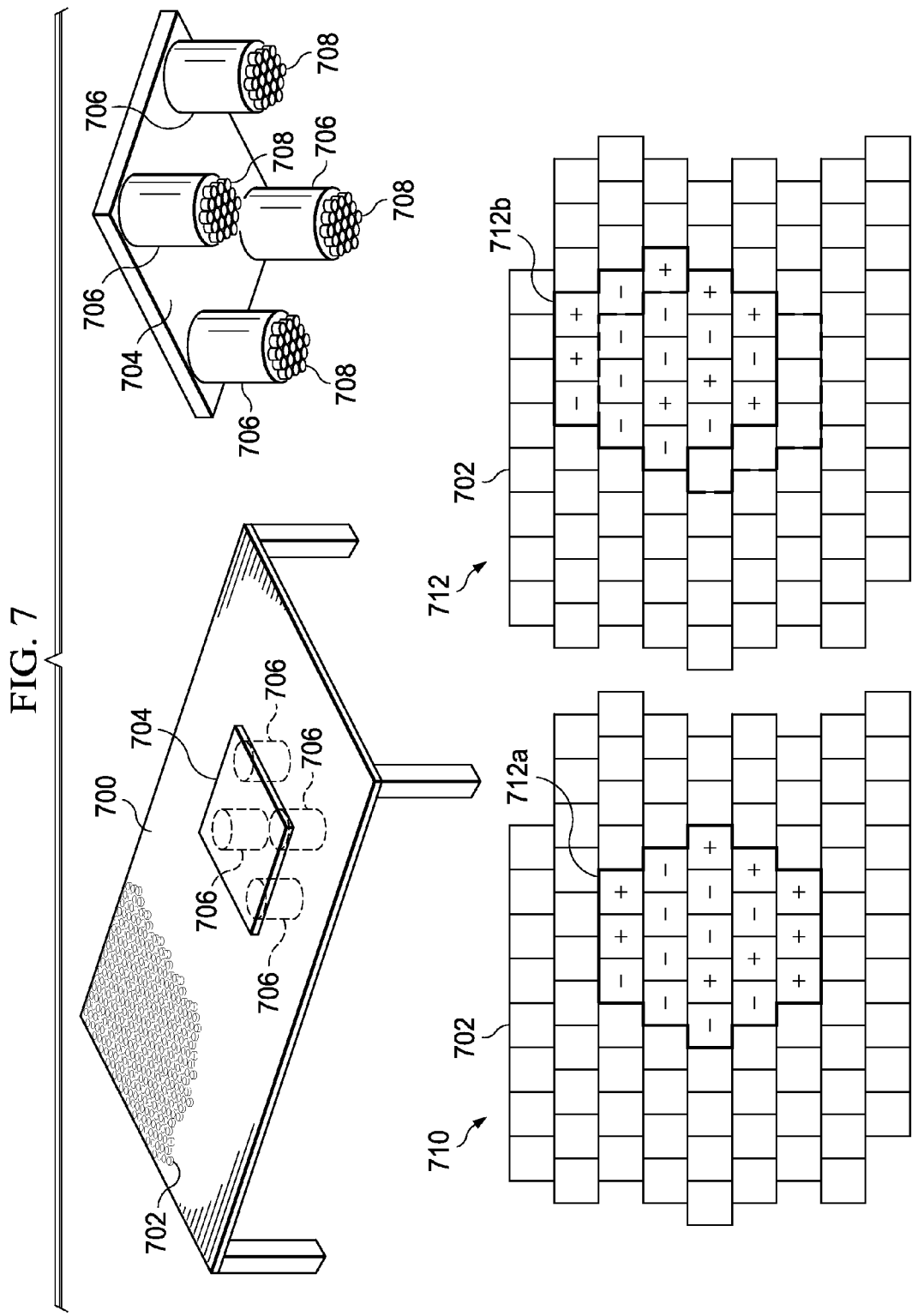

Referring to FIG. 7, there are several diagrams used to explain a correlated electromagnetics example in which there is a table 700 having a two-dimensional electromagnetic array 702 (first magnetic field emission structure 702) beneath its surface and a movement platform 704 having at least one table contact member 706. In this example, the movement platform 704 is shown having four table contact members 706 each having a magnetic field emission structure 708 (second magnetic field emission structures 708) that would be attracted by the electromagnetic array 702. Computerized control of the states of individual electromagnets of the electromagnet array 702 determines whether they are on or off and determines their polarity. A first example 710 depicts states of the electromagnetic array 702 configured to cause one of the table contact members 706 to attract to a subset 712a of the electromagnets within the magnetic field emission structure 702. A second example 712 depicts different states of the electromagnetic array 702 configured to cause the one table contact member 706 to be attracted (i.e., move) to a different subset 712b of the electromagnets within the field emission structure 702. Per the two examples, one skilled in the art can recognize that the table contact member(s) 706 can be moved about table 700 by varying the states of the electromagnets of the electromagnetic array 702.

Figure 8:
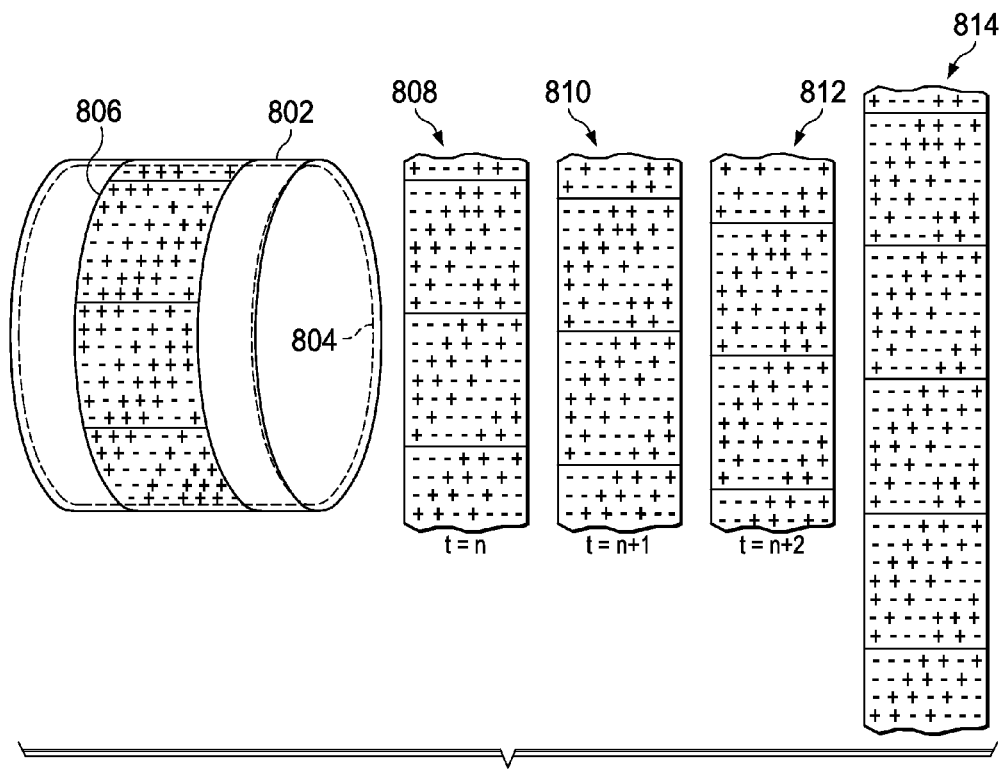

Referring to FIG. 8, there are several diagrams used to explain a 3-D correlated electromagnetics example where there is a first cylinder 802 which is slightly larger than a second cylinder 804 that is contained inside the first cylinder 802. A magnetic field emission structure 806 is placed around the first cylinder 802 (or optionally around the second cylinder 804). An array of electromagnets (not shown) is associated with the second cylinder 804 (or optionally the first cylinder 802) and their states are controlled to create a moving mirror image magnetic field emission structure to which the magnetic field emission structure 806 is attracted so as to cause the first cylinder 802 (or optionally the second cylinder 804) to rotate relative to the second cylinder 804 (or optionally the first cylinder 802). The magnetic field emission structures 808, 810, and 812 produced by the electromagnetic array on the second cylinder 804 at time t=n, t=n+1, and t=n+2, show a pattern mirroring that of the magnetic field emission structure 806 around the first cylinder 802. The pattern is shown moving downward in time so as to cause the first cylinder 802 to rotate counterclockwise. As such, the speed and direction of movement of the first cylinder 802 (or the second cylinder 804) can be controlled via state changes of the electromagnets making up the electromagnetic array. Also depicted in FIG. 8 there is an electromagnetic array 814 that corresponds to a track that can be placed on a surface such that a moving mirror image magnetic field emission structure can be used to move the first cylinder 802 backward or forward on the track using the same code shift approach shown with magnetic field emission structures 808, 810, and 812 (compare to FIG. 5).

Figure 9:
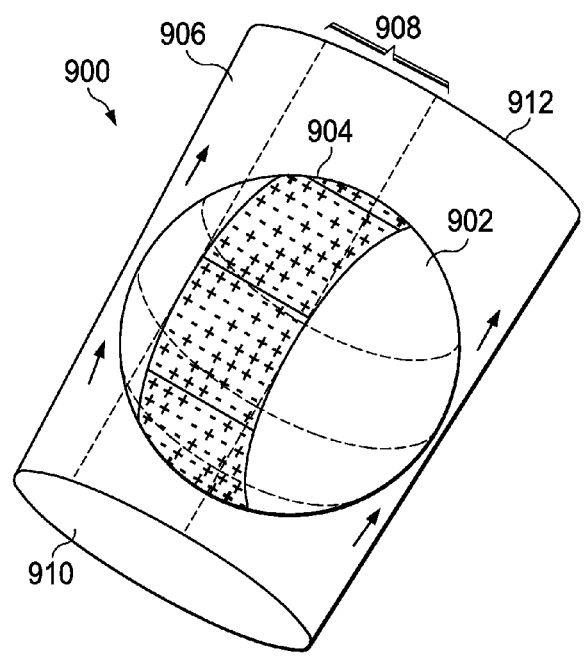

Referring to FIG. 9, there is illustrated an exemplary valve mechanism 900 based upon a sphere 902 (having a magnetic field emission structure 904 wrapped thereon) which is located in a cylinder 906 (having an electromagnetic field emission structure 908 located thereon). In this example, the electromagnetic field emission structure 908 can be varied to move the sphere 902 upward or downward in the cylinder 906 which has a first opening 910 with a circumference less than or equal to that of the sphere 902 and a second opening 912 having a circumference greater than the sphere 902. This configuration is desirable since one can control the movement of the sphere 902 within the cylinder 906 to control the flow rate of a gas or liquid through the valve mechanism 900. Similarly, the valve mechanism 900 can be used as a pressure control valve. Furthermore, the ability to move an object within another object having a decreasing size enables various types of sealing mechanisms that can be used for the sealing of windows, refrigerators, freezers, food storage containers, boat hatches, submarine hatches, etc., where the amount of sealing force can be precisely controlled. One skilled in the art will recognize that many different types of seal mechanisms that include gaskets, o-rings, and the like can be employed with the use of the correlated magnets. Plus, one skilled in the art will recognize that the magnetic field emission structures can have an array of sources including, for example, a permanent magnet, an electromagnet, an electret, a magnetized ferromagnetic material, a portion of a magnetized ferromagnetic material, a soft magnetic material, or a superconductive magnetic material, some combination thereof, and so forth.

Multilevel Correlated Magnetic System

The present invention may include a multilevel correlated magnetic system based on magnetic techniques related to those described in U.S. patent application Ser. No. 12/476, 952, filed Jun. 2, 2009, and U.S. Provisional Patent Application 61/277,214, titled "A System and Method for Contactless Attachment of Two Objects", filed Sep. 22, 2009, and U.S. Provisional Patent Application 61/278,900, titled "A System and Method for Contactless Attachment of Two Objects", filed Sep. 30, 2009, and U.S. Provisional Patent Application 61/278,767 titled "A System and Method for Contactless Attachment of Two Objects", filed Oct. 9, 2009, U.S. Provisional Patent Application 61/280,094, titled "A System and Method for Producing Multi-level Magnetic Fields", filed Oct. 16, 2009, U.S. Provisional Patent Application 61/281, 160, titled "A System and Method for Producing Multi-level Magnetic Fields", filed Nov. 13, 2009, U.S. Provisional Patent Application 61/283,780, titled "A System and Method for Producing Multi-level Magnetic Fields", filed Dec. 9, 2009, U.S. Provisional Patent Application 61/284,385, titled "A System and Method for Producing Multi-level Magnetic Fields", filed Dec. 17, 2009, and U.S. Provisional Patent Application 61/342,988, titled "A System and Method for Producing Multi-level Magnetic Fields", filed Apr. 22, 2010, which are all incorporated herein by reference in their entirety. Such systems and methods described in U.S. patent application Ser. No. 12/322,561, filed Feb. 4, 2009, U.S. patent application Ser. Nos. 12/479,074, 12/478,889, 12/478, 939, 12/478,911, 12/478,950, 12/478,969, 12/479,013, 12/479,073, 12/479,106, filed Jun. 5, 2009, U.S. patent application Ser. Nos. 12/479,818, 12/479,820, 12/479,832, and 12/479,832, file Jun. 7, 2009, U.S. patent application Ser. No. 12/494,064, filed Jun. 29, 2009, U.S. patent application Ser. No. 12/495,462, filed Jun. 30, 2009, U.S. patent application Ser. No. 12/496,463, filed Jul. 1, 2009, U.S. patent application Ser. No. 12/499,039, filed Jul. 7, 2009, U.S. patent application Ser. No. 12/501,425, filed Jul. 11, 2009, and U.S. patent application Ser. No. 12/507,015, filed Jul. 21, 2009 are all incorporated by reference herein in their entirety.

In accordance with one embodiment of the present invention, the multilevel correlated magnetic system includes a first correlated magnetic structure and a second correlated magnetic structure each having a first portion comprising a plurality of complementary coded magnetic sources and each having a second portion comprising one or more magnetic sources intended to only repel or to only attract. The magnetic sources employed in the invention may be permanent magnetic sources, electromagnets, electro-permanent magnets, or combinations thereof. In accordance with another embodiment of the present invention, both portions of the two correlated magnetic structures may comprise a plurality of complementary coded magnetic sources. For both embodiments, when the first correlated magnetic structure is a certain separation distance apart from the second correlated magnetic structure (i.e., at a transition distance), the multilevel correlated magnetic system transitions from either a repel mode to an attract mode or from an attract mode to a repel mode. Thus, the multilevel correlated magnetic system has a repel level and an attract level.

The first portion of each of the two correlated magnetic structures, which has a plurality of coded magnetic sources, can be described as being a short range portion, and the second portion of each of the two correlated magnetic structures can be described as being a long range portion, where the short range portion and the long range portion produce opposing forces that effectively work against each other. The short range portion produces a magnetic field having a higher near field density and a lesser far field density than the magnetic field produced by the long range portion. Because of these near field and far field density differences, the short range portion produces a higher peak force than the long range portion yet has a faster field extinction rate such that the short range portion is stronger than the long range portion at separation distances less than the transition distance and weaker than the long range portion at separation distance greater than the transition distance, where the forces produced by two portions cancel each other when the two correlated magnetic structures are separated by a distance equal to the transition distance. Thus, the first and second portions of the two correlated magnetic structures produce two opposite polarity force curves corresponding to the attractive force versus the separation distance between the two correlated magnetic structures and the repulsive force versus the separation distance between the two correlated magnetic structures.

In accordance with another embodiment of the present invention, the first (short range) portions of the two correlated magnetic structures produce an attractive force and the second (long range) portions of the two correlated magnetic structures produce a repulsive force. With this arrangement, as the two complementary structures are brought near each other they initially repel each other until they are at a transition distance, where they neither attract nor repel, and then when they are brought together closer than the transition distance they begin to attract strongly, behaving as a "snap." With this embodiment, the attraction curve is shorter range but its peak force is stronger than the longer range repulsive force curve.

In accordance with still another embodiment of the present invention, the polarities of the force curves are reversed with the shorter range, but stronger peak force curve being repulsive and the longer range but weaker peak force curve being attractive. With this arrangement, the two structures attract each other beyond the transition distance and repel each other when within the transition distance, which results in the two correlated magnetic structures achieving a contactless attachment where they are locked in relative position and in relative alignment yet they are separated by the transition distance.

In one embodiment of the present invention, the short range portion and the long range portion of the multi-level correlated magnetic system could both produce attractive forces to produce correlated magnetic structures having both a strong near field attractive force and a strong far field attractive force, where the transition point corresponds to a point at which the two attractive force curves cross. Similarly, the short range portion and the long range portion could both produce repulsive forces to produce correlated magnetic structures having both a strong near field repulsive force and a strong far field repulsive force, where the transition point corresponds to a point at which the two repulsive force curves cross.

In accordance with a further embodiment of the present invention, the two correlated magnetic field structures are attached to one or more movement constraining structures. A movement constraining structure may only allow motion of the two correlated magnetic structures to or away from each other where the two correlated magnetic structures are always parallel to each other. The movement constraining structure may not allow twisting (or rotation) of either correlated magnetic field structure. Similarly, the movement constraining structure may not allow sideways motion. Alternatively, one or more such movement constraining structures may have variable states whereby movement of the two correlated magnetic structures is constrained in some manner while in a first state but not constrained or constrained differently during another state. For example, the movement constraining structure may not allow rotation of either correlated magnetic structure while in a first state but allow rotation of one or both of the correlated magnetic structures while in another state.

One embodiment of the invention comprises a circular correlated magnetic structure having an annular ring of single polarity that surrounds a circular area within which resides an ensemble of coded magnetic sources. Under one arrangement corresponding to the snap behavior, the ensemble of coded magnetic sources would generate the shorter range, more powerful peak attractive force curve and the annular ring would generate the longer range, weaker peak repulsive force curve. Under a second arrangement corresponding to the contactless attachment behavior, these roles would be reversed.

In another embodiment of the present invention, the configuration of the circular correlated magnetic structure would be reversed, with the coded ensemble of coded magnetic sources occupying the outer annular ring and the inner circle being of a single polarity. Under one arrangement corresponding to the snap behavior, the ensemble of coded magnetic sources present in the outer annular ring would generate the shorter range, more powerful peak attractive force curve and the inner circle would generate the longer range, weaker peak repulsive force curve. Under a second arrangement corresponding to the contactless attachment behavior, these roles would be reversed.

In a further embodiment of the present invention, an additional modulating element that produces an additional magnetic field can be used to increase or decrease the transition distance of a multilevel magnetic field system 1000.

If one or more of the first portion and the second portion is implemented with electromagnets or electro-permanent magnets then a control system could be used to vary either the short range force curve or the long range force curve.

The spatial force functions used in accordance with the present invention can be designed to allow movement (e.g., rotation) of at least one of the correlated magnetic structures of the multilevel correlated magnetic system to vary either the short range force curve or the long range force curve.

Figure 10:
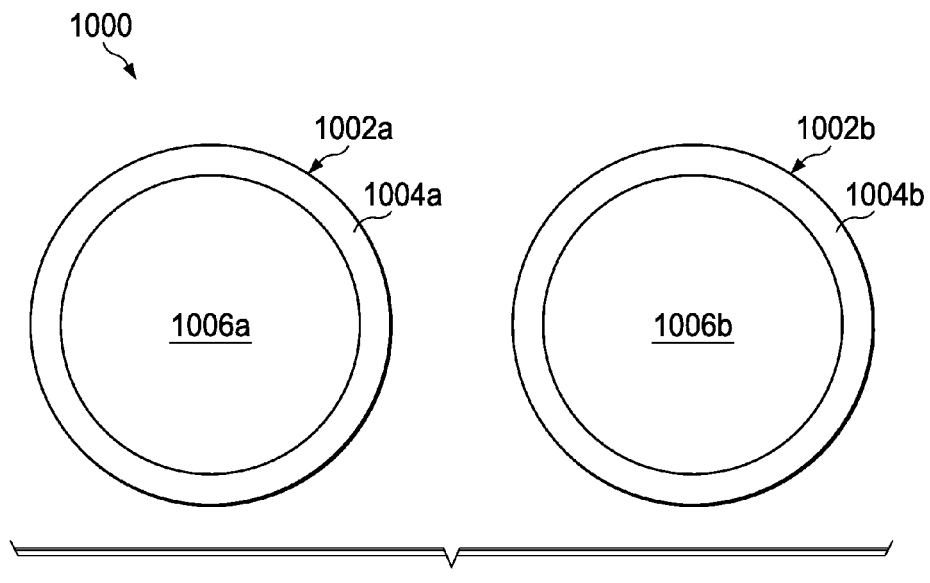
FIG. 10 depicts a multilevel correlated magnetic system in accordance with an embodiment of the present invention.

Referring to FIG. 10, there is shown an exemplary multilevel correlated magnetic system 1000 that comprises a first correlated magnetic structure 1002a and a second magnetic structure 1002b. The first correlated magnetic structure 1002a is divided into an outer portion 1004a and an inner portion 1006a. Similarly, the second correlated magnetic structure 1002b is divided into an outer portion 1004b and an inner portion 1006b. The outer portion 1004a of the first correlated magnetic structure 1002a and the outer portion 1004b of the second correlated magnetic structure 1002b each have one or more magnetic sources having positions and polarities that are coded in accordance with a first code corresponding to a first spatial force function. The inner portion 1006a of the first correlated magnetic structure 1002a and the inner portion 1006b of the second correlated magnetic structure 1002b each have one or more magnetic sources having positions and polarities that are coded in accordance with a second code corresponding to a second spatial force function.

Under one arrangement, the outer portions 1004a, 1004b each comprise a plurality of magnetic sources that are complementary coded so that they will produce an attractive force when their complementary (i.e., opposite polarity) source pairs are substantially aligned and which have a sharp attractive force versus separation distance (or throw) curve, and the inner portions 1006a, 1006b also comprise a plurality of magnetic sources that are anti-complementary coded such that they produce a repulsive force when their anti-complementary (i.e., same polarity) source pairs are substantially aligned but have a broader, less sharp, repulsive force versus separation distance (or throw) curve. As such, when brought into proximity with each other and substantially aligned the first and second correlated magnetic field structures 1002a, 1002b will have a snap behavior whereby their spatial forces transition from a repulsive force to an attractive force. Alternatively, the inner portions 1006a, 1006b could each comprise multiple magnetic sources having the same polarity orientation or could each be implemented using just one magnetic source in which case a similar snap behavior would be produced.

Under another arrangement, the outer portions 1004a, 1004b each comprise a plurality of magnetic sources that are anti-complementary coded so that they will produce a repulsive force when their anti-complementary (i.e., same polarity) source pairs are substantially aligned and which have a sharp repulsive force versus separation distance (or throw) curve, and the inner portions 1006a, 1006b also comprise a plurality of magnetic sources that are complementary coded such that they produce an attractive force when their complementary (i.e., opposite polarity) source pairs are substantially aligned but have a broader, less sharp, attractive force versus separation distance (or throw) curve. As such, when brought into proximity with each other and substantially aligned the first and second correlated magnetic field structures 1002a, 1002b will have a contactless attachment behavior where they achieve equilibrium at a transition distance where their spatial forces transition from an attractive force to a repulsive force. Alternatively, the outer portions 1004a, 1004b could each comprise multiple magnetic sources having the same polarity orientation or could each be implemented using just one magnetic source in which case a similar contactless attachment behavior would be produced.

For arrangements where both the outer portions 1004a, 1004b and the inner portions 1006a, 1006b comprise a plurality of coded magnetic sources, there can be greater control over their response to movement due to the additional correlation. For example, when twisting one correlated magnetic structure relative to the other, the long range portion can be made to de-correlate at the same or similar rate as the short rate portion thereby maintaining a higher accuracy on the lock position. Alternatively, the multilevel correlated magnetic system 1000 may use a special configuration of non-coded magnetic sources as discussed in detail below with respect to FIGS. 18A-18F.

Figure 11:
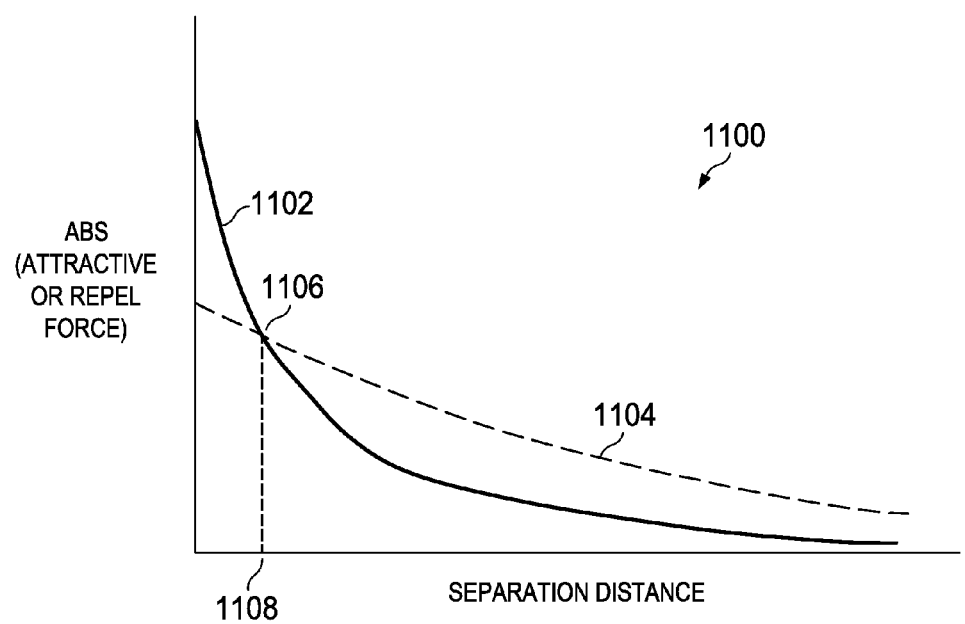
FIG. 11 depicts a multilevel transition distance determination plot.

FIG. 11 depicts a multilevel transition distance determination plot 1100, which plots the absolute value of a first force versus separation distance curve 1102 corresponding to the short range portions of the two correlated magnetic structures 1002a, 1002b making up the multilevel magnetic field structure 1000, and the absolute value of a second force versus separation distance curve 1104 corresponding to the long range portions of the two correlated magnetic structures 1002a, 1002b. The two curves cross at an transition point 1106, which while the two correlated magnetic structures 1002a, 1002b approach each other corresponds to a transition distance 1108 at which the two correlated magnetic structures 1002a, 1002b will transition from a repel mode to an attract mode or from an attract mode to a repel mode depending on whether the short range portions are configured to attract and the long range portions are configured to repel or vice versa.

Figure 12:
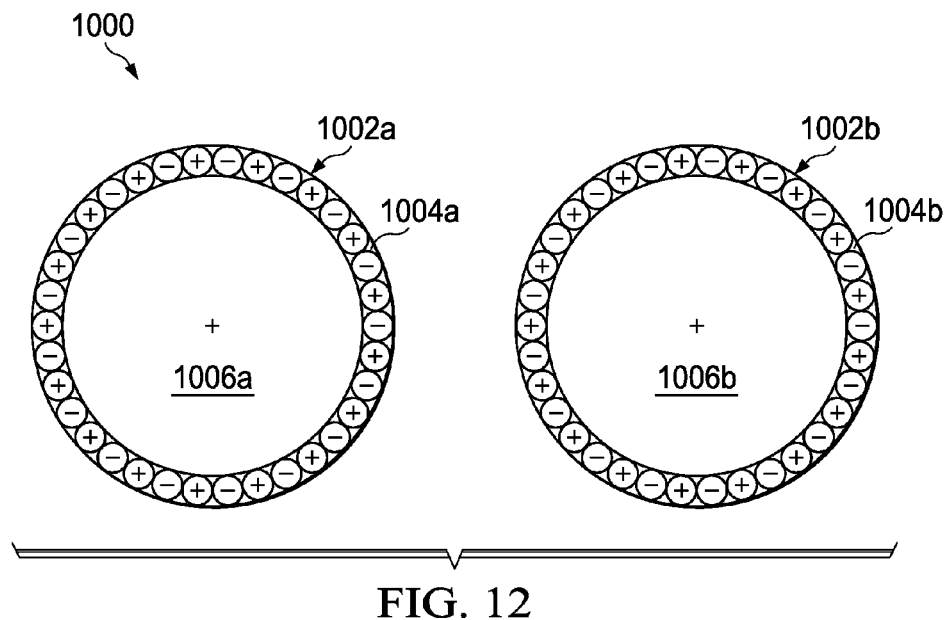
FIG. 12 depicts a multilevel correlated magnetic system in accordance with an embodiment of the present invention.

FIG. 12 depicts an exemplary embodiment of a multilevel magnetic field structure 1000 having first and second correlated magnetic structures 1002a, 1002b that each have outer portions 1004a, 1004b having magnetic sources in an alternating positive-negative pattern and each have inner portions 1006a, 1006b having one positive magnetic source. As such, the first and second magnetic field structures 1002a, 1002b are substantially identical. Alternatively, the coding of the two correlated magnetic structures 1002a, 1002b could be complementary yet not in an alternating positive-negative pattern in which case the two structures 1002a, 1002b would not be identical.

Figure 13A:
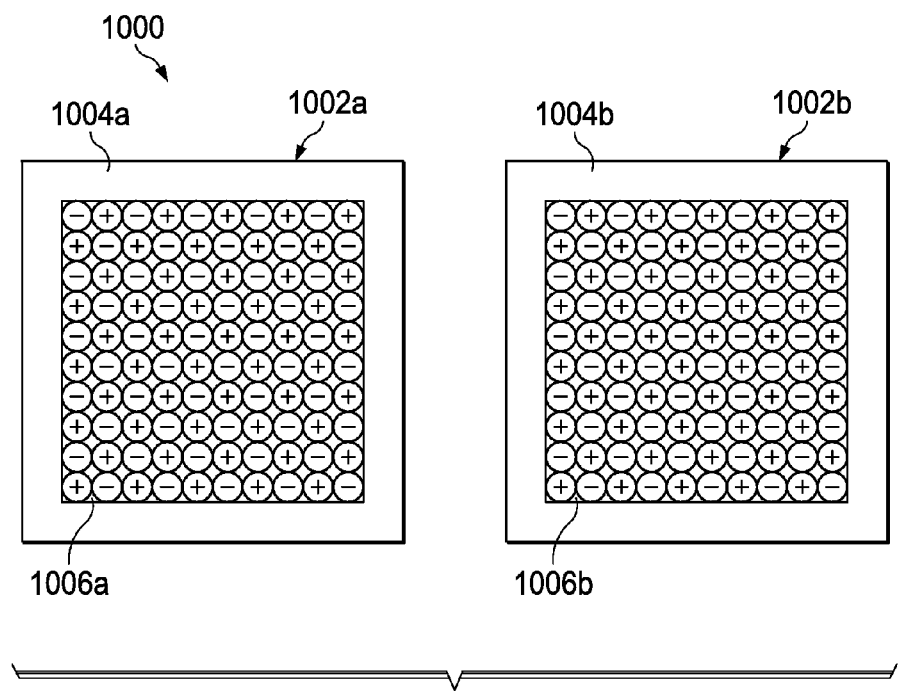
FIG. 13A depicts a multilevel correlated magnetic system in accordance with an embodiment of the present invention.

FIG. 13A depicts yet another embodiment of a multilevel magnetic field structure 1000 having first and second correlated magnetic structures 1002a, 1002b that each have inner portions 1006a, 1006b having magnetic sources in an alternating positive-negative pattern and each have outer portions 1004a, 1004b having one negative magnetic source. As such, the first and second magnetic field structures 1002a, 1002b are identical but can be combined to produce a short range attractive force and a long range repulsive force.

FIG. 13B depicts and alternative to the correlated magnetic structure 1002b of FIG. 13A which is almost the same except the outer portion 1004b has a positive polarity. The two correlated magnetic structures 1002a, 1002b can be combined to produce a short range repulsive force and a long range attractive force.

FIG. 13C depicts yet another alternative to the correlated magnetic structure 1002a of FIG. 13A, where the correlated magnetic structure 1002a is circular and the coding of the inner portion 1006a does not correspond to an alternating positive-negative pattern. To complete the multilevel magnetic field system 1000, a second circular correlated magnetic structure 1002b would be used which has an inner portion 1006b having complementary coding and which has a outer portion 1006b having the same polarity as the outer portion 1006a of the first circular correlated magnetic field structure 1002a.

FIGS. 14A and 14B provide different views of a first object 1400 and a second object 1402 being attached without contact due to the contactless attachment achieved by three different multilevel devices 1000 each comprising first and second correlated magnetic structures 1002a, 1002b. One skilled in the art will recognize that one multilevel structure 100 or two or more multilevel structures 100 can be employed to provide contactless attachment between two objects 1400,1402. In fact, one aspect of the present invention is that it can be used to control position of an object 1400 relative to another object 1402 without contact between the two objects 1400, 1402.

As discussed above, multiple multi-level correlated magnetic systems 1000 can be used together to provide contactless attachment of two objects 1400, 1402. For example, three or more such structures can be employed to act like magnetic "invisible legs" to hold an object in place above a surface. Similarly, two or more "snap" implementations can be used to hold an object to another object. For example, four snap multi-level structures placed in four corners of a tarp might be used to cover a square opening. Generally, different combinations of contactless attachment structures and snap structures can be combined. For example, a snap structure might secure an object to the end of a rotating shaft and contactless attachment structures could be used to maintain separation between an object being rotated over another surface. Specifically, a first circular band-like multi-level correlated magnetic structure on a bottom surface or a top surface could interact with another circular band-like multi-level correlated magnetic structure on the opposing surface or even a smaller arch (i.e., subset of one of the bands) could be used on one of the surfaces.

Under another arrangement, the "contactless" multi-level correlated magnetic system 1000 can be used as a magnetic spring or shock absorber. Such magnetic springs could be used in countless applications where they would absorb vibrations, prevent damage, etc. In particular the dissipative element of a shock absorber may be created by positioning a conductor in the magnetic field and allowing the creation of shorted eddy currents due to its motion to damp the oscillation.

Under yet another arrangement, the "contactless" multi-level correlated magnetic system 1000 can be used to make doors and drawers that are quiet since they can be designed such that doors, cabinet doors, and drawers will close and magnetically attach yet not make contact.

Under another arrangement, the "contactless" multi-level correlated magnetic system 1000 can be used for child safety and animal proof devices which require a child or animal to overcome, for example by pushing or pulling an object, a repel force before something engages. If desired, the new devices can have forms of electrical switches, mechanical latches, and the like where the repel force can be prescribed such that a child or animal would find it difficult to overcome the force while an adult would not. Such devices might optionally employ a spacer to control the amount of attractive force (if any) that the devices could achieve.

Generally, correlated magnetic structures can be useful for assisting blind people by enabling them to attach objects in known locations and orientations making them easier to locate and manipulate. Unique coding could also provide unique magnetic identifications of objects such that placing an object in the wrong location would be rejected (or disallowed).

Generator devices can be designed to incorporate the "contactless" multi-level correlated magnetic system 1000 and work with slow moving objects, for example, a wind mill, without requiring the gears currently being used to achieve adequate power generation.

One application that can incorporate the "contactless" multi-level correlated magnetic system 1000 is an anti-kick blade release mechanism for a saw whereby when a blade bites into an object, e.g., wood, such that it would become locked and would otherwise kick the blade up and/or the object out, the blade would disengage. The saw would automatically turn off upon this occurrence.

Another application of the "contactless" multi-level correlated magnetic system 1000 is with flying model aircraft which would allow portions such as wings to be easily attached to enable flying but easily detached for storage and transport.

Below are some additional ideas for devices incorporating the "contactless" multi-level correlated magnetic system 1000 technology:

Patient levitation beds based on magnetic repulsion to reduce and/or eliminate bedsores during hospital stays. Magnets would be built into a patient carrier which would then be supported and held in place by corresponding magnets on the bed.

Patient gurney which uses correlated magnets to lock it into place inside the ambulance. Replaces conventional locks which are subject to spring wear, dirt, corrosion, etc.

Patient restraining device using correlated magnets. Could use keyed magnets on patient clothing and corresponding magnets on a chair, etc.

Engine or motor mounts which use multi-level contactless attachment devices to reduce or eliminate vibration.

Easily removable seat pads.

Boot/shoe fasteners to eliminate strings or Velcro.

Self-aligning hitch for trailers.

Elevator door lock to replace conventional mechanical locks.

Keyed magnet spare tire mount.

Interchangeable shoe soles (sports shoes, personal wear, etc.)

Light bulb bases to replace screw mounts.

Oven rotisserie using slow-motor technology.

Kitchen microwave rotating platform using slow-motor technology.

No-contact clutch plate, eliminating wearable, friction plates.

Longer-lasting exercise bike using variable opposing magnets (eliminating friction-based components).

Purse clasp.

Keyed gate latch.

Using linear magnets to stop runaway elevators or other mechanical devices.

Figure 15A:
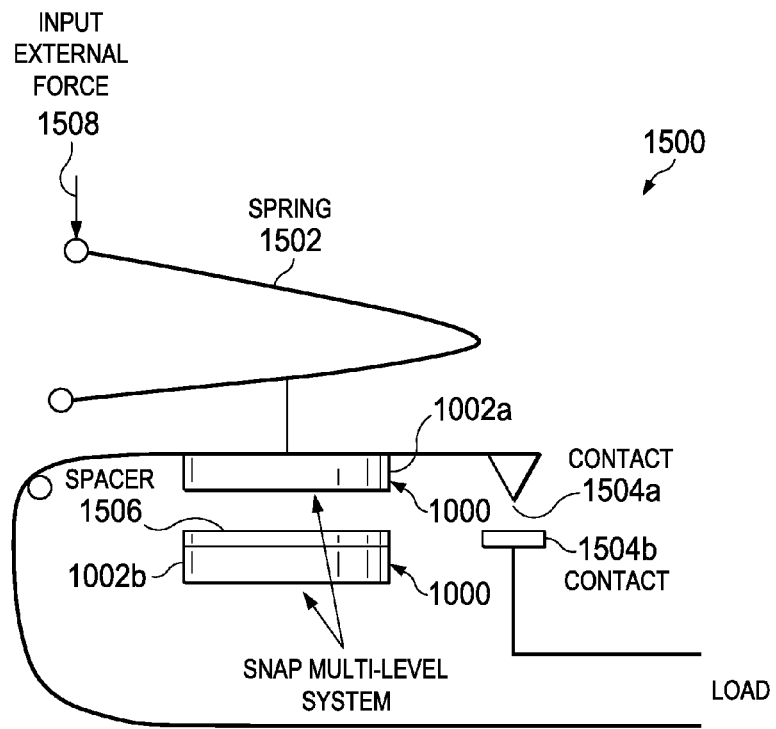
FIG. 15A depicts a momentary snap switch in accordance with an embodiment of the present invention.
Figure 15B:
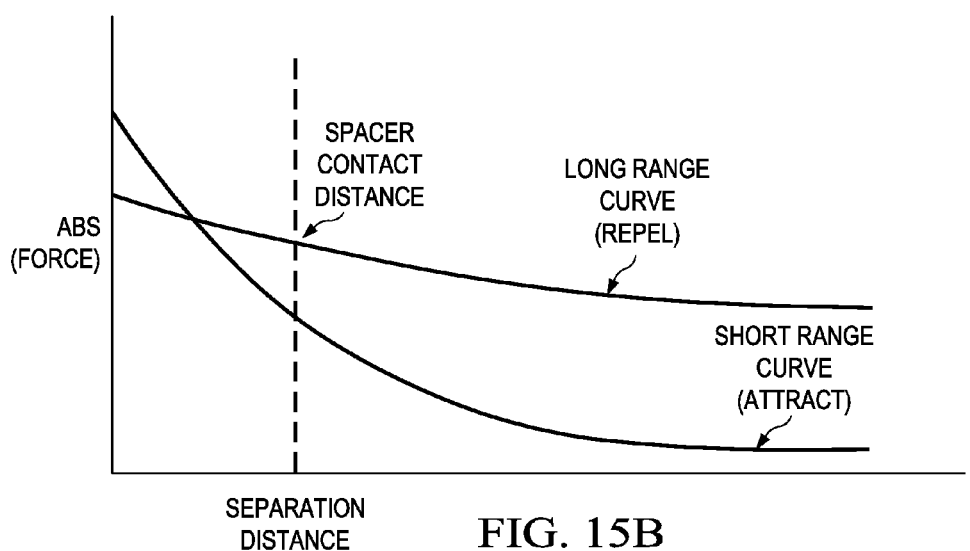
FIG. 15B depicts the transition distance determination plot for the snap switch of FIG. 15A.
Figure 15C:
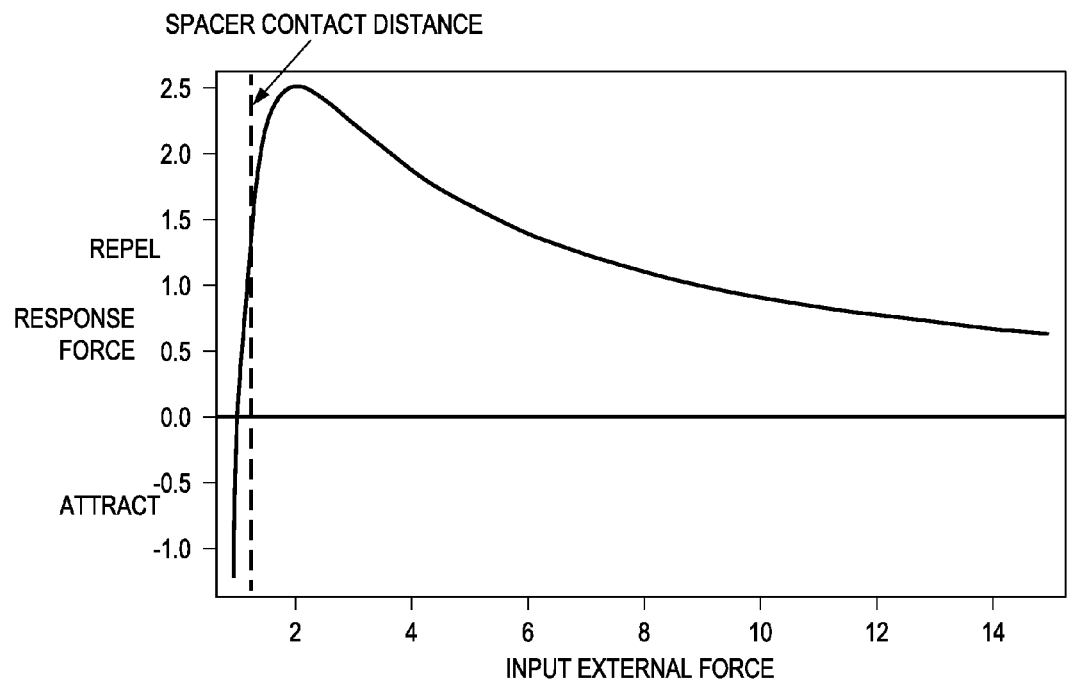
FIG. 15C depicts the force law curve of the snap switch of FIG. 15A.

Referring to FIGS. 15A-15B, there is illustrated yet another arrangement where the "snap" multi-level correlated magnetic system 1000 can be used to produce a momentary snap switch 1500 in accordance with an embodiment of the present invention. As depicted in FIG. 15A, the exemplary momentary snap switch 1500 comprises a spring 1502, two contacts 1504*a* and 1504*b*, a spacer 1506 and a snap multi-level correlated magnetic system 1000. The purpose of the spacer 1506 is to prevent the components 1002*a* and 1002*b* of the snap multi-level correlated magnetic system 1000 from contacting, thereby keeping the net force repulsive. FIGS. 15B and 15C illustrate the purpose of the spacer 1506, where FIG. 15B depicts the absolute value of the attractive and repulsive force curves of the snap multi-level correlated magnetic system 1000 with respect to the separation of the correlated magnetic structures 1002*a*, 1002*b*, and FIG. 15C depicts the sum of the attractive and repulsive force curves of the snap multi-level correlated magnetic system 1000 plotted as the input external force on the X axis vs. the snap multi-level correlated magnetic system 1000 response force on the Y axis. Referring to FIG. 15B, the spacer 1506 keeps the two correlated magnetic structures 1002*a*, 1002*b* from contacting and prevents the snap multi-level correlated magnetic system 1000 from transitioning into the attractive regime, which prevents the correlated magnetic structures 1002*a*, 1002*b* from sticking when the external force is removed. Referring to FIG. 15C, the spacer contact distance is some location between the peak repel force and the transition point which is between the attractive and repulsive regimes. One skilled in the art will recognize that multiple configurations and various approaches are possible for preventing the snap multi-level correlated magnetic system 1000 from transitioning into the attractive regime.

Figure 15D:
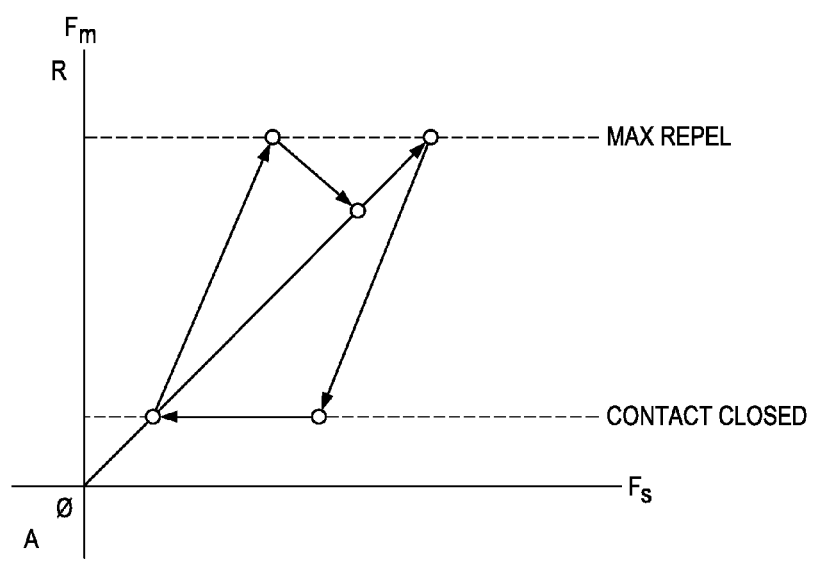
FIG. 15D depicts the hysteresis of the magnetic forces of the momentary snap switch of FIG. 15A in accordance with an embodiment of the present invention.

The hysteresis of the momentary snap switch 1500 can be described relative to FIG. 15D. As the spring 1502 is compressed by an external force 1508 it brings the correlated magnetic structures 1002*a*, 1002*b* closer together. This is illustrated by travelling up the 45 degree line in FIG. 15D. The external force 1508 needed to compress the snap multi-level correlated magnetic system 1000 increases until at a certain distance the force begins to decrease with further compression. This creates an instability that causes the snap multi-level correlated magnetic system 1000 to accelerate closure until the contacts 1504*a*, 1504*b* are closed. At that point, the snap multi-level correlated magnetic system 1000 requires only a small holding force to keep the contacts 1504*a*, 1504*b* closed and the compressed spring 1502 easily supplies that force. When the external force 1508 on the spring 1502 is relaxed the contacts 1504*a*, 1504*b* remain closed until another critical point at which the spring 1502 force is equal to the snap multi-level correlated magnetic system 1000 repel force. At that point, the snap multi-level correlated magnetic system 1000 begins to accelerate open until they reach the maximum force point and then begins to decrease, compressing the spring 1502 against the external force 1508. The contacts 1504*a*, 1504*b* then are apart by an amount that causes the repel force and the external force (spring force) to be equal. The cycle can be repeated by then re-compressing the spring 1502. This latter transient behavior is shown in FIG. 15D by the top two arrows as they approach the stable position on the 45 degree line.

FIG. 16 is a diagram that depicts the force vs. position relationship between the spring 1502 and the two magnets 1002*a*, 1002*b* making up the snap correlated magnetic structure 1000 of the momentary snap switch 1500 of FIG. 15A.

Figure 17A:
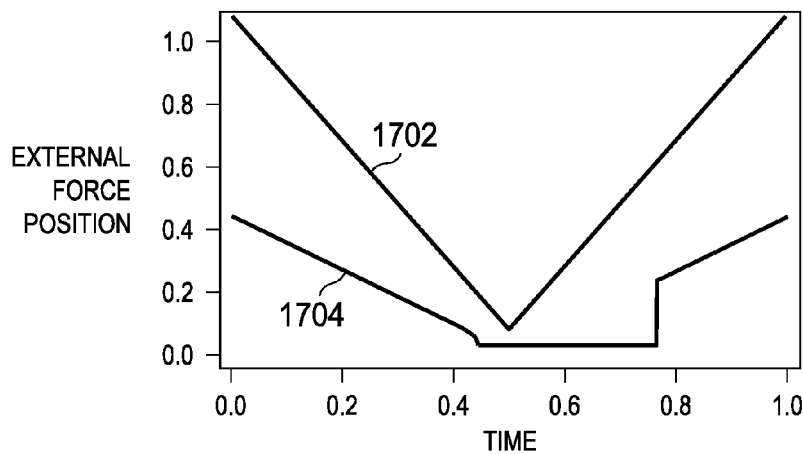
FIG. 17A depicts the external force position versus the magnet position of the snap switch as an external force is applied to the snap switch of FIG. 15A and then released.

FIG. 17A depicts the position of the external force 1508 versus the position of the correlated magnetic structure 1002*a* of the momentary snap switch 1500 as the external force 1508 is applied over a period of time to the momentary snap switch 1500 of FIG. 15A and then released. Referring to FIG. 17A, the position of an external force 1508 (e.g., a finger) applied to the momentary snap switch 1500 is shown by a first curve 1702, where the external force 1508 moves from a first position corresponding to when the momentary snap switch 1500 is in the open position to a second position corresponding to when the momentary snap switch 1500 is in a closed position and then returns to the first position as the external force 1508 is removed from the momentary snap switch 1500. One skilled in the art will recognize that the external force 1508 could be applied by any object, for example, a piece of automated equipment. The position of the correlated magnetic structure 1002*a* shown with a second curve 1704 can be described in relation to the first curve 1702. Referring to the two curves 1702, 1704, the correlated magnetic structure 1002*a* begins at its open position and moves closer to the second correlated magnetic structure 1002*b* as the external force 1508 depresses the spring 1502 and presses down on the momentary snap switch 1500. Initially, the correlated magnetic structure 1002*a* moves linearly relative to the movement of the external force 1508 since the spring 1502 and correlated magnetic structure 1002*a* are essentially pushing against each other because the snap multi-level correlated magnetic system 1000 is in a repel state (or mode). When approaching a transition distance the snap multi-level correlated magnetic system 1000 begins to transition from a repel state to an attractive state. As its force law goes from a peak repulsive force and begins to go towards a zero force the external force 1508 applied to the spring 1502 is encountering less and less repulsive force causing the correlated magnetic structure 1002*a* to move rapidly downward until the spacer 1506 stops the correlated magnetic structure 1002*a* from moving closer to the other correlated magnetic structure 1002*b*. Its position remains the same until the external force 1508 position has moved sufficiently away from the switch's closed position and towards the switch's open position such that the correlated magnetic structure 1002*a* is repelled away from the spacer 1506, which corresponds to the abrupt rise in the second curve 1704. The correlated magnetic structure 1002*a* then moves linearly as the external force 1508 is removed from the momentary snap switch 1500 until the snap multi-level correlated magnetic system 1000 is again at its open position.

Figure 17B:
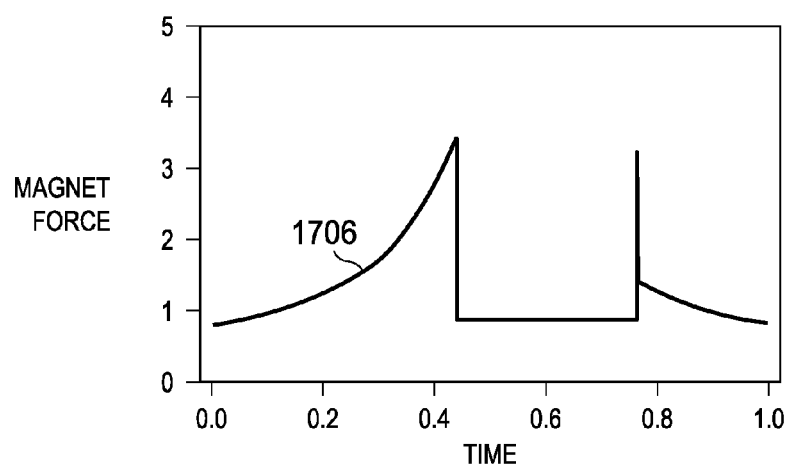
FIG. 17B depicts the magnet force as an external force is applied to the snap switch of FIG. 15A and then released.

FIG. 17B depicts the magnet force as the external force 1508 is applied to the momentary snap switch 1500 of FIG. 15A and then released. Referring to FIG. 17B, the magnet force as shown by a curve 1706 that begins at a minimum repulsive force that occurs when the snap multi-level correlated magnetic system 1000 is in its open position. As the external force 1508 is applied the magnet force increases until the correlated magnetic structure 1002*a* begins to approach the transition distance when it begins to transition from a repel state to an attractive state. As its force law goes from a peak repulsive force and begins to go towards a zero force, the external force 1508 applied to the spring 1502 is encountering less and less repulsive force causing the correlated magnetic structure 1002*a* to move rapidly downward until the spacer 1506 stops it from moving closer to the other correlated magnetic structure 1002*b*. The magnet force is maintained until the position of the external force 1508 has moved sufficiently away from the switch's closed position and towards the switch's open position such that the correlated magnetic structure 1002*a* is repelled away from the spacer 1506, which corresponds to the abrupt rise in the second curve 1706. The correlated magnetic structure 1002*a* repels and the force increases until it is pushed downward by the spring 1502 and thereafter they achieve equilibrium. The magnet force then reduces as the external force 1508 is removed until the magnet force is again at the minimum repulsive force corresponding to its open position.

Figure 17C:
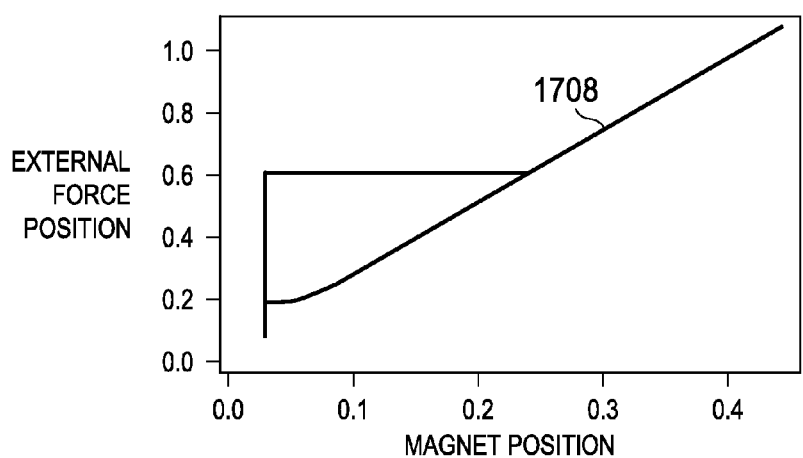
FIG. 17C depicts the magnet position versus external force position as an external force is applied to the snap switch of FIG. 15A and then released.

FIG. 17C depicts the position of the correlated magnetic structure 1002*a* versus the position of the external force 1508 as the external force 1508 is applied to the momentary snap switch 1500 of FIG. 15A and then released. Referring to FIG. 17C and a curve 1708, the correlated magnetic structure 1002*a* and external force 1508 begin at a first position corresponding to the switch's open position, which is in the upper right of the plot. The curve 1708 moves linearly as the external force 1508 is applied since the correlated magnetic structure 1002*a* and spring 1502 are in equilibrium (i.e., pushing against each other). As the correlated magnetic structure 1002*a* begins to approach the transition distance when it begins to transition from a repel state to an attractive state its force law goes from a peak repulsive force and begins to go towards a zero force. At this time, the external force 1508 applied to the spring 1502 is encountering less and less repulsive force causing the correlated magnetic structure 1002*a* to move rapidly downward while the external force 1508 position is at the same location until the spacer 1506 stops the correlated magnetic structure 1002*a* from moving closer to the other correlated magnetic structure 1002*b*. The correlated magnetic structure 1002*a* remains in the same position while the external force 1508 is applied until the snap multi-level correlated magnetic system 1000 reaches its closed position and the correlated magnetic structure 1002*a* continues to remain in the same position until the external force 1508 position has moved sufficiently away from the switch's closed position and towards the switch's open position such that the correlated magnetic structure 1002*a* is repelled away from the spacer 1506, which corresponds to the abrupt right turn in the curve 1708. The correlated magnetic structure 1002*a* and the spring 1502 again achieve equilibrium and then move linearly until they have reached the upper right location in the plot that corresponds to the switch's open position.

FIGS. 18A-18F depict alternative arrangements for snap multi-level correlated magnetic systems 1000 that can be used in accordance with the momentary snap switch 1500 of FIG. 15A. Very importantly, the relative sizes and the field strengths of the correlated magnetic structures 1002a and 1002b of the snap multi-level correlated magnetic systems 1000 of FIGS. 18A-18F are configured to produce hysteresis properties corresponding to desired operational characteristics of the momentary snap switch 1500 of FIG. 15A. Additionally, although they are described in relation to the snap-repel magnetic structures used in the momentary snap switch 1500 of FIG. 15A, one skilled in the art will recognize that, as described above, the multi-level correlated magnetic systems 1000 can be alternatively configured to have contactless attachment behavior.

Figure 18A:
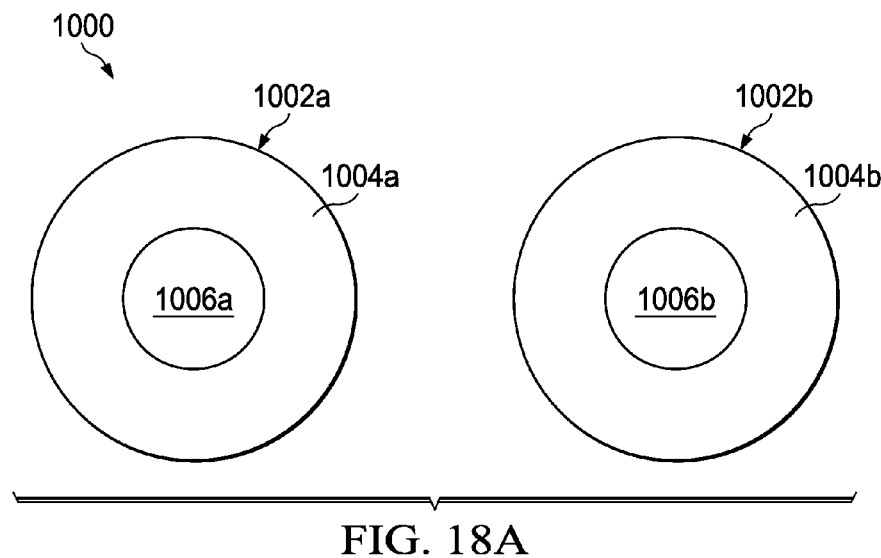
FIGS. 18A-18F depict alternative arrangements for multilevel systems in accordance with an embodiment of the present invention.

Referring to FIG. 18A, the multi-level magnetic systems 1000 includes a first magnetic structure 1002a and a second magnetic structure 1002b. The first magnetic structure comprises a first outer portion 1004a and a first inner portion 1006a and the second magnetic structure 1002b comprises a second outer portion 1004b and a second inner portion 1006b. The first and second outer portions 1004a and 1004b have magnetic sources having the opposite polarity so they will produce an attractive force. The first and second inner portions 1006a and 1006b have magnetic sources having the same polarity so they will produce a repulsive force. Under one arrangement, a positive magnetic source is magnetized in the first inner portion 1006a of the positive side of a conventional magnet 1002a and a positive magnetic source is magnetized in the second inner portion 1006b of a negative side of a conventional magnet 1002b. Under an alternative arrangement, a negative magnetic source is magnetized in the first inner portion 1006a of the positive side of a conventional magnet 1002a and a negative magnetic source is magnetized in the second inner portion 1006b of a negative side of a conventional magnet 1002b. Under another arrangement, a positive magnetic source is magnetized in the first inner portion 1006a and a negative source is magnetized in the first outer portion 1004a of the first magnetic structure 1002a, and a positive magnetic source is magnetized in the second inner portion 1006b and a positive source is magnetized in the second outer portion 1004a of the second magnetic structure 1002b. Under yet another arrangement, a negative magnetic source is magnetized in the first inner portion 1006a and a positive source is magnetized in the first outer portion 1004a of the first magnetic structure 1002a, and a negative magnetic source is magnetized in the second inner portion 1006b and a negative source is magnetized in the second outer portion 1004a of the second magnetic structure 1002b.

Figure 18B:
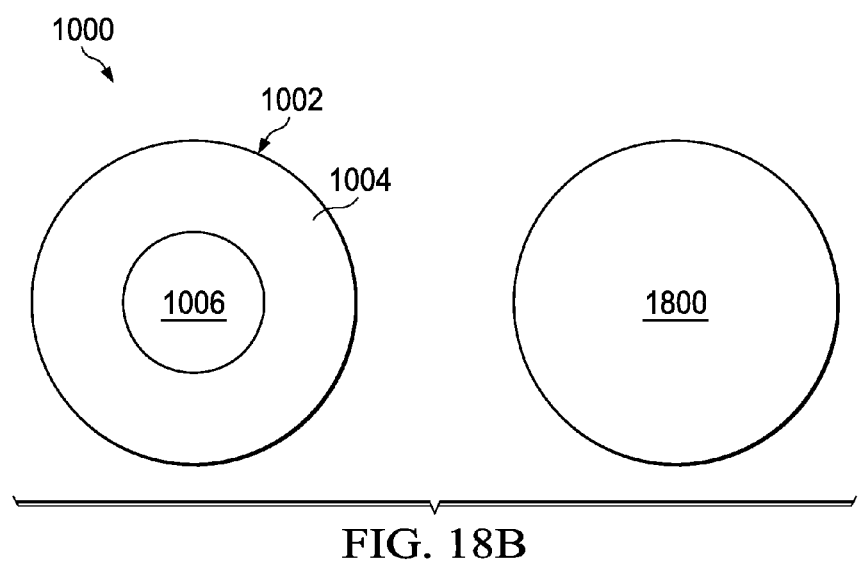

Referring to FIG. 18B, a multi-level magnetic system 1000 includes a magnetic structure 1002 and a conventional magnet 1800 having a first polarity on one side and a second polarity on its other side that is opposite the first polarity. The magnetic structure 1002 comprises an outer portion 1004 and an inner portion 1006. Under one arrangement, the first polarity of the conventional magnet 1800 is a positive polarity and the inner portion 1006 of the magnetic structure 1002 is magnetized to have a positive polarity while the outer portion 1004 of the magnetic structure 1002 is magnetized to have a negative polarity. Under another arrangement, the magnetic structure 1002 is initially a second conventional magnet having the opposite polarity as the first conventional magnet 1800 but the inner portion 1006 of the magnetic structure 1002 is then magnetized to have the same polarity as the first conventional magnet 1800. As such, when the depicted sides of the magnetic structure 1002 and the conventional magnet 1800 are brought together they will produce the multi-level repel and snap behavior.

Figure 18C:
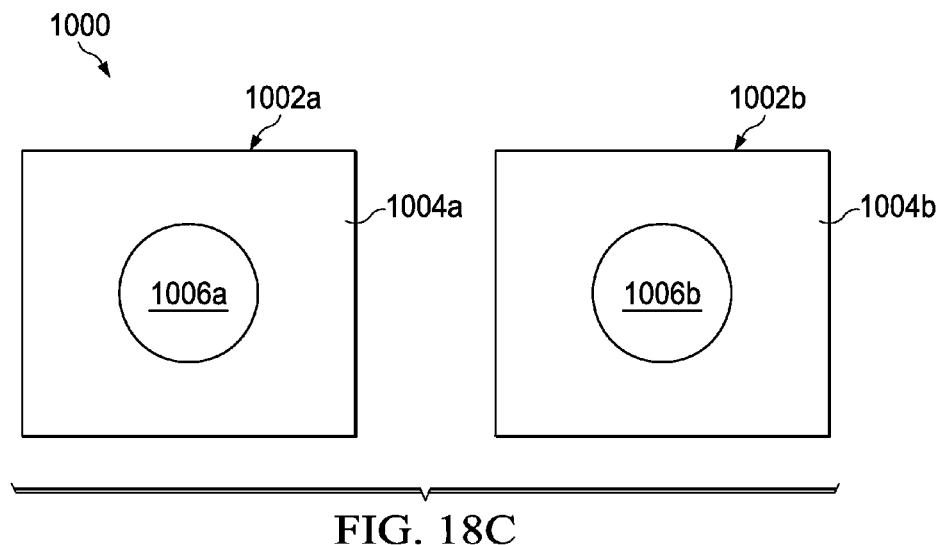
Figure 18D:
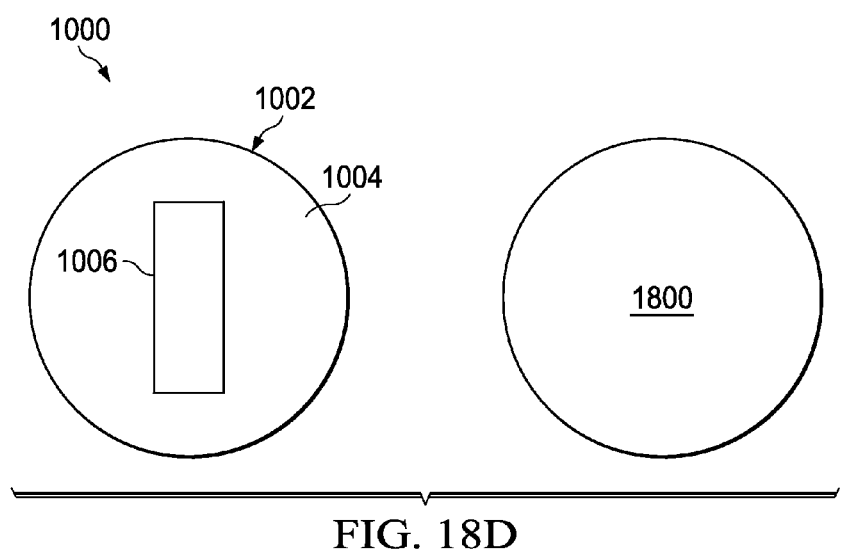
Figure 18E:
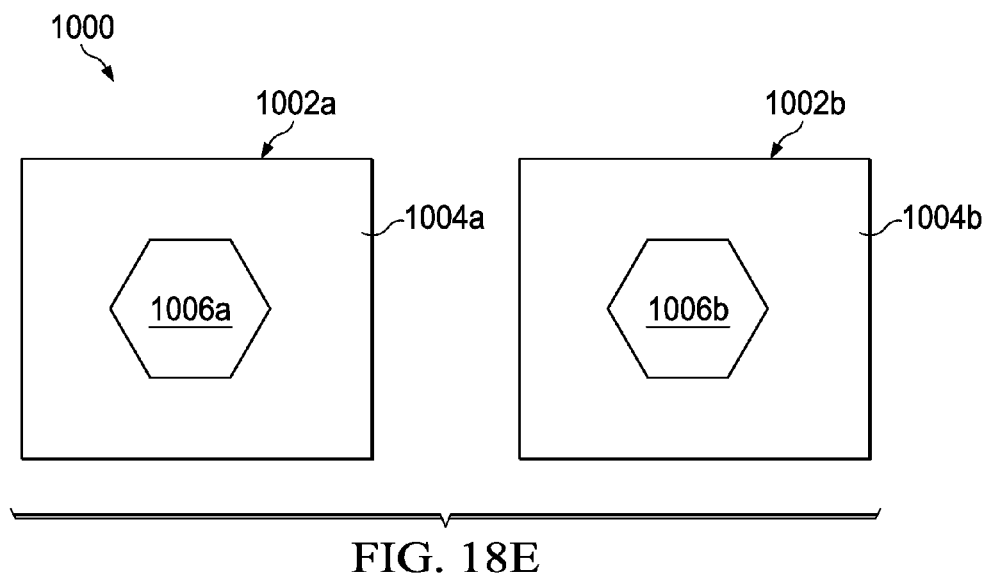
Figure 18F:
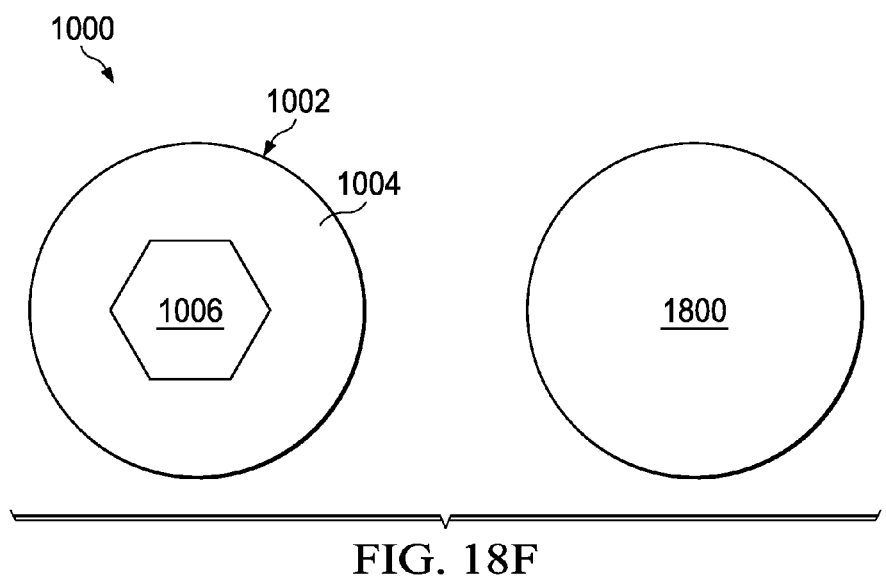

FIGS. 18C-18F are intended to illustrate that different shapes can be used for the magnetic structures 1002, 1002a, 1002b, 1004a, 1004b, 1800 as well as the inner portions 1006, 1006a, 1006b and outer portions 1004, 1004a, 1004b of the magnetic structures 1002, 1002a, 1002b, 1004a, 1004b, 1800 that make up a multi-level magnetic system 1000. In FIG. 18C, the magnetic structures 1002a 1002b are rectangular and the inner portions 1006a 1006b are circular. In FIG. 18D, the inner portion 1006 of the magnetic structure 1002 is rectangular. In FIGS. 18E and 18F, the inner portions 1006, 1006a have a hexagonal shape. Generally, one skilled in the art will recognize that many different variations of first portions and second portions of two magnetic structures can be employed to include portions that are next to each other and not nested so that there is an inner and outer portion. For example, side-by-side stripes having different strengths could be employed.

Figure 19A:
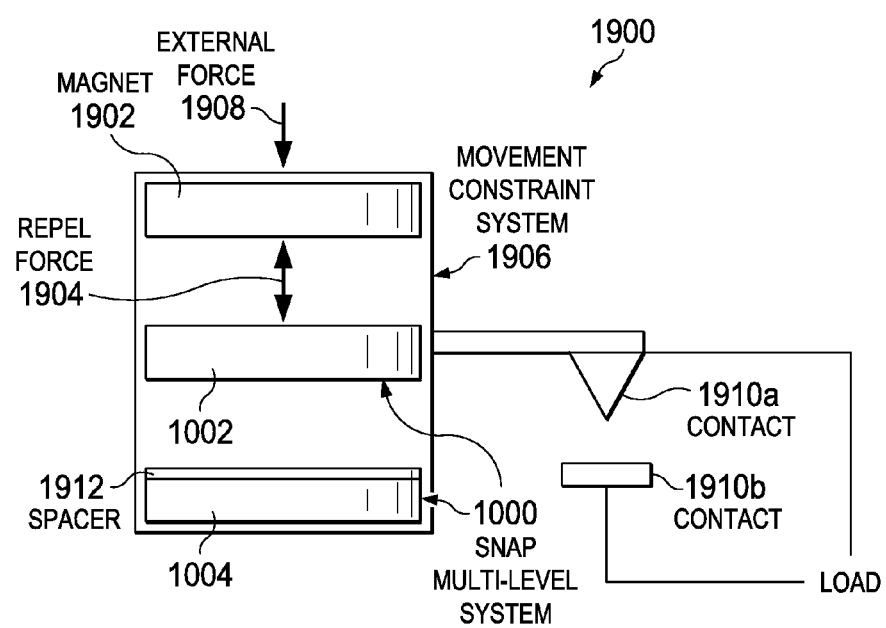
FIG. 19A depicts an alternative momentary switch where the spring of FIG. 15A is replaced by a magnet configured to produce a repel force in accordance with an embodiment of the present invention.

FIG. 19A depicts an alternative exemplary momentary snap switch 1900 where the spring 1502 of FIG. 15A is replaced by a magnet 1902 configured to produce a repel force 1904 with the correlated magnetic structure 1002a. Referring to FIG. 19A, the momentary snap switch 1900 employs two magnets 1002 and 1004 (e.g., correlated magnetic structures 1002a, 1002b) configured to function as a snap multi-level system 1000 and an upper magnet 1902 configured to produce a repel force with magnet 1002. The three magnets 1002, 1004, 1902 are constrained within a movement constraint system 1906 that only allows up and down movement of the upper magnet 1902 and the middle magnet 1002. In addition, the momentary snap switch 1900 employs two contacts 1910a and 1910b where contact 1910a is associated with magnet 1002 and contact 1910b is associated with magnet 1004. Furthermore, the momentary snap switch 1900 employs a spacer 1912 attached to magnet 1004 where the purposed of the spacer 1912 is to prevent the components of the snap multi-level magnetic system 1000 from contacting, thereby keeping the net force repulsive. The spacer 1912 could instead be attached to magnet 1002. Alternatively, a first spacer 1912 could be attached to magnet 1004 and a second spacer 1912 could be attached to magnet 1002.

Figure 19B:
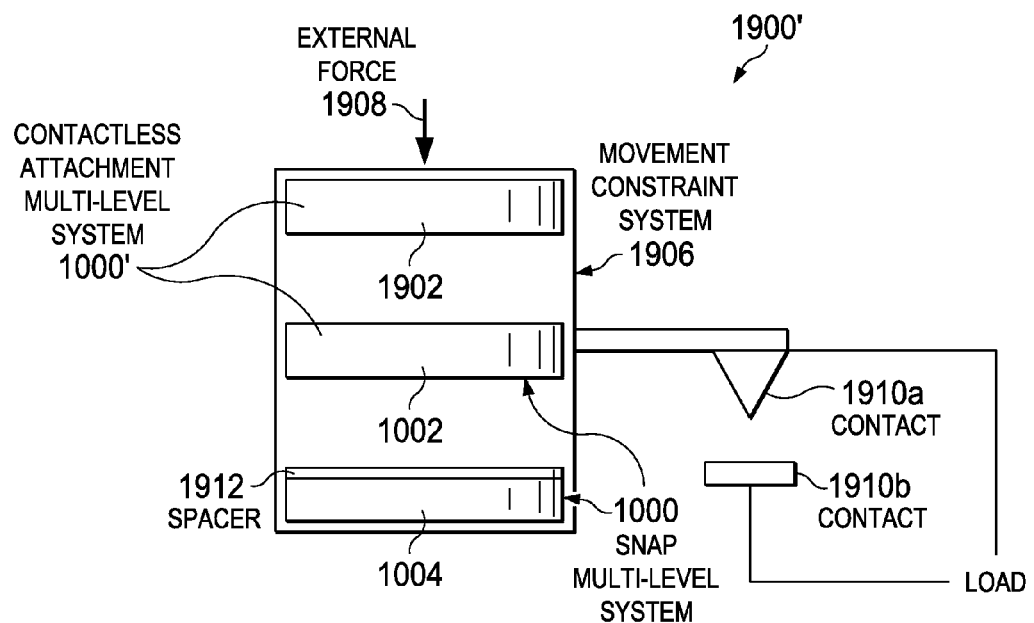
FIG. 19B depict an alternative momentary switch where the spring of FIG. 15A is replaced by a magnet configured to be half of a contactless attachment multi-level system in accordance with an embodiment of the present invention.

In operation, when an external force 1908 is applied to the upper magnet 1902, the repel force between the upper magnet 1902 and the middle magnet 1002 acts similar to the spring 1502 of FIG. 15A, where because the repel force 1904 is greater than the repel force produced between the magnets 1002, 1004 means that the snap multi-level system 1000 will produce substantially the same hysteresis behavior as the spring 1502. However, because only magnetism is employed, the hysteresis behavior should remain unchanged, essentially forever assuming the use of permanent magnets 1002, 1004, 1902. FIG. 19B depicts an alternative momentary switch 1900' where the spring 1502 of FIG. 15A is replaced by a magnet 1902 configured to be half of a contactless attachment multi-level system 1000 where the other half is magnet 1002. One skilled in the art will recognize that the momentary switches 1900 and 1900' in FIGS. 19A and 19B will function the same regardless of the orientation of the device 1900 and 1900' (e.g., it could be turned upside down). As such, the terminology "upper magnet" and "up and down movement" are not intended to be limiting but merely descriptive given the orientation depicted in FIGS. 19A and 19B. Furthermore, one skilled in the art will recognize that the characteristics of the code(s) used to produce the magnetic structures 1002, 1004, 1902 determine the type of translational and rotational constraints required.

Figure 19C:
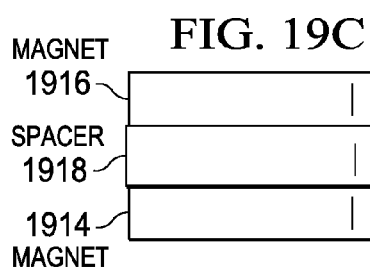
FIG. 19C depicts two magnets and an optional spacer that could be used in place of the middle magnet shown in FIGS. 19A and 19B in accordance with an embodiment of the present invention.

FIG. 19C depicts two magnets 1914, 1916 and an optional spacer 1918 that could be used in place of the middle magnet 1002 shown in FIGS. 19A and 19B.

Figure 20A:
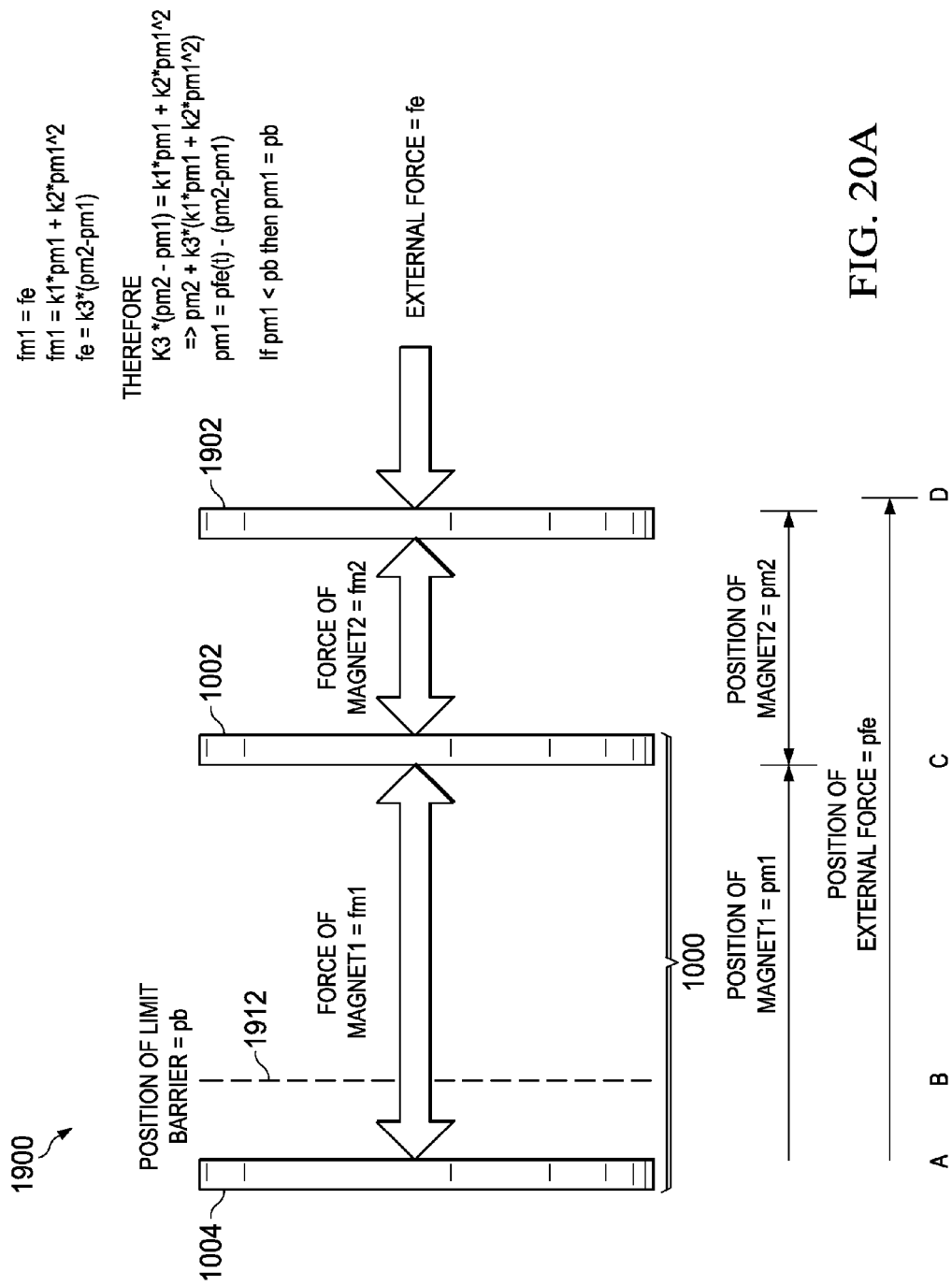
FIG. 20A depicts the force vs. position relationship between the outer magnet and the two magnets of the snap multi-level system in the momentary snap switch of FIG. 19A.

FIG. 20A depicts the force vs. position relationship between the outer magnet 1902 and the two magnets 1002, 1004 of the snap multi-level system 1000 in the momentary snap switch 1900 of FIG. 19A.

Figure 20B:
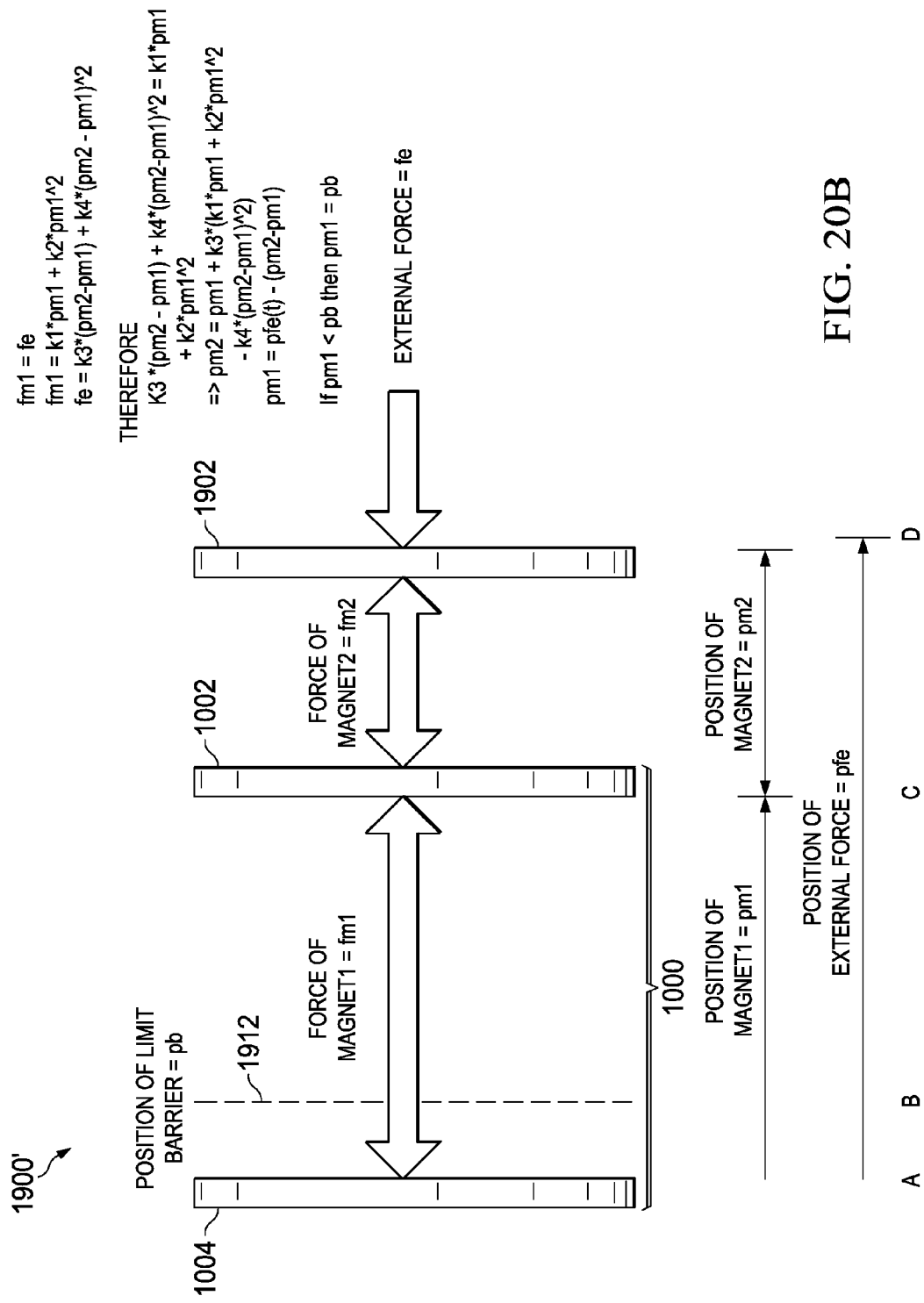
FIG. 20B depicts the force vs. position relationship between the outer magnet and the two magnets of the snap multi-level system in the momentary snap switch of FIG. 19B.

FIG. 20B depicts the force vs. position relationship between the outer magnet 1902 and the two magnets 1002, 1004 of the snap multi-level system 1000 in the momentary snap switch 1900' of FIG. 19B.

FIGS. 21A-21F illustrate an exemplary cylinder 2100 utilizing the momentary snap switch 1900 in accordance with an embodiment of the present invention. FIG. 21A depicts a push button 2102 attached to a first magnet 1902 of the exemplary momentary switch 1900. FIG. 21B depicts a second magnet 1002 having an associated electrical contact 1910a of the exemplary momentary switch 1900. FIG. 21C depicts a third magnet 1004 (supported on a base 2104) of the exemplary momentary switch 1900. FIG. 21D depicts the exemplary cylinder 2100 having an upper lip 2106, a slot 2108, a top hole 2110, and a bottom hole 2112 configured to receive the push button 2102 and first magnet 1902 of FIG. 21A, the second magnet 1002 and contact 1910a of FIG. 21B, and the third magnet 1004 and base 2104 of FIG. 21C. FIG. 21E depicts an assembled cylinder 2100 with the exemplary momentary switch 1900 in its normal open state with the spacer 1912 and contact 1910b positioned in the slot 2108 and on top of the third magnet 1004. FIG. 21F depicts the assembled cylinder 2100 with the exemplary momentary switch 1900 in its closed state.

One skilled in the art will recognize that many different variations of the exemplary momentary switch 1900 used in the exemplary cylinder 2100 of FIGS. 21A-21F are possible for producing different momentary switches, other switches, and other types of devices where repeatable hysteresis behavior is desirable. Variations include different shapes of magnets 1002, 1004, 1902 and different shapes of movement constraining systems 1906 as well as different methods of constraining the magnets 1002, 1004, 1902 included in such devices. For example, ring magnets could be employed that surround a central cylinder as opposed to an outer constraint. Both inner and outer constraint methods could be employed. Any of various types of mechanical devices such as hinges or the like could be used to constrain the magnets. Generally, one skilled in the art could devise numerous configurations to produce such repeatable hysteresis behavior in accordance with the invention.

Figure 22C:
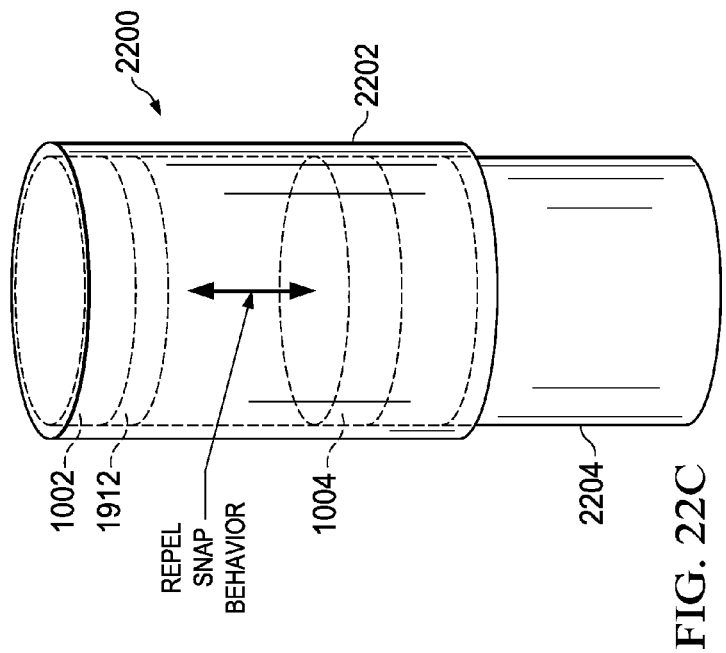
FIG. 22C depicts the assembled first exemplary magnetic cushioning device in accordance with an embodiment of the present invention.
Figure 22A:
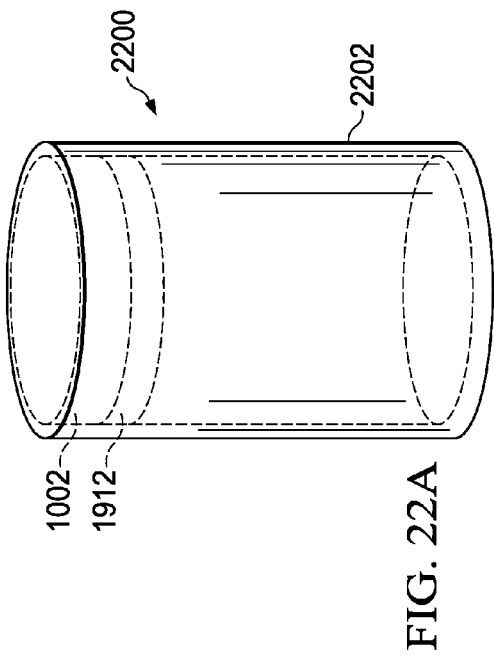
FIG. 22A depicts the female component of a first exemplary magnetic cushioning device in accordance with an embodiment of the present invention.
Figure 22B:
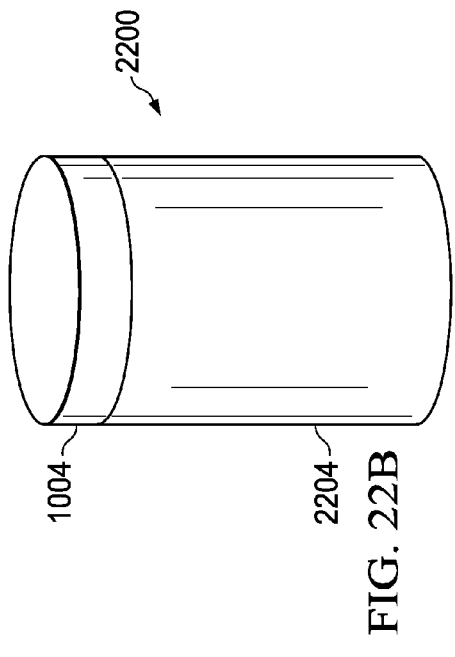
FIG. 22B depicts the male component of the first exemplary magnetic cushioning device in accordance with an embodiment of the present invention.

FIGS. 22A-22C illustrate an exemplary magnetic cushioning device 2200 in accordance with an embodiment of the present invention. FIG. 22A depicts a female component 2202 of the exemplary magnetic cushioning device 2200. FIG. 22B depicts a male component 2204 (e.g., piston 2204) of the exemplary magnetic cushioning device 2202. FIG. 22C depicts the assembled exemplary magnetic cushioning device 2200 wherein the female component 2202 (including magnet 1002 and spacer 1912) is movably positioned over the male component 2204 (including magnet 1004). The magnetic cushioning device 2200 is similar to the bottom portion of the exemplary momentary switch 1900 of FIGS. 21A-22F in that its two magnets 1002 and 1004 and the spacer 1912 produce a multi-level repel snap behavior that has a repeatable hysteresis behavior. However, instead of being a switch, the magnetic cushioning device 2200 of FIGS. 22A-22C does not require circuitry for a switch and instead acts much like a shock absorber that utilizes magnetism instead of a spring. The magnetic cushioning device 2200 can be used for all sorts of applications that use a spring for cushioning including beds such as home beds or hospital beds; seats or backs of chairs in a home, an airplane, a vehicle, a race car, a bus, a train, etc.; shock absorbers for vehicles; bumpers for vehicles; protective shielding for vehicles; and the like. Unlike a spring, however, where the force of the spring continues to increase as an external force is applied, the magnetic cushioning device 2200 exhibits a peak repel force and then a reduction in the repel force as the magnets 1002 and 1004 move together until held apart by the spacer 1912. The spacer 1912 can be attached to either one of the magnets 1002 and 1004.

Figure 23C:
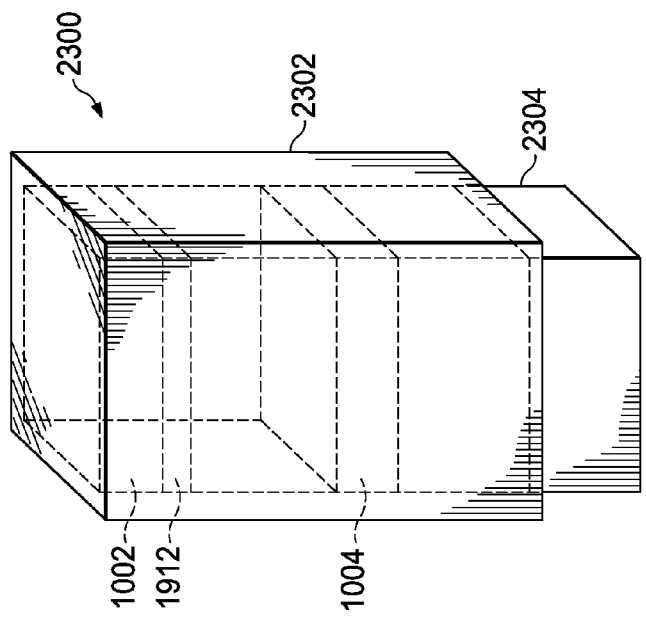
FIG. 23C depicts the assembled second exemplary magnetic cushioning device in accordance with an embodiment of the present invention.
Figure 23A:
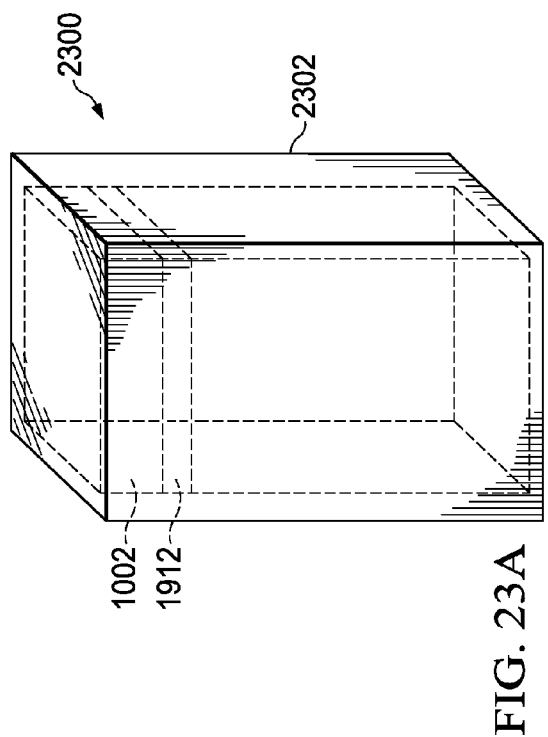
FIG. 23A depicts the female component of a second exemplary magnetic cushioning device in accordance with an embodiment of the present invention.
Figure 23B:
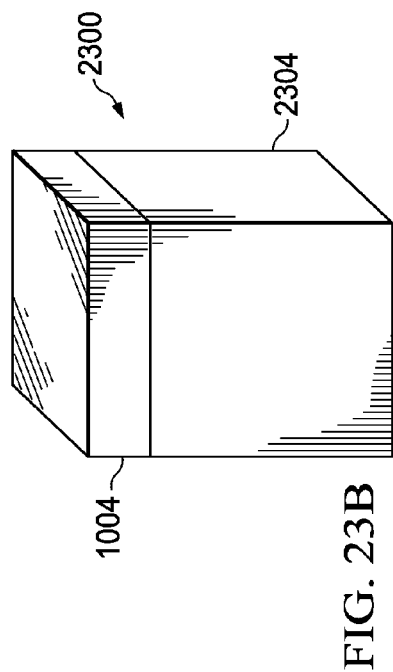
FIG. 23B depicts the male component of the second exemplary magnetic cushioning device in accordance with an embodiment of the present invention.

FIGS. 23A-23C illustrate another exemplary magnetic cushioning device 2300 in accordance with an embodiment of the present invention. FIG. 23A depicts a female component 2302 of the exemplary magnetic cushioning device 2300. FIG. 23B depicts a male component 2304 (e.g., piston 2304) of the exemplary magnetic cushioning device 2302. FIG. 23C depicts the assembled exemplary magnetic cushioning device 2300 wherein the female component 2302 (including magnet 1002 and spacer 1912) is movably positioned over the male component 2304 (including magnet 1004). The magnetic cushioning device 2300 is similar to the bottom portion of the exemplary momentary switch 1900 of FIGS. 21A-22F in that its two magnets 1002 and 1004 and the spacer 1912 produce a multi-level repel snap behavior that has a repeatable hysteresis behavior. However, instead of being a switch, the magnetic cushioning device 2300 of FIGS. 23A-23C does not require circuitry for a switch and instead acts much like a shock absorber that utilizes magnetism instead of a spring. The magnetic cushioning device 2300 can be used for all sorts of applications that use a spring for cushioning including beds such as home beds or hospital beds; seats or backs of chairs in a home, an airplane, a vehicle, a race car, a bus, a train, etc.; shock absorbers for vehicles; bumpers for vehicles; protective shielding for vehicles; and the like. Unlike a spring, however, where the force of the spring continues to increase as an external force is applied, the magnetic cushioning device 2300 exhibits a peak repel force and then a reduction in the repel force as the magnets 1002 and 1004 move together until held apart by the spacer 1912. The exemplary magnetic cushioning device 2300 when compared to magnetic cushioning device 2200 is intended to demonstrate that different shapes of magnets 1002 and 1004 and enclosures 2302 and 2304 could be used by one skilled in the art to produce any type desired cushioning device in accordance with the invention.

Figure 24:
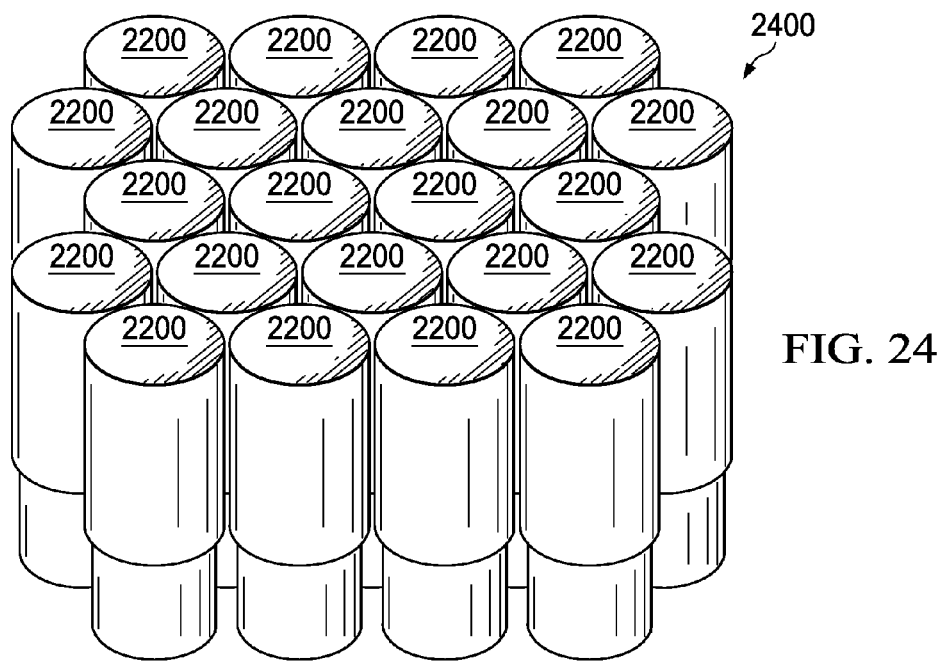
FIG. 24 depicts a first exemplary array of a plurality of the first exemplary magnetic cushioning devices in accordance with an embodiment of the present invention.

FIG. 24 depicts a first exemplary array 2400 of a plurality of the exemplary magnetic cushioning devices 2200. As depicted, each row of cushioning devices 2200 is shifted by approximately half of a width of a circular cushioning device 2200 thereby enabling them to be compacted together with less air gaps between them.

Figure 25:
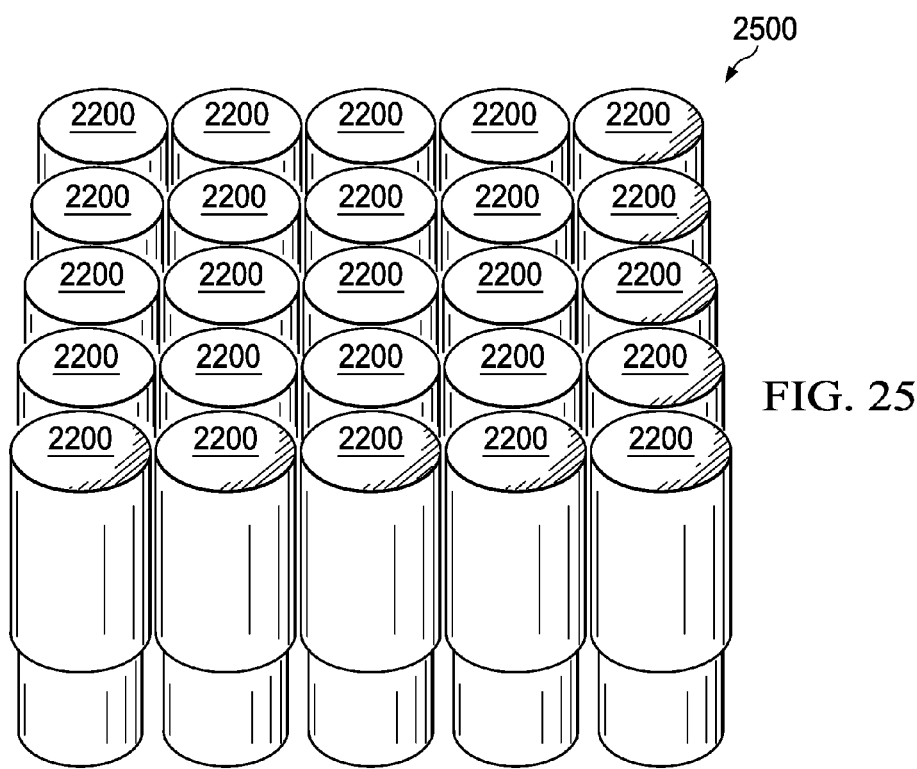
FIG. 25 depicts a second exemplary array of a plurality of the first exemplary magnetic cushioning devices in accordance with an embodiment of the present invention.

FIG. 25 depicts a second exemplary array 2500 of a plurality of the exemplary magnetic cushioning devices 2200 that are aligned in rows and columns.

Generally, one skilled in the art will recognize that depending on the shape of the magnets employed and the enclosures used to produce the cushioning devices 2200, 2300 and alternatives that various arrangements could be used such that function well together, for example, as part of a seat cushion or bed mattress.

Figure 26:
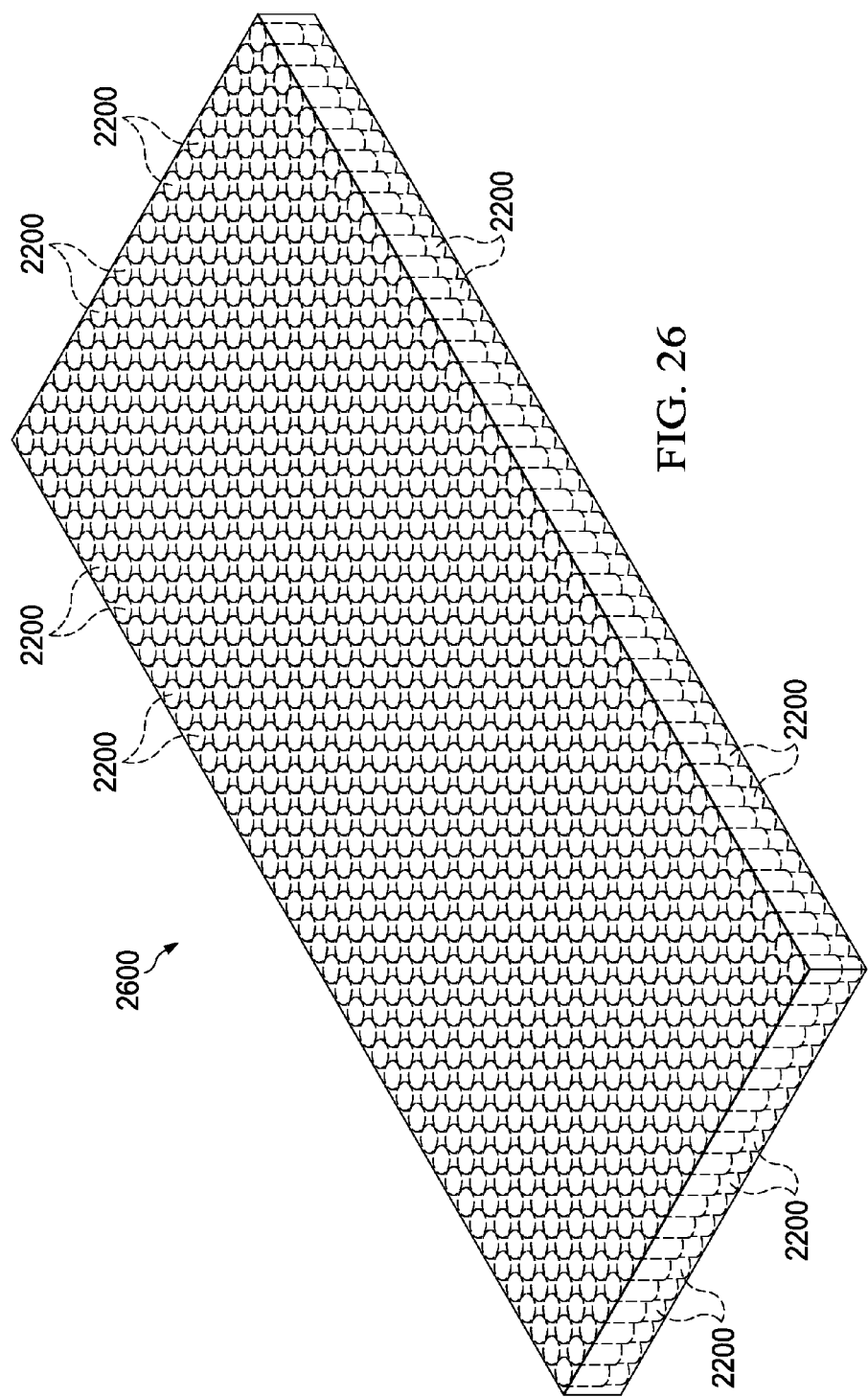
FIG. 26 depicts an exemplary cushion employing another exemplary array of the first exemplary magnetic cushioning devices in accordance with an embodiment of the present invention.

FIG. 26 depicts an exemplary cushion 2600 employing another exemplary array of the exemplary magnetic cushioning devices 2200. Such a cushion 2600 might be used in a mattress, as a seat, or as otherwise described. One skilled in the art will understand that conventional methods such as use of springs, foam, or other types of materials could be employed in conjunction with the magnetic cushioning devices 2200. For instance, cushioning devices 2200 and 2300 in accordance with the present invention could be used to produce heels for shoes or boots and can be used for soles or pads that are placed into shoes or boots. Similar cushioning devices 2200 and 2300 could be used for knee pads, elbow pads, or any sort of protective gear used by athletes, workers, military personnel or the like where an impact needs to be absorbed to prevent harm to a person.

Figure 27:
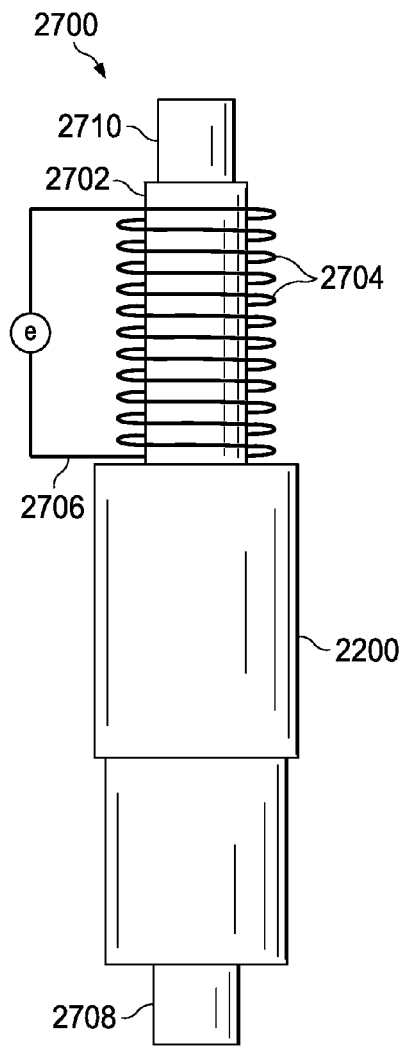
FIG. 27 depicts a shock absorber that produces electricity while absorbing shock using multi-level magnetism in accordance with an embodiment of the present invention.

FIG. 27 depicts an exemplary shock absorber 2700 that has power generation capabilities in accordance with an embodiment of the present invention. The exemplary shock absorber 2700 utilizes a cushioning device 2200 (including two magnets and a spacer) previously described in FIGS. 22A-22C and one or more other magnets 2702 and corresponding coils 2704 to generate electricity 2706. FIG. 27 depicts the shock absorber 2700 having one shaft 2708 attached to one end of the cushioning device 2200 and at another end there is attached shaft 2710 which has the magnet 2702 surrounding it and the coil 2704 surrounding the magnet 2702.

Figure 28:
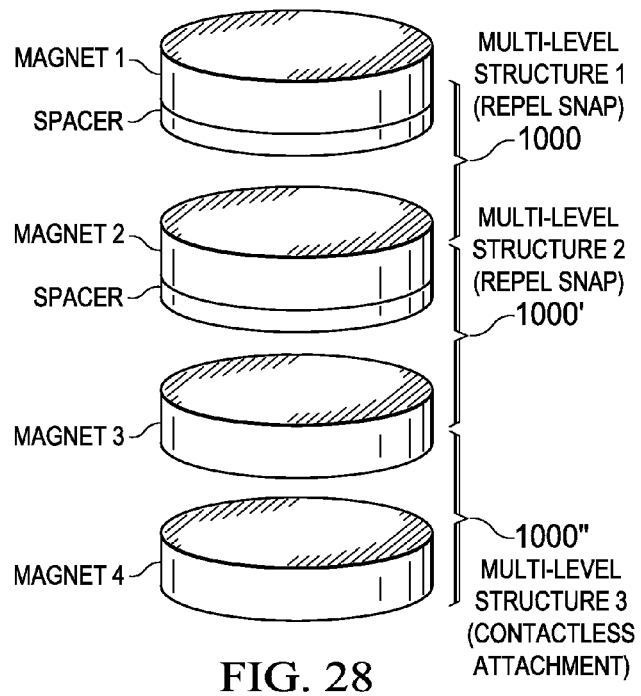
FIG. 28 depicts multiple levels of multi-level magnetic mechanisms in accordance with an embodiment of the present invention.

Under yet another arrangement, a device can be produced including multiple layers of multi-level magnetic systems 1000 including those that have repeatable hysteresis behavior. FIG. 28 depicts an exemplary device 2800 that has three multi-level magnetic systems 1000, 1000' and 1000'. The first and second multi-level magnetic systems 1000 and 1000' are "repel-snap" and the third multi-level magnetic system 1000" is "contactless attachment". As shown, the exemplary device 2800 includes four magnets including two with spacers used to produce the three multi-level magnetic systems 1000, 1000' and 1000' each exhibiting multi-level magnetism behaviors. As depicted, magnets 1 and 2 each have spacers. Magnets 1 and 2 and 2 and 3 produce repel-snap behavior that combine and the magnets 3 and 4 produce contactless attachment. The combined combination of the four magnets 1, 2, 3, and 4 corresponds to programmable repeatable hysteresis. One skilled in the art will recognize that all sorts of behaviors can be producing by combining multiple layers of the aforementioned multi-level magnetic systems 1000.

Figure 29A:
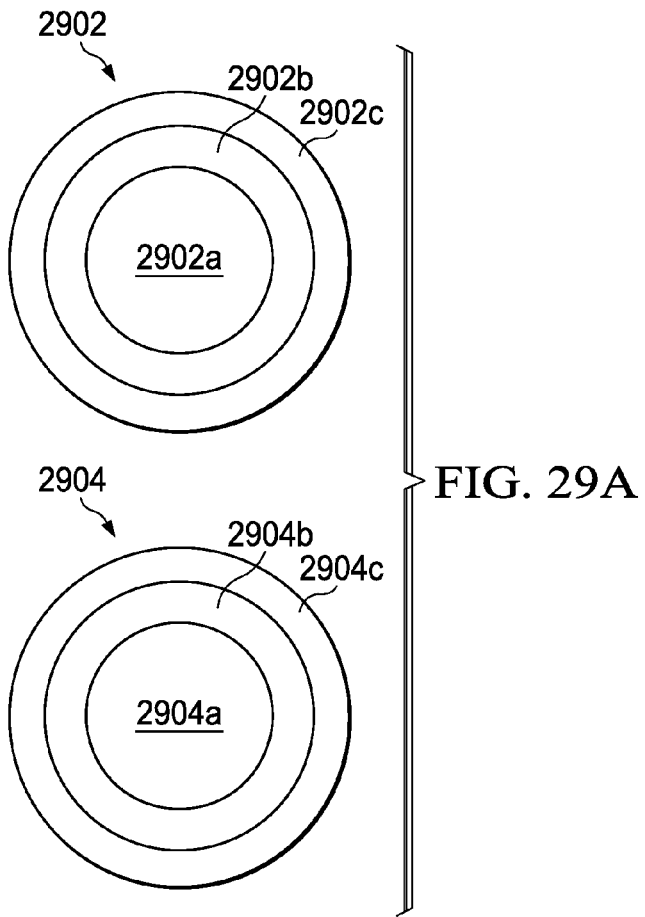
FIGS. 29A-29D depict two magnetic structures that are coded to produce three levels of magnetism in accordance with an embodiment of the present invention.
Figure 29B:
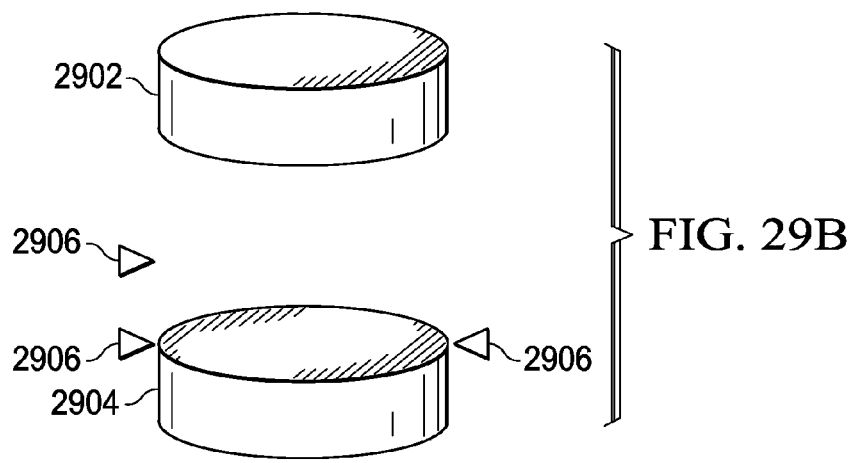
Figure 29C:
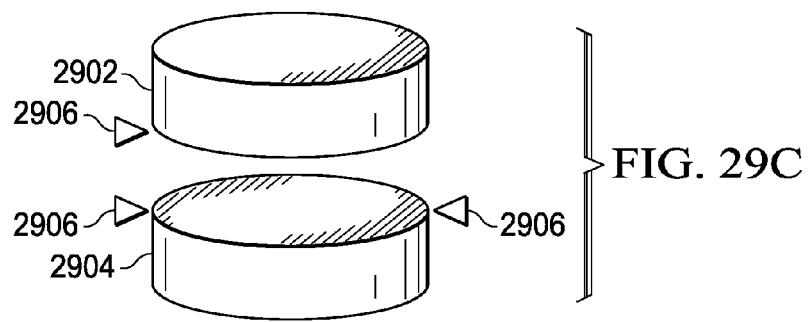
Figure 29D:
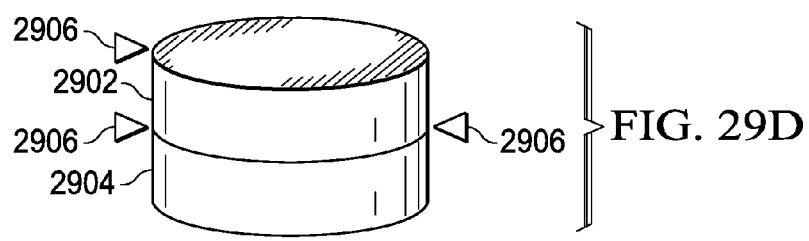

Under another arrangement it is possible to design two magnetic structures to produce multiple layers of multi-level magnetism. Using only two magnetic structures, many different combinations of magnetized regions can be produced. FIGS. 29A-29D depict two magnetic structures 2902 and 2904 that are coded to produce three levels of magnetism. Specifically, as the two magnetic structures 2902 and 2904 are brought towards each other there is an outer attractive layer (or level), a repel layer, and then an attractive layer when they are attached. FIG. 29A depicts two magnetic structures 2902 and 2904 each made up of three coded regions 2902a, 2902b, 2902c, 2904a, 2904b, and 2904c, where the first and second coded regions 2902a, 2902b, 2904a, and 2904b are coded to produce a contactless attachment behavior and their third coded regions 2902c and 2904c are coded to produce a strong attachment layer having a very short throw that is much less than the equilibrium distance produced by the second and third coded regions 2902b, 2902c, 2904b, and 2904c. FIG. 29B depicts the two magnetic structures 2902 and 2904 being separated by a distance greater than the engagement distance of the outer attract layer. FIG. 29C depicts the two magnetic structures 2902 and 2904 positioned relative to each other such that they are at an equilibrium distance between their outer attractive layer and their repel layer. FIG. 29D depicts the two magnetic structures 2902 and 2904 in contact where they are in a very thin but strong attractive layer, where the attractive force is greater than the repel force with the thickness of the inner attractive layer. One skilled in the art will recognize that the various regions of the two magnetic structures 2902 and 2904 are not required to be contiguous (i.e., alongside or otherwise in contact). Instead, magnetic structures can be produced where the magnetized regions are on separate pieces of material that are configured apart from each other yet are configured to work together to produce multi-level magnetism. This approach is similar to using discrete (i.e., separate) magnets as magnetic sources versus maxels printed onto a single piece of material. Generally, all sorts of combinations are possible where the two interacting magnetic structures 2902 and 2904 are each either a single piece of material or multiple pieces of material, contiguous pieces of material or non-contiguous pieces of material, discrete magnets, or printed maxels, etc.

FIGS. 29B through 29D also depict optional sensors 2906 that could be used as part of a control system (not shown). Generally, one or more sensors 2906 can be used to measure a characteristic of the magnetism between the two magnetic structures 2902 and 2904, where measurements can correspond to different control states (e.g., non-engaged state, equilibrium state, and closed state).

Figure 29E:
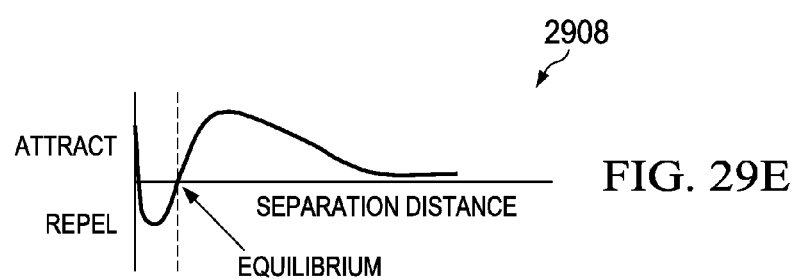
FIG. 29E depicts an exemplary force curve for the two magnetic structures of FIGS. 29A-29D.

FIG. 29E depicts an exemplary force curve 2908 for the two magnetic structures 2902 and 2904 of FIGS. 29A-29D. As shown, the two magnetic structures 2902 and 2904 have an outer attractive force layer where the force reaches a peak attractive force before transitioning to a repel force layer where a first zero crossing corresponds to an equilibrium position (or separation distance). The two magnetic structures 2902 and 2904 can then be forced through the repel layer thereby overcoming a peak repel force before the force decays to zero at a second zero crossing and then the two structures will attract and attach within an inner attractive layer. As previously described, a spacer can be used to prevent the two structures 2902 and 2904 from getting any closer than a desired separation distance (e.g., the distance corresponding to the second zero crossing). Similarly, the third coding regions of two magnetic structures 2902 and 2904 could be used in place of a spacer to produce repeatable hysteresis corresponding to a repel snap behavior where there is also an innermost repel layer having the same strength and throw as the attractive forces that would otherwise enable a snap behavior. Thus, the repel force would achieve a peak and then degrade to zero at some separation distance and remain zero within that distance.

It should be noted that multilevel structures 2902 and 2904 do not have to be symmetrical and do not need to be circular (e.g., involving concentric circular regions). Multi-level magnetism can be achieved using coding that resembles stripes, coding corresponding to irregular patterns, coding correspond to stripes within circles, and using countless other coding arrangements.

Figure 30A:
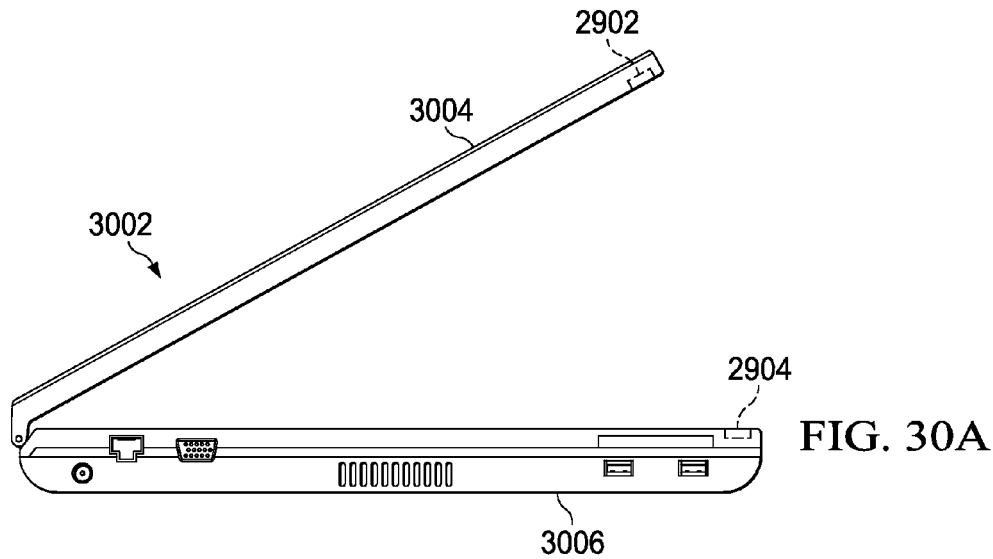
FIGS. 30A-30C depict a laptop using two magnetic structures like those described in relation to FIGS. 29A-29D in accordance with an embodiment of the present invention.
Figure 30B:
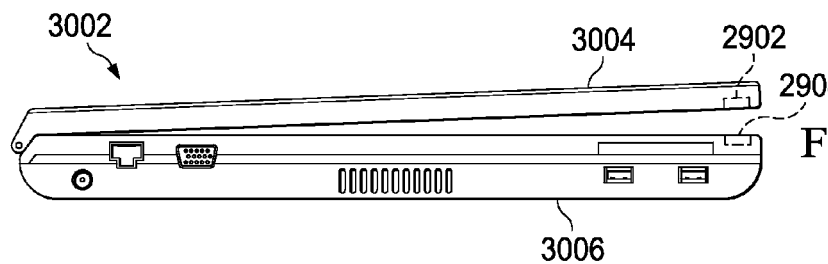
Figure 30C:
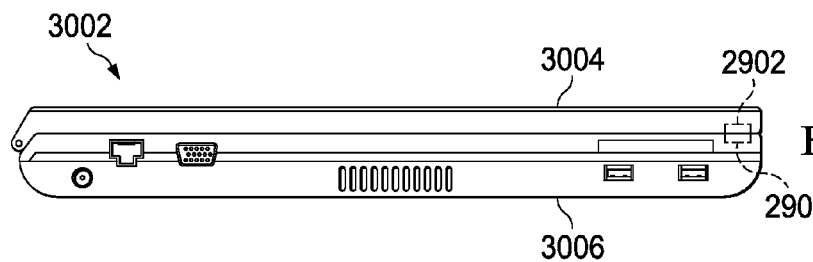
Figure 30D:
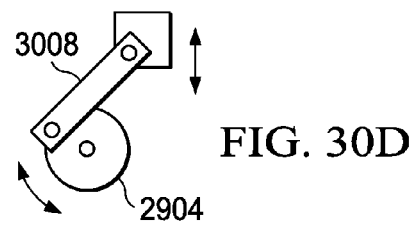
FIG. 30D depicts an exemplary mechanism used to turn one magnet to cause it to decorrelate from a second magnet in accordance with an embodiment of the present invention.

FIGS. 30A-30D depict an exemplary laptop computer 3002 having ergonomics that control its state based on the position of its top portion 3004 (i.e., the portion having the display screen) relative to a bottom portion 3006 (i.e., the portion having the keyboard). As depicted in FIG. 30A sensor data indicates that two magnetic structures 2902 and 2904 embedded in the laptop portions 3004 and 3006 are separated at a distance greater than their engagement distance, which corresponds to an "ON" state. In FIG. 30B, a user of the laptop 3002 has pushed the top portion 3004 down until it became attracted by the attractive portion of the contactless attachment multi-level coded regions of the two magnetic structures 2902 and 2904. The top portion 3004 will reach the equilibrium (or hover) distance and remain at that distance, which the sensor data indicates causing the laptop 3002 to enter a "SLEEP" state. The user can then either open the laptop 3002 up again or can push through the repel force to cause the laptop portions 3004 and 3006 to attach as seen in FIG. 30C, whereby the sensor data would indicate that the two portions 3004 and 3006 are attached and cause the laptop 3002 to go to its "OFF" state. One skilled in the art will also recognize that use of a sensor and a control system is not a requirement for achieving the ergonomic aspects corresponding to the three state positions ("ON", SLEEP", and "OFF"). As shown in FIG. 30D, the laptop 3002 may also include a device 3008 (sliding mechanism 3008) used to turn one of the magnetic structures 2902 or 2904 to decorrelate them then in which case the magnetic structures 2902 and 2904 may be much stronger when in an attached state.

Generally, a laptop 3002 configured in accordance with the multi-level aspects of the present invention could have the following:

At least three states: not engaged, hover and fully engaged (closed).

Hall sensor near at least one of the magnetic structures 2902 and 2904 to read out the state by the level of magnetism measured at that point.

The detected value is translated into the discrete states which is interfaced to a computer/processor in digital format.

The operating system or an application running will interpret these states and respond appropriately, e.g., open→run normally, hover→screen saver or stand-by, fully shut→hibernate or stand-by.

Any or all of the computer responses may be delayed from the detection according to desired ergonomics.

The magnetic fields may be created by either single magnetic substrates that contain the fields necessary to produce the behavior, or by individual magnets that give the combined field needed to produce the behavior.

Either or both the hover and attachment magnets may be located at different radii from the lid's axis of rotation to provide mechanical advantage and modify the range of field, strength of field, etc as needed to create the desired behavior.

Laptops, phones, personal digital assistants (PDAs) and other similar devices could also employ the aforementioned correlated magnetics technology in other ways including:

Shock/water proof enclosure with correlated magnetic seal for phones, media players, etc. . . . .

Power cord with 360 degree consistent removal force.

Correlated magnets inside the products to reduce excess magnetic fields.

Rubber mat with correlated magnets to hold laptop down.

Docking station.

Wireless charging with concentrated flux at interface.

Precision alignment.

Notion of using correlated magnets throughout lifecycle from manufacturing to in-store demo to end use.

Manufacturing processes.

Security cord attachment—removal of correlated magnet coded cord sounds alarm.

Correlated magnetic-based switches including integrated feedback loop.

In accordance with another embodiment of the present invention, the repel-snap multi-level correlated magnetic system 1000 (for example) can be used to produce child safety and animal proof devices that require a child or animal to be able to overcome the repel force in order to engage or disengage a locking mechanism, or other such mechanism. The force may be applied via pulling or pushing or in some other manner. Such a device could make it difficult for a child or an animal to turn on a device, for example, a garbage disposal.

Figure 31A:
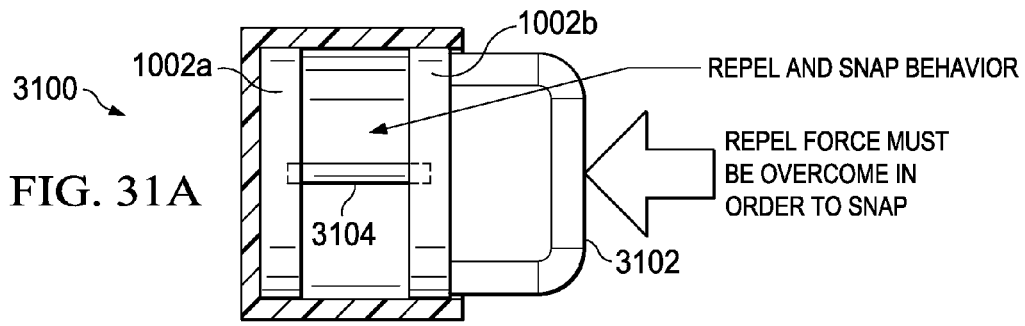
Figure 31B:
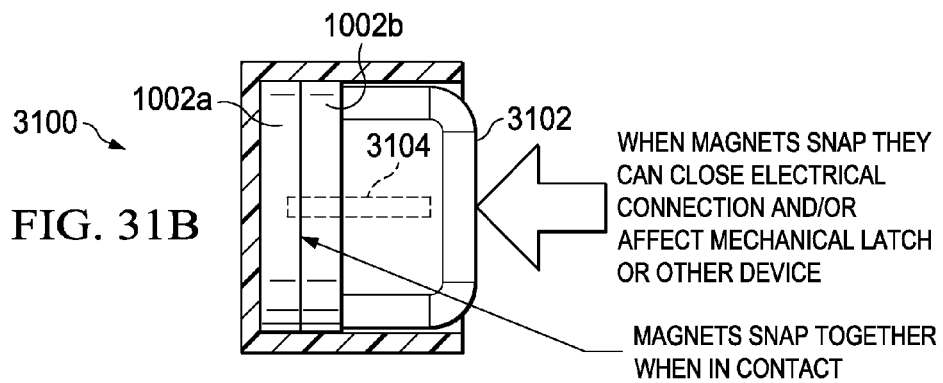
Figure 31C:
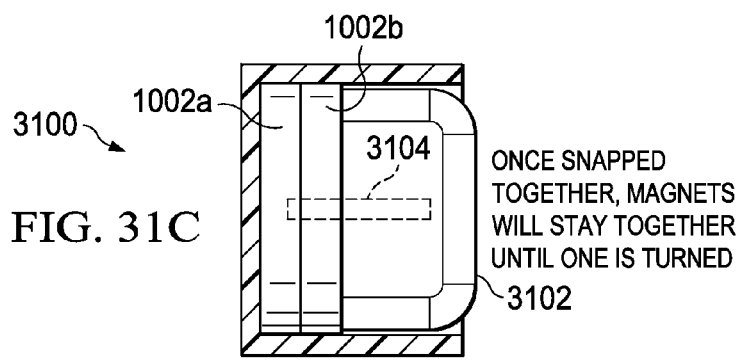
Figure 31D:
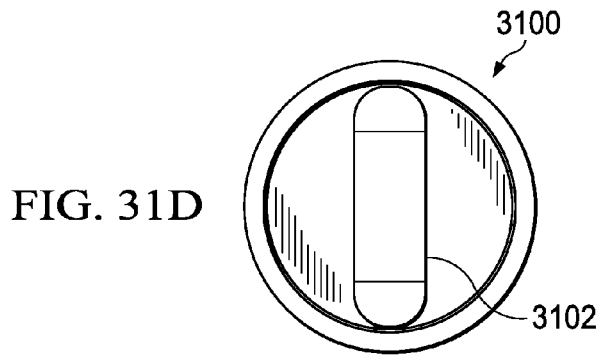

FIGS. 31A-31K depicts various views of an exemplary child proof device 3100 that might be used as an electrical switch or a mechanical latch or for some other purpose. Generally, the device 3100 is designed to exhibit multi-level repel snap behavior when two magnetic structures 1002a and 1002b are in a certain alignment(s) and to exhibit repel only behavior when the structures 1002a and 1002b are in an alignment other than the certain alignment(s). As such, a child or animal would have to overcome a repel force to cause the device 3100 to engage the switch or latch or otherwise perform a function upon the contact (or near contact) of the two magnetic structures 1002a and 1002b. Once the two magnetic structures 1002a and 1002b are brought into contact they would snap together and remain together until one of the magnetic structures 1002a and 1002b was turned by a knob 3102 so as to cause them to de-correlate thereby causing the attractive forces of the attractive layer to be overcome by the repel forces present in the device 3100. As shown, the device 3100 is configured such that the knob 3102 will turn within a guide 3104 (e.g., guide rod 3104) to cause it to achieve its normal aligned position. The device 3100 can transition from repel snap to repel-only depending on whether the complementary codes are aligned or not aligned. As shown in FIG. 31K, the device 3100 if desired can incorporate a spacer 3106 which is attached to one of the magnetic structures 1002a (for example). Thus, when the other magnetic structure 1002b encounters the spacer 3106 it can close for instance an electrical connection (e.g., activate a doorbell) and/or affect a mechanical latch or other device. This requires the force to be maintained to enable operation of a device (e.g., garbage disposal).

As can be appreciated, the repel-snap multi-level correlated magnetic system 1000 (for example) can be used in many different child safety and animal proof devices. By requiring a child or animal to overcome, for example by pushing or pulling an object, a repel force before something engages, for example electrically or mechanically, new forms of electrical switches, latches, and the like can be employed where the repel force can be prescribed such that a child or animal would find it difficult to overcome the force while an adult would not. Such devices might optionally employ a spacer to control the amount of attractive force (if any) that the devices could achieve thereby enabling them to be removed with a force (e.g., pull force) opposite the force used to achieve contact (e.g., push force). If desired, the repel-snap multi-level correlated magnetic system 1000 (for example) may be coded whereby they do not de-correlate when one of the corresponding magnetic structures 1002a and 1002b is rotated relative to the other or it may be coded where de-correlation will occur when alignment is changed due to rotation (and/or translational movement). Thus, the force between two multi-level magnetic structures 1002a and 1002b can vary as a function of separation distance and also relative alignment of the two structures 1002a and 1002b.

The following discussion is intended to compare the limitations of conventional magnet force curves to those of coded magnetic structures. Conventional magnet pairs will either attract each other or repel each other depending on the spatial orientation of their dipoles. Conventional magnets can have strong magnetic fields that can adversely affect credit cards, cell phones, pacemakers, etc. because of the linear reach of the magnetic fields. For the same reason, these magnets can also be very dangerous to handle. Moreover, magnet designs have been limited by the assumption of an indirect relationship, which describes the force as inversely proportional to the linear distance between the magnets. Because of this limitation, design engineers have long relied on materials science and advanced manufacturing techniques to produce magnets with appropriate attract and/or repel force performance characteristics required for particular applications.

Figure 32:
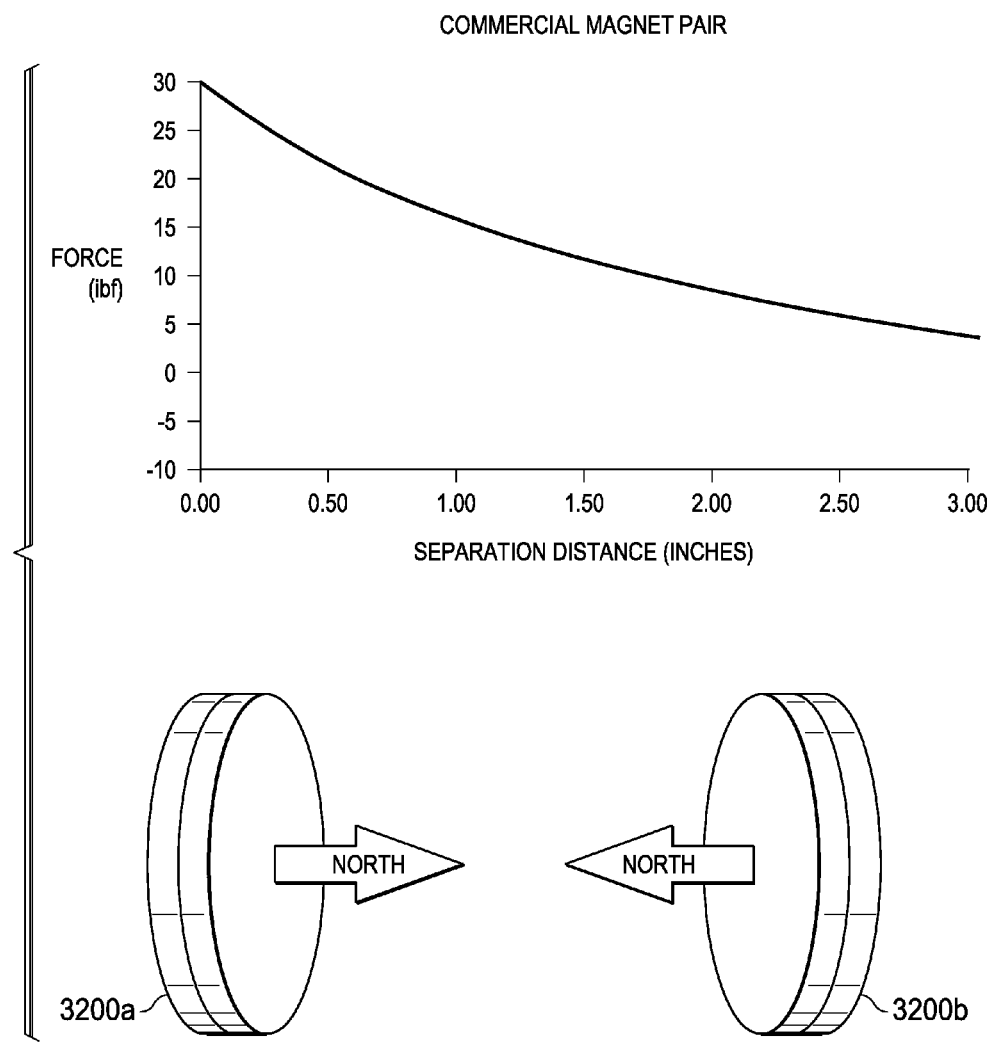
FIG. 32 depicts a force curve of two conventional magnets in a repel orientation.

The force curve shown in FIG. 32 describes the repel force profile for two standard neodymium iron boron (NdFeB) N42-grade disk magnets 1½" diameter by ⅛" thick. Two magnets 3200a and 3200b are shown with north poles facing each other thereby producing a repel force that varies indirectly with separation distance. Correlated magnetics technology removes this limiting assumption by enabling the programming of magnetic devices to precisely prescribe magnetic fields and therefore magnet behaviors. Specifically, magnet designers can now use patterns of grouped and/or alternating magnetic elements—or maxels—that behave individually like dipole magnets, but can exhibit many different behaviors as a whole. The shape of a force profile is controlled by a number of design parameters, including the total number of magnetic elements, polarity, amplitude, and the size, shape and location of the maxels (field emission sources). The amount of maxel polarity variation per unit area (code density) on a magnet surface affects the level of the peak force at contact. The code density also affects the residual level of force at the far-field and the rate of decay, or slope, of the force curve. As the code density increases, so does the peak attraction force. However, the attraction force decays more rapidly, and the far-field force is significantly reduced. Thus, in stark contrast to the conventional magnets, the custom designed magnetic fields employing correlated magnetics technology can exhibit a stronger peak force with a very short 'throw,' rendering a much safer magnetic device.

Figure 33:
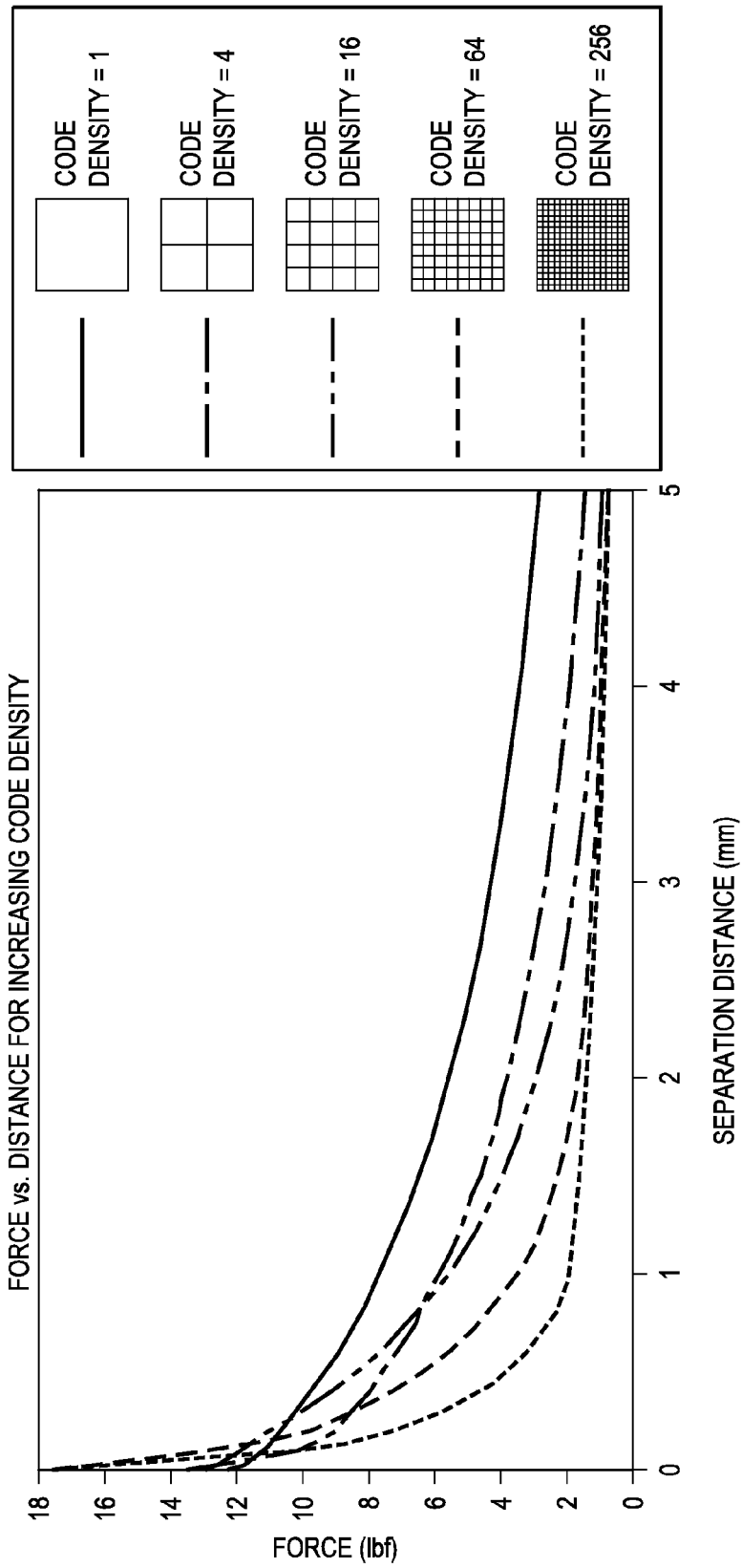
FIG. 33 depicts force curves for five different code densities in accordance with an embodiment of the present invention.

FIG. 33 depicts multiple force curves produced by varying the code density of the maxels programmed into the magnet pair using instances of a simple alternating polarity code. In this case, the material is NdFeB N42-grade ¾" square magnets at a thickness of ⅛" and code density is varied from conventional magnet (code density=1) to 256 maxels on the coded magnet surface. While code density affects the severity of the slope of the force curve, as well as peak and far-field force levels, the maxel size, shape and amplitude affect the engagement distance of the forces programmed into the magnet pair. Moreover, as previously described, opposing forces can be employed simultaneously (attract and repel), providing the designer the ability to impart inflections into the force curve. The amplitude of each maxel is adjusted by varying the input power on the induction coil as the magnets are being 'printed/manufactured' which in turn affects the shape of the force curve. The attract and repel forces can be increased or decreased and the inflection point can be prescribed to meet specific application requirements.

FIG. 34 depicts the force profile for two magnets 3400a and 3400b programmed with repel and snap behavior, whereby complementary maxel patterns have been printed onto conventional magnets to achieve two force curves. This profile demonstrates a multi-level magnetism where the repel force increases, peaks and then transitions to an attract force as the pair of coded magnets 3400a and 3400b approach each other. This programmable force behavior empowers design engineers to prescribe precise damping and resistance behavior for products, components and subsystems, and it enables the creation of cushioning devices with deterministic weight support characteristics. The correlated magnetics multi-force devices represent an enabling technology for improvement to vibration damping fixtures, shock absorbers, hospital beds, child- and animal-proof switches and latches, micro-switches and more.

Figure 35:
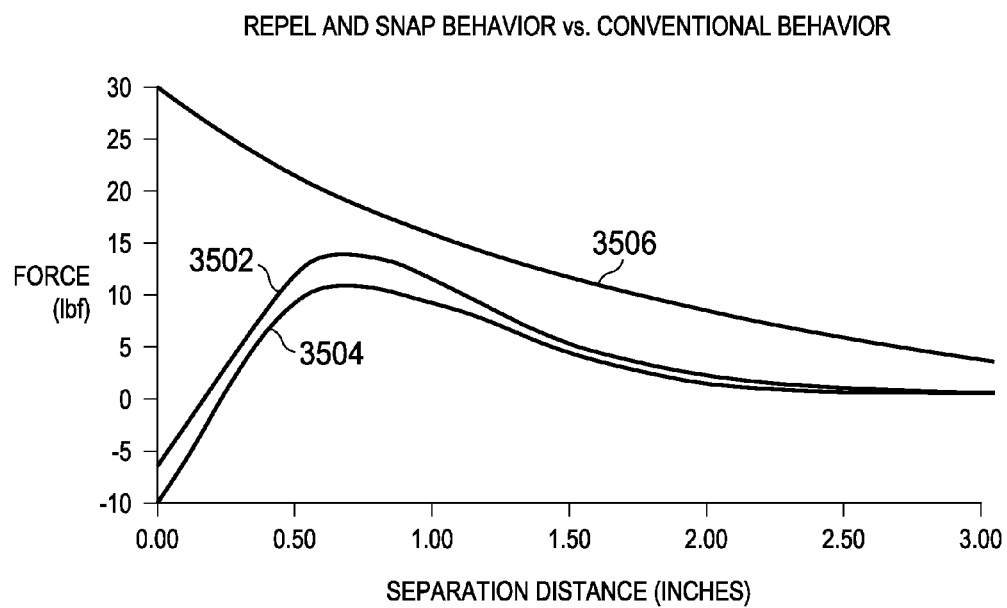
FIG. 35 depicts a comparison of a conventional repel behavior versus two different multi-level repel and snap force curves in accordance with an embodiment of the present invention.
Figure 36A:
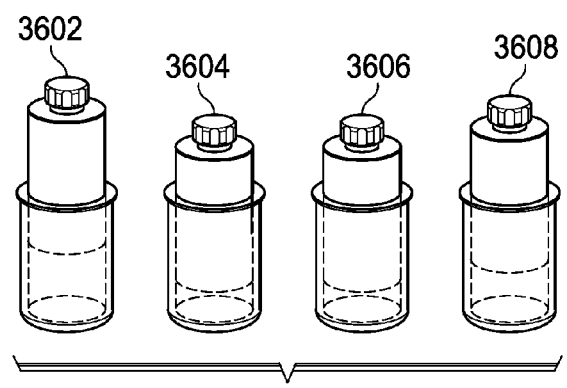

FIG. 35 illustrates the effect of varying input power on the shape of the force profiles. The amount of input power used to produce the attractive force is 175V (line 3502) and 200V (line 3504) with the repel force unaltered. For comparison, the force curve for conventional magnets is also shown (line 3506).

FIGS. 36A-36D shows several multi-level repel and snap demonstrators 3602, 3604, 3606 and 3608 that highlight the functional differences between conventional magnets and coded magnets, where disk magnets adhered to the bottom surface of four solid cylinders interact in a manner similar to springs with magnets fitted at the bottom of four cylindrical tubes. The force curves for each cylinder 3602, 3604, 3606 and 3608 describe the nature of the repel force experienced as the magnets travel vertically down the shaft.

The far-left cylinder 3602 features two conventional magnets that exhibit a progressively-stiffer resistance as the magnets approach contact. The other three cylinders 3604 (repel and snap 175V), 3606 (repel and snap 200V) and 3608 (repel and snap w/spacer) each feature multi-level repel and snap programmed magnet pairs that provide a progressively stiffer resistance up to an inflection point at approximately ⁶⁄₁₀ of an inch from surface contact. At this point, the resistive force declines and actually transitions to an attract force at approximately two-tenths of an inch from surface contact, where the magnet pair then snap together and bond. The difference in resistance offered by the higher and lower power attract-force codes can be noticeably felt. The far-right cylinder 3608 illustrates a 'breakaway cushion' behavior. The cylinder travel is limited by a spacer such that the magnet pair cannot enter the attract force region. The net effect is that the repel force declines to near zero, yet the cylinder will return to its starting position when released. Thus, new cushioning devices can be designed to give way after a prescribed force is reached.

Because force curves are now programmable, designers can tailor the magnetic behavior to match application requirements and to support new magnet applications. Magnets may now include combinations of attract and repel forces that enable entirely new application areas. Programming magnets and their force curves provides a powerful new capability for product innovation and increased efficiencies across industry. Generally, a plurality of regions having different force curves can be configured to work together to produce a tailored composite force curve. The composite force curve could, for example, have a flat portion that represented a constant force over some range of separation distance such that the devices acted similar to a very long spring. Moreover, as previously described, maxels can be printed onto conventional magnets thereby putting surface fields onto them. By putting a thin correlated magnetic layer on top of an already magnetized substrate the bulk field is projected into the far field and the correlated magnetic surface effects modify the force curve in the near field.

Figure 37A:
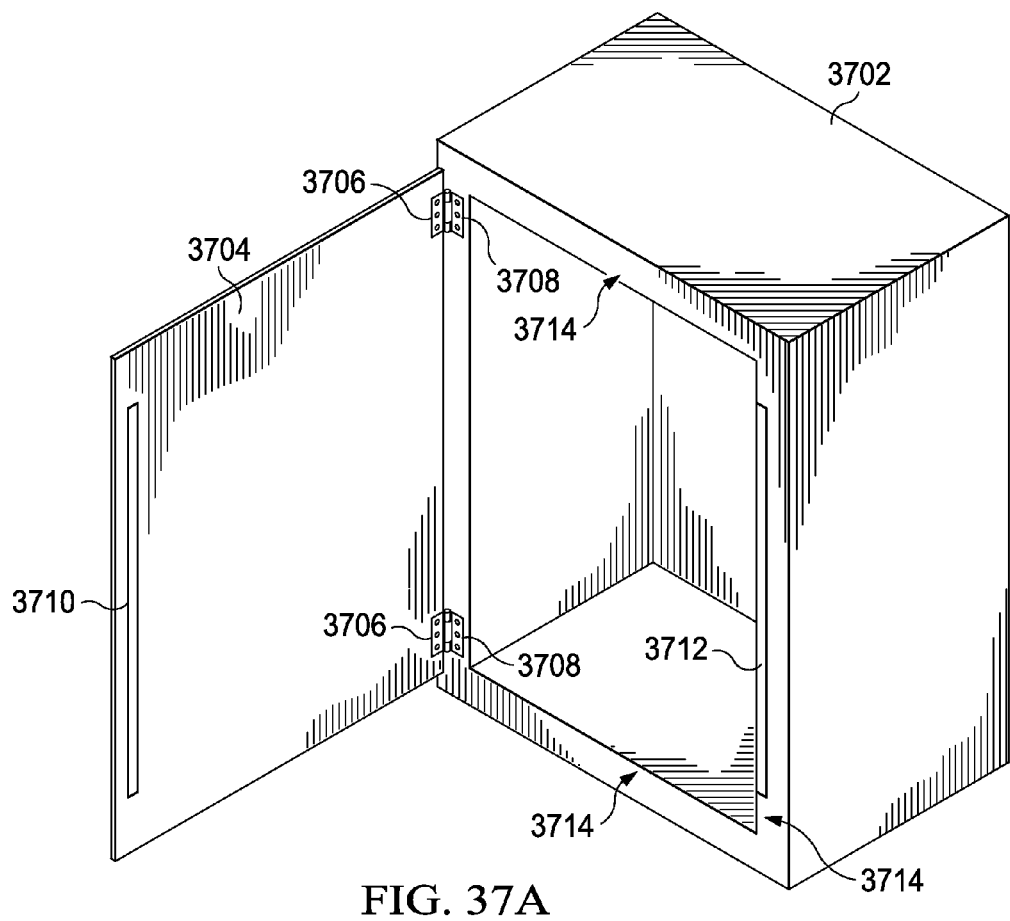

In accordance with an embodiment of the present invention, the multi-level contactless attachment devices can be used to make doors and drawers that are quiet since they can be designed such that doors, cabinet doors, and drawers will close and magnetically attach yet not make contact. FIGS. 37A-37C depict an exemplary cabinet 3702, cabinet door 3704, hinges 3706 and 3708 and magnetic structures 3710 and 3712 having multi-level contactless attachment coding that would cause them to close but not completely thus making them quiet closing. In this example, the magnetic structures 3710 and 3712 are coded for multi-level contactless attachment. If desired, the magnetic structures 3710 and 3712 can be located in overlap regions 3714 where the cabinet door 3704 overlaps the cabinet 3702. The magnetic structures 3710 and 3712 can be attached to the cabinet 3702 and cabinet door 3704 by adhesive, nails, screws etc. . . . . Plus, a spacer 3716 could be used to prevent magnet contact if too much force is used to close the cabinet door 3704 (e.g., slamming). If desired, an installation guide 3718 can be used when installing the magnetic structures 3710 and 3712 to the cabinet 3702 and cabinet door 3704.

Figure 38A:
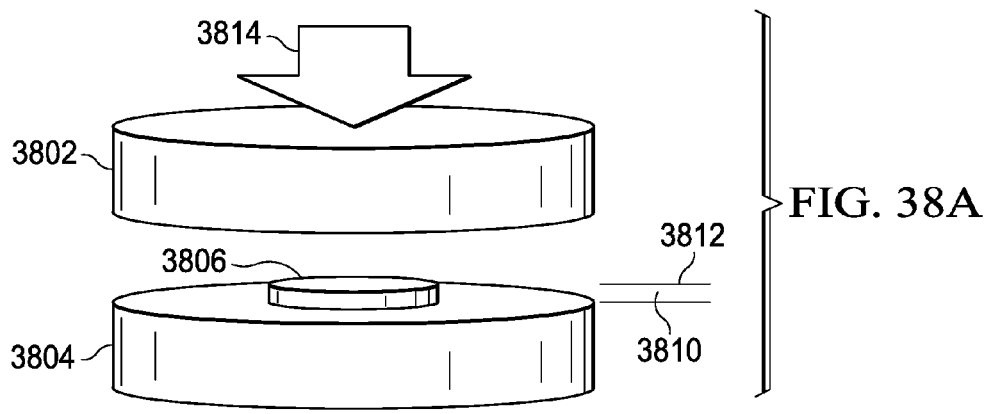
FIGS. 38A-38B depicts a device that can be used to produce exploding toys and the like and to store energy in accordance with an embodiment of the present invention.
Figure 38B:
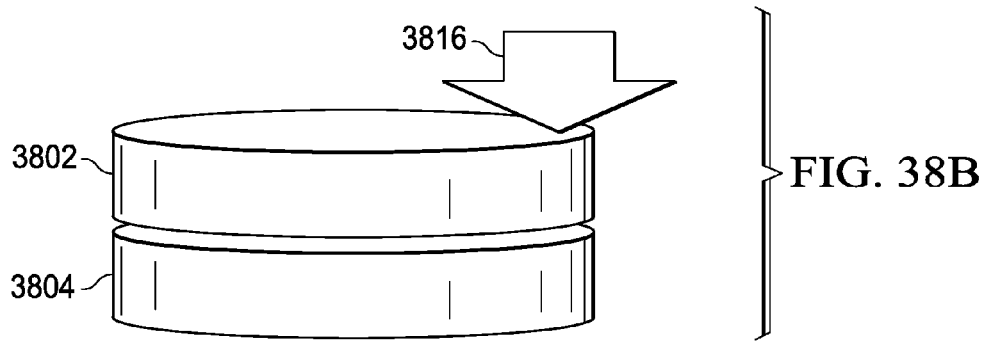

FIGS. 38A-38B depicts two magnets 3802 and 3804 coded to have multi-level repel and snap behavior and having a spacer 3806 in between them with an attract layer 3810 and a repel layer 3812. A force 3814 can be applied on one side to overcome the repel force so the two magnets 3802 and 3804 snap together with the spacer 3806 in between them. Then, if a force 3816 is applied to a side of one of the magnets 3802 (for example) that causes that magnet 3802 to pivot on the spacer 3806 then this will cause the magnets 3802 and 3804 to repel each other (e.g., explode apart). Thus, this arrangement provides a relatively unstable device that will remain together until it receives an impact of some sort causing the two magnets 3802 and 3804 to fly apart (e.g., much like an explosion). As such, various types of toys (exploding toys), triggers, and the like can be produced that employ such a device. The size, thickness, shape, and other aspects of the spacer 3806 can be varied to determine the degree of instability of the device. Such a device can also serve as a form of energy storage device whereby a lot of force can be released with very little applied force.

In accordance with another aspect of the present invention, an external force applied to at least one magnetic structure making up a multi-level device may change as a result of heat, pressure, or some other external factor other than physical force. For example, a bimetallic strip connected to a multi-level device may be used to produce the desired hysteresis of a thermostat or of a first suppression system trigger device. Similarly, pressure might cause a multi-level device to go from a close position to an open position enabling gas to escape a vessel.

Figure 39:
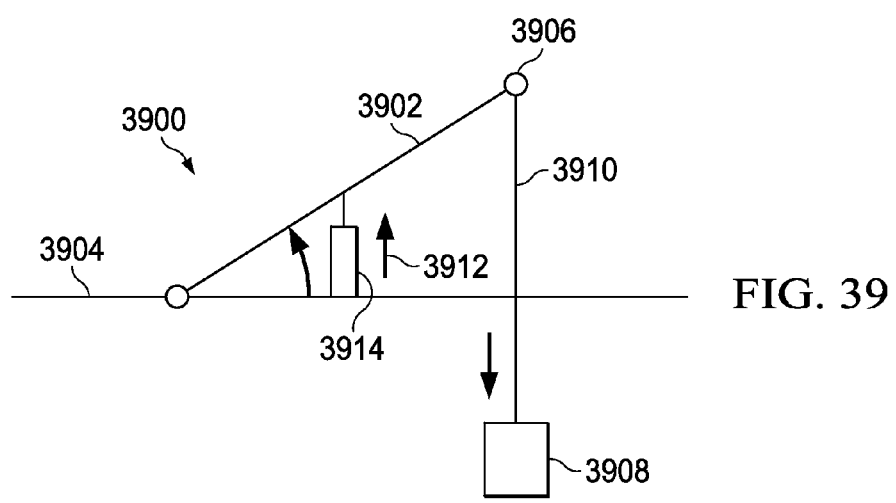
FIG. 39 depicts a complex machine employing a magnetic force component in accordance with an embodiment of the present invention.

In accordance with a further aspect of the present invention, the ability to vary the forces between two magnetic structures in a non-linear manner by varying their relative alignment and via multi-level magnetism that varies as a function of separation distance enables entirely new types of simple machines that include the six classical simple machines (i.e., lever, wheel and axle, pulley, inclined plane, wedge, and screw). Generally new non-linear design dimensions enable force characteristics to be varied for given distances and alignments. Furthermore, new types of complex machines are now possible based on combinations of new simple machines. FIG. 39 depicts an exemplary complex machine 3900 involving a bar 3902 having one end pivoting on a surface 3904 and a pulley 3906 on an opposite end from which a weight 3908 is suspended via a rope 3910 or the like. At a point along the bar 3902 a force 3912 is applied by a magnetic force component 3914 which is two or more magnetic structures coded to produce a desired force versus distance curve. By using different magnetic structures having different force versus distances curves (e.g., force curves) different functionalities of the complex machine 3900 can be produced. For example, if a force curve is programmed that exhibits a sinusoidal function with extension then the force on the weight 3908 will be linear over the range in which that curve is accurate, simulating the effect of a very long spring.

From the foregoing, one skilled in the art will appreciate that the present invention includes a multilevel correlated magnetic system comprising: (a) a first correlated magnetic structure including a first portion which has a plurality of coded magnetic sources and a second portion which has one or more magnetic sources; (b) a second correlated magnetic structure including a first portion which has a plurality of complementary coded magnetic sources and a second portion which has one or more magnetic sources; (c) wherein the first correlated magnetic structure is aligned with the second correlated magnetic structure such that the first portions and the second portions are respectively located across from one another; and (d) wherein the first portions each produce a higher peak force than the second portions while the first portions each have a faster field extinction rate than the second portions such that (1) the first portions produce a magnetic force that is cancelled by a magnetic force produced by the second portions when the first and second correlated magnetic structures are separated by a distance equal to a transition distance, (2) the first portions produce a stronger magnetic force than the magnetic force produced by the second portions when the first and second correlated magnetic structures have a separation distance from one another that is less than the transition distance, and (3) the first portions have a weaker magnetic force than the magnetic force produced by second portions when the separation distance between the first and second correlated magnetic structures is greater than the transition distance.

In one example, the first correlated magnetic structure's plurality of coded magnetic sources include first field emission sources and the second correlated magnetic structure's plurality of complementary coded magnetic sources include second field emission sources, each field emission sources having positions and polarities relating to a desired spatial force function that corresponds to a relative alignment of the first and second correlated magnetic structures within a field domain, wherein the spatial force function being in accordance with a code, where the code corresponding to a code modulo of the first field emission sources and a complementary code modulo of the second field emission sources. The code defining a peak spatial force corresponding to a substantial alignment of the code modulo of the first field emission sources with the complementary code modulo of the second field emission sources, wherein the code also defining a plurality of off peak spatial forces corresponding to a plurality of different misalignments of the code modulo of the first field emission sources and the complementary code modulo of the second field emission sources, wherein the plurality of off peak spatial forces having a largest off peak spatial force, where the largest off peak spatial force being less than half of the peak spatial force.

FIG. 40A depicts a retractable magnet assembly 400 configured to limit a magnetic field present at a measurement location 402 when a first magnet 404 is in a refracted state (see top figure). The retractable magnet assembly 400 includes a containment vessel 406 in which the first magnet 404 can move from a retracted position (see top figure) to an engagement position (see bottom figure) and vice versa. When in the retracted position, the first magnet 404 may be attracted to an optional piece of metal 408 or another magnet 410 or to shielding 412. Moreover, if the piece of metal 408 and shielding 412 are used, an appropriate balance must be achieved since both the shielding 412 and the metal 408 would attract the first magnet 404. Depending on the orientation of the retractable magnet assembly 400, the first magnet 404 may move to the retracted position based on gravity when not in proximity with another magnet 410 or metal 408.

Figure 40B:
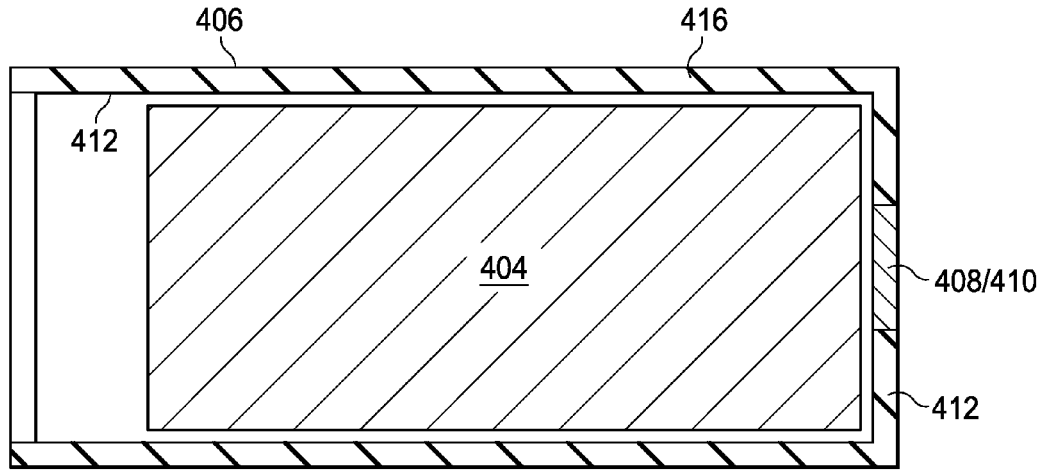

Optionally, a bias magnetic field could be applied to cause the first magnet 404 to move to the retracted position. The bias magnetic field can be provided an electromagnet located either inside or outside the containment vessel 406 (see e.g., FIG. 41D). Alternatively, a permanent magnet 414 located outside the containment vessel 406 can be used to apply a biased magnetic field. When a second magnet 414 (or metal) is brought close to the front of the containment vessel 406 the first magnet 404 inside moves to the engagement position, which may be in contact with the second magnet 414 (or metal) or may be in contact with an intermediate layer 416 or a shielding layer 412 that may or may not be a saturable shielding layer (e.g., permalloy) (see FIG. 40B). As shown in FIG. 40B, the containment vessel 406 may include within it the intermediate layer 416 (i.e., a layer between the containment vessel 406 and the first magnet 404) on one or more (including all) sides to limit the magnetic field in a given direction and may include shielding 412 one or more (including all) sides. One skilled in the art will recognize that a non-saturable shielding layer 412 will have a more gradual transition from shielding to field transparency when brought into proximity of a coded magnet, whereas a saturable shielding layer 412 will have a more abrupt transition from shielding to field transparency. In a preferred embodiment the magnet 404 will engage a thin saturable shielding layer 412 allowing additional magnetism (i.e., beyond that required to saturate the saturable shielding layer) to engage the second magnet 414 (or metal) while the shielding 412 would otherwise substantially shield the environment outside the containment vessel 406 from the magnetic field of the magnet 404 it contains. The magnet 404 within the containment vessel 406 can be a conventional magnet or a coded magnet including one having a repel-snap behavior or a hover-snap behavior.

Figure 40C:
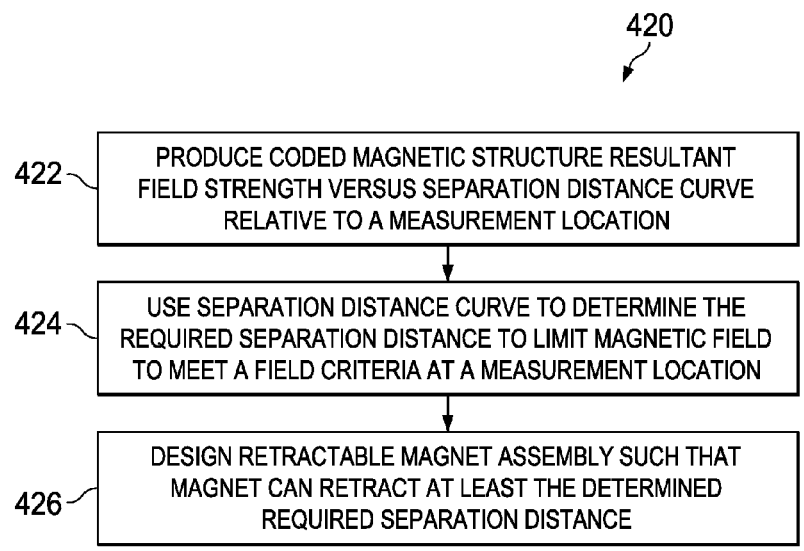
FIG. 40C depicts an exemplary method for designing the retractable magnet assembly of FIGS. 40A-40B.

FIG. 40C depicts an exemplary method 420 for designing the retractable magnet assembly 400 of FIGS. 40A-40B. The retractable magnet 404 in accordance with the invention may be a conventional magnet or a coded magnet. If the retractable magnet 404 is a coded magnet it will have a spatial function relative to another magnet 414 and also the magnet 404 (by itself) will have a resultant (or composite) field strength vs. separation distance curve relative to a measurement location 402 near the magnet 404. Generally, the resultant field strength vs. separation distance depends on the coding of the magnet 404 and the location of the measurement location 402 as well as other characteristics of the magnet 404 such as the grade of material, maxel size, maxel shape, maxel strength, etc (step 422). But, once a coded magnet's resultant field strength vs. separation distance curve is determined relative to a measurement location 402, it can be used to identify a required separation distance that will result in limiting the magnetic field to meet a field criteria (e.g., maximum allowed external field strength) at that measurement location 402 (step 424). Once that required separation distance is determined, a retractable magnet assembly 400 can be designed such that the magnet 404 can retract at least the determined required separation distance (step 426).

Figure 41A:
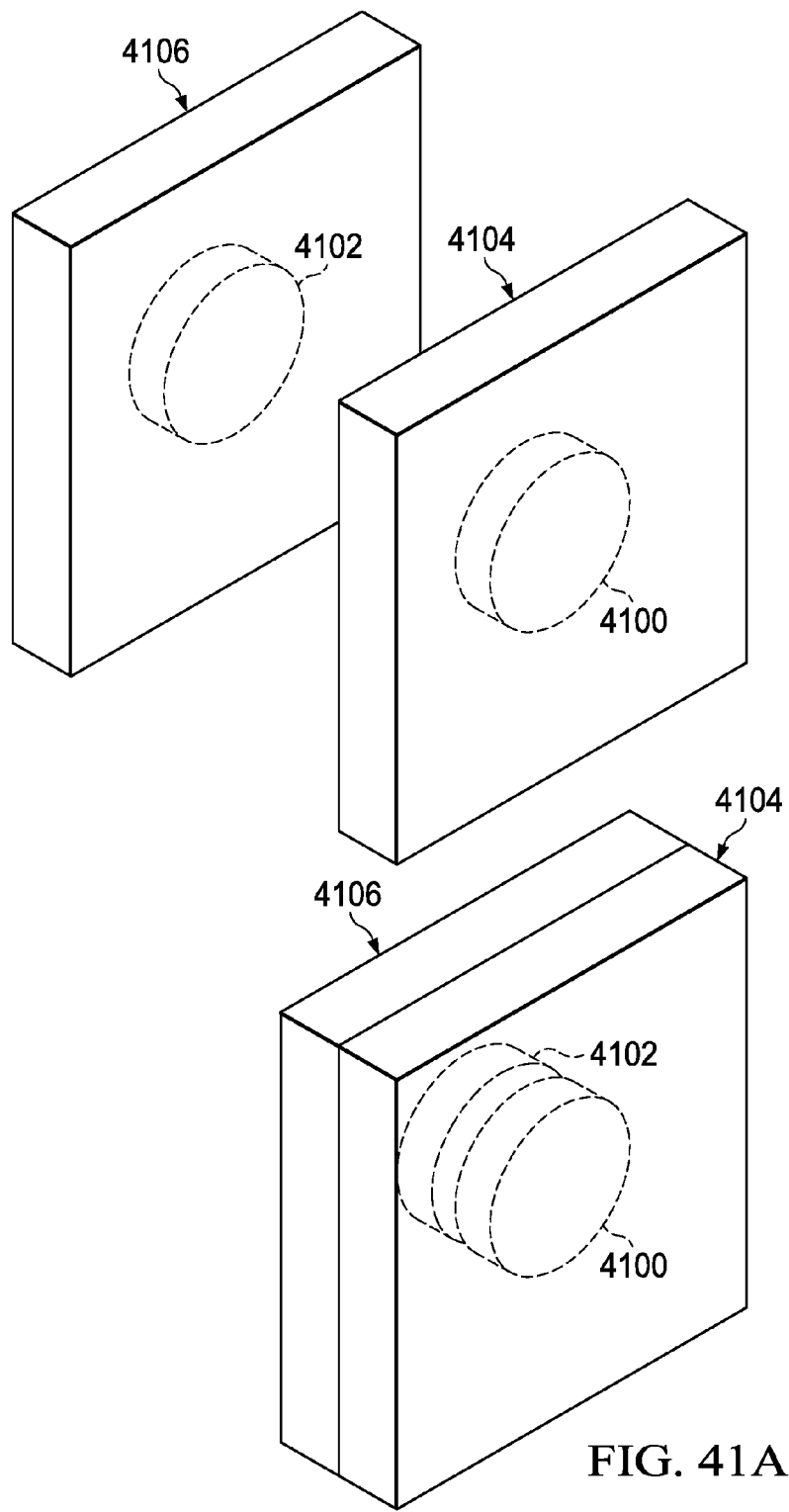
FIG. 41A depicts magnets having multi-level repel-snap or hover-snap behavior being used to attach two objects.

FIG. 41A depicts magnets 4100 and 4102 having multi-level repel-snap or hover-snap behavior being used to attach two objects 4104 and 4106. The two objects 4104 and 4106 having coded magnets 4100 and 4102 integrated beneath their surfaces (as indicated by the dashed lines) are shown in a non-attached orientation (top figure) and an attached orientation (bottom figure). One skilled in the art will recognize that the magnet pairs 4100 and 4102 do not have to be integrated into objects 4104 and 4106 and that they can be otherwise attached to the objects 4104 and 4106. Moreover, the magnetic structures 4100 and 4102 could comprise different shapes, involve multiple smaller magnets arranged to produce the proper behavior, and all sorts of other variations are possible to practice the invention.

Figure 41B:
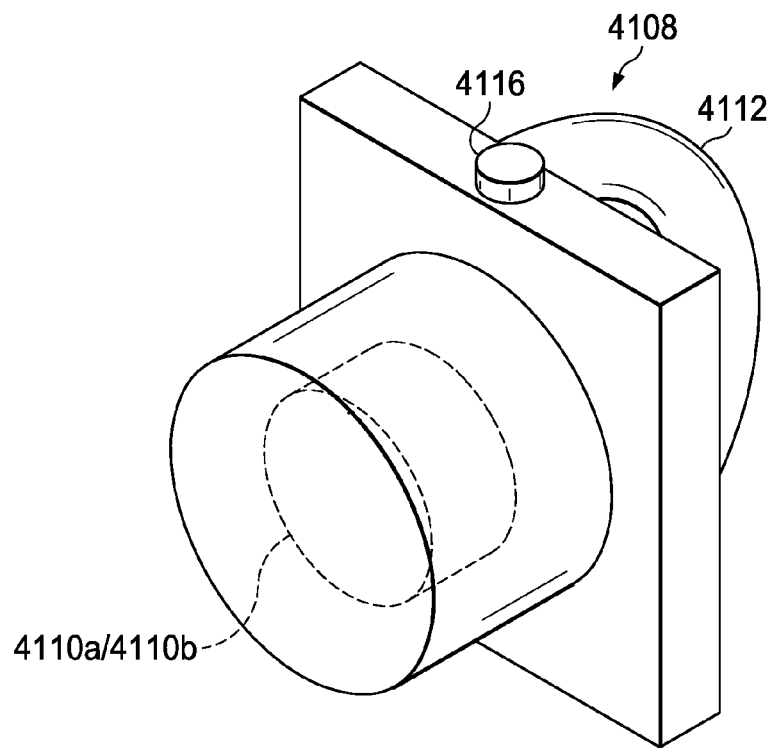
FIG. 41B depicts an exemplary disengagement/engagement tool.

FIG. 41B depicts an exemplary disengagement/engagement tool 4108 that can be used to cause the repel-snap or the hover-snap magnets 4100 and 4102 of FIG. 41A to separate thereby allowing separation of the two objects 4104 and 4106 or to cause them to snap together to attach to objects 4104 and 4106. Generally, the repel-snap and hover-snap magnets 4100 and 4102 will transition from a given state to another given application of a force or application of a bias magnetic field. As such, a disengagement/engagement tool 4108 can be designed relative to the design of a given magnet pair 4100 and 4102 so as to apply an appropriate bias magnet field to change the state of the magnet pair 4100 and 4102. The tool 4108 could involve a permanent magnet(s) 4110*a* and could involve an electromagnet(s) 4110*b* that could be switchable on-and-off and otherwise allow control (variable control) of polarity and field strength. Although a handle 4112 is shown configured on the backside of the tool 4108, one skilled in the art would recognize that a handle 4112 isn't required and that one or more handles could be configured to allow either end of a permanent magnet 4110*a* to be applied so as to transition magnet pairs 4100 and 4102 from either a closed state to an open state or vice versa. Additionally, the bias field of the tool 4108 may itself be coded such that it will function properly only when in a desired orientation with the magnet pair 4100 and 4102. As such, the coding of the magnet pair 4100 and 4102 and the coding of the tool 4108 must match much like a lock and key.

Figure 41C:
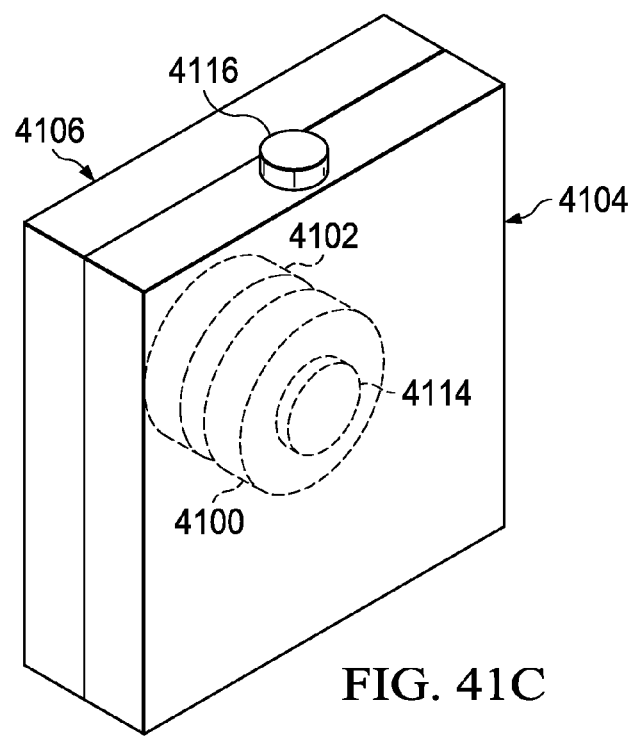
FIG. 41C depicts an exemplary electromagnet located in proximity to an attachment apparatus such as depicted in FIG. 41A, where the electromagnet can be used to change the state of a repel-snap magnet pair or a hover-snap magnet pair.

FIG. 41C depicts an exemplary electromagnet 4114 located at a fixed location in proximity to an attachment apparatus such as depicted in FIG. 41A, where the electromagnet 4114 can be used to change the state of a repel-snap magnet pair 4100 and 4102 or a hover-snap magnet pair 4100 and 4102. As shown, a control button 4116 would activate the electromagnet 4114 by supplying electricity from a power source (e.g., a battery) (not shown) that would cause the electromagnet 4114 to produce the necessary bias field to cause the magnet pair 4100 and 4102 to disengage thereby detaching the objects 4104 and 4106 (note: the disengagement/engagement tool 4108 in FIG. 41B may also have a control button 4116 to activate the electromagnet 4100*b*). Such an arrangement would allow for quick installation of panels having no visible means for opening and then quick detachment using the tool 4108. Similarly, attaching two objects 4104 and 4106 may require the tool 4108 to cause the magnet pair 4100 and 4102 to snap after the two objects 4104 and 4106 are brought together, for example, if one of the magnets 4100 of the magnet pair 4100 and 4102 was configured in a retractable magnet assembly. The electromagnet 4114 shown in FIG. 41C is located behind the magnet 4100 but one skilled in the art will recognize that all sorts of configurations are possible to control one or more electromagnets 4114 to produce one or more bias fields used to vary the state of one or more magnet pairs 4100 and 4102 having repel-snap or hover-snap behaviors.

FIG. 41D depicts an exemplary enclosure 4130 whereby a given magnet 4132 of a repel-snap magnet pair 4132 and 4134 or a hover-snap magnet pair 4132 and 4134 can move to one side 4136 of the enclosure 4130 when 'snapped' to the other magnet 4134 and can move to the other side 4138 of the enclosure 4130 when 'repelled' away from the other magnet 4134. The enclosure 4130 is much like the retractable magnet assembly 4000 of FIGS. 40A-40C except an electromagnet 4140 is shown at the back of the containment vessel 4130 in place of a magnetic strip, which is not required given the repel forces and/or the hover location can be sufficient to keep the magnet in its refracted position. The electromagnet 4140 can be controlled to apply a bias field to cause the magnet 4132 to retract and to move forward to an engagement (snapped) position.

FIGS. 42A and 42B depict alternative stacked multi-level structures 4200a and 4200b intended to produce a click on-click off behavior much like certain ball-point pens. The behavior is similar to the repeatable hysteresis behavior described previously except it is desirable that the bottom pair of magnets and remain attached (snapped together) until purposely disengaged by the application of force. In FIG. 42A a middle magnet (magnet 2) can be a conventional magnet whereby magnets 1 and 3 are coded to produce repel snap behavior when interacting with magnet 2. Magnet 1 also has a spacer 4202a Many other alternative coding methods can also be employed that result in magnet 2 having repel snap behavior with both magnets 1 and 3. In FIG. 42B, magnets 2 and 3 are attached using an intermediate layer 4202b such that they move together as one object yet otherwise independently interact with magnets 1 and 4 respectively such that both magnets 1 and 2 and magnets 3 and 4 exhibit repel snap behavior.

FIG. 42C depicts the click on-click off behavior of the stacked multi-level structure 4200a of FIG. 42A (the same behavior would apply to the stacked multi-level structure 4200b of FIG. 42B). First, a force 4200 is applied to magnet 1 which causes the middle magnet 2 to move downward until the bottom pair of magnets 2 and 3 snap together (step 1). The force 4200 is removed and the top magnet 1 is repelled upward to a location lower than its initial location (step 2). When a force 4202 is re-applied to magnet 1 to an extent that the top magnet 1 begin to engage, the attraction between the top two magnets 1 and 2 causes the bottom two magnets 2 and 3 to disengage. As the bottom two magnets 2 and 3 disengage the repel force between the bottom two magnets 2 and 3 acts as a bias field causing the top two magnets 1 and 2 to also disengage thereby returning the magnet structure 4200a to its initial state (step 3). As such, the behavior can be described as a click on-click off behavior. One skilled in the art will recognize that various techniques can be applied to include additional bias fields, use of a spring, using of travel limiting devices, use of different sized magnets where overlapping regions and tabs are used to disrupt magnets such that they disengage, etc.

The pulsed magnetic field generation systems described in U.S. patent application Ser. No. 12/476,952, filed Jun. 2, 2009, titled "A field emission system and method", which is incorporated herein by reference, produces magnetic sources called maxels. The magnetization of the maxels depends on many factors including the grade of magnetizable material, the sintering of the material, the size and other characteristics of the magnetizing inductor (or print head), the thickness of the material, the current used to magnetize the maxel, and so on. To achieve a maxel having a desired diameter, one may have to lower the current used since once the material being magnetized becomes saturated at the maxel location, additional magnetization will cause the maxel to expand or bleed outward causing it to have a larger diameter. In accordance with the invention, additional magnetizable material can be placed in contact with the material being magnetized to enable a high current to be applied so that any excess magnetization will transition into the additional magnetizable material. Additionally, various alternative approaches exist for affecting the magnetization of a maxel including having a template beneath the material having predefined magnetization characteristics, having external magnetic field sources intended to bias (or steer) the magnetization of a maxel, having various combinations of abruptly saturable shielding materials (e,g., Permalloy) and/or slowly saturating shielding materials like iron or steel.

It is desirable to have cylindrically shaped magnetizable material that could be magnetized where the domain alignment would be radially symmetric from the center of the cylinder much like spokes on a wagon wheel. Such material could then be fully magnetized using the pulsed magnetic field generation system (i.e., the magnetizer) of the invention to produce a pattern of maxels around the outside of the cylinder without requiring variation of the current used to produce each maxel. However, if cylindrically shaped magnetizable material is fabricated to have diametric domain alignment then one can take into account the angle of the domain alignment of the material to the direction of magnetization by the magnetizer print head and vary the current of the maxels to normalize maxel field strengths, for example, half the current might be applied along the direction (or axis) of domain alignment than is applied ninety degrees off the axis of domain alignment.

One application of correlated magnets is an anti-kick blade release mechanism for a saw whereby when a blade bites into an object, e.g., wood, such that it would become locked and would otherwise kick the blade up and/or the object out, the blade would disengage. The saw could also be made to automatically turn off upon this occurrence.

Another application of correlated magnets is with flying model aircraft which would allow portions such as wings to be easily attached to enable flying but easily detached for storage and transport.

Below are some additional ideas for devices incorporating correlated magnetics technology.

Stackable forks, spoons, knives, plates, and bowls:
   Allows utensils to stack better in drawers
   Less wear and tear when stacked
   Less noise when putting utensils away or getting them out
   Provides spacing so that cleaning is more easily performed by dishwashers Showers and shower storage devices—keeps storage in place and can be removed for easy cleanup of shower. The problem with traditional shower storage is that it iss kept in place via suction and/or friction, both of which are unreliable methods of keeping a shower implement in place. Additionally, the difficulty of achieving proper attachment with conventional suction or friction devices creates a disincentive to removal for cleaning or repositioning. Where shower liner/insert manufacturers and tile manufacturers embed coded magnets into their products, then a wide range of accessories can be made to mount to the side of shower or any bathroom or kitchen wall surface that iss constructed with such material. Examples of accessories include soap dishes, shampoo bottle shelves, towel racks, waterproof media devices, mirrors, etc.

Construction/farm equipment and accessories—same as above but for heavy equipment and farm implements—in farm implements and heavy machinery, the need exists for cup holders, tool holders, and various other accessories Embedded into little league baseball home plates to support the installation of tees for t-ball. In prior art t-ball, coaches must supply their a tee with its own stand because putting a hole in the middle of the traditional home plate is unsightly and potentially unsafe. By fitting the traditional home plate with CM technology and a simple drawn circle, the t-ball tee can be magnetically attached to the traditional home plate that coach- and player-pitch little league use. The magnetic force will preferentially be strong enough to support tee and the ball, but designed to break away or be easily removed so that the batters can get used to a "real" home plate (rather than dodging the tee when they approach home from third base). Additionally, the tee can easily (and inexpensively) be replaced since it is the piece that receives the most damage from the swings of inexperienced players.

Sealing coffins, vaults, and crypts.

Farm equipment power take off (PTO) quick connect. Includes native operation as well as adapters for existing equipment.

Screws with correlated magnetic heads that are matched to screwdriver bits so that the bit can be "dipped" into a box of these screws for hands free placement and alignment of screw to screwdriver. Same as above with nails/hammers and other fasteners/tools.

Car roof racks (and other external automotive accessories).

License plates—probably on vanity plates initially.

Expandable dumbbell set.

Built-in coded magnets in standard kitchen appliances to allow a whole host of accessories to be developed—similar to a car rack, towel racks and other accessories could be mounted.

Adapter hardware for standard fastener sizes—enables coded magnet products to be mounted where traditional objects would normally be screwed or bolted.

Street and road signs that "break away"—For safety purposes, the majority of highway road signs are designed to break off or shear when hit with extreme force (such as a motor vehicle accident). These are typically installed by connecting a piece of the pole that's been buried in concrete with the top section of a pole (with sign) using 4 to 8 small bolts. These bolts (and the associated labor to install them) can be replaced by CM technology.

Patient levitation beds based on magnetic repulsion to reduce/eliminate bedsores during hospital stays. Magnets would be built into a patient carrier which would then be supported and held in place by corresponding magnets on the bed.

Patient gurney which uses correlated magnets to lock it into place inside the ambulance. Replaces conventional locks which are subject to spring wear, dirt, corrosion, etc.

Patient restraining device using correlated magnets. Could use keyed magnets on patient clothing and corresponding magnets on a chair, etc.

Engine or motor mounts which use multi-level contactless attachment devices to reduce or eliminate vibration.

Easily removable seat pads.

Boot/shoe fasteners to eliminate strings or Velcro.

Self-aligning hitch for trailers.

Elevator door lock to replace conventional mechanical locks.

Keyed magnet spare tire mount.

Interchangeable shoe soles (sports shoes, personal wear, etc.)

Light bulb bases to replace screw mounts.

Oven rotisserie using slow-motor technology.

Kitchen microwave rotating platform using slow-motor technology.

No-contact clutch plate, eliminating wearable, friction plates.

Longer-lasting exercise bike using variable opposing magnets (eliminating friction-based components).

Purse clasp.

Keyed gate latch.

Using linear magnets to stop runaway elevators or other mechanical devices.

After-market coaxial cable, with end caps that screw on to the TV and wall plate and stay, and a cable that magnetically attaches to those end caps.

Industrial gas cylinder caps that are magnetic instead of the current threaded caps that are exceedingly difficult to use. Magnetic caps could be coded such that all $O_2$ bottle caps work on all $O_2$ bottles, all $CO_2$ caps work on $CO_2$ bottles, etc.

Biomedical Applications:

Use of contactless attachment capability for the interface between mechanical and a biological element and for the interface between two biological elements. The reason is that if there is too much pressure placed on biological tissue like skin it impedes the capillaries feeding the tissue and will cause it to die within an hour. This phenomenon, ischemic pressure necrosis, makes interfacing mechanical and biological elements—and often two biological elements that are not being joined permanently via stitches or other methods, very difficult. The contactless attachment is a powerful tool to address this problem. Potential applications identified for mechanical to biological attachment included attaching prosthetics where one of the magnets is implanted under the skin, attaching external miniature pumps, and as ways to hold dental implants, a device to avoid grinding in TMJ, and as a way to hold dentures in place and aligned. For biological to biological attachment, the ideas included magnets implanted in the soft palate and the bone above for sleep apnea, and use to address urinary incontinence. CM might be the basis of a valve at the top of the stomach that is able to be overcome swallowing to address acid reflux.

Magnetically controlled transmoral necrosis for creating gastrojejunostomy for people with morbid obesity. The idea is that a patient could swallow one magnet and wait until it gets to the right part of the intestine and then swallow another. Once the second got into the stomach, it would align and connect to the first causing necrosis of all the tissue in between and creating a bypass between the stomach and the intestine. It would produce results similar to the surgery performed today but would not require invasive surgery.

Implanting a CM with a contactless attachment in sinuses of patients who have chronic sinus issues. A corresponding CM placed adjacent to the patient's cheek could cause the sinus to distend and help fluid inside to flow.

Use CMs as transducers for hearing aids.

CM-based rehab equipment.

CMs that could start out magnetic but lose that ability over time and the opposite, where they start out nonmagnetic but become magnetic over time. One could swallow magnets to do a job and at some point they would release and exit the body. Or, they could be in the body until they got to a certain place, at which they would attach. Could add a battery and small electromagnet bias magnet to a CM to be able to control it. Could put a dissolving material around the magnets that might degrade over time so that it let the magnet do something different once the material was gone.

prosthetic attachment—snap on, turn to remove.

joint replacement (knee, spinal discs, etc)—with contactless attachment so no wear.

joint positioning (spinal discs, etc)—use alignment to make sure stay in place.

breakaway pad—use breakaway spring capability to eliminate hotspots and thus bedsores.

gene sorting—more advanced gene sorting than possible with conventional magnets.

Rehab equipment—magnet controlled forces for rehab equipment.

placement of feeding tube—guide a nasal feeding tube from outside body through stomach and into intestine.

drug targeting—tag drugs (or stem cells, etc) with magnetic materials and direct them to a specific place in the body.

Flow control devices—precision dispensing using controlled valve.

Control contamination—gears, separators, etc. that don't touch to avoid cross contamination.

Seal-less valves.

Pumps (heart, etc)—potential to design novel pumps with new attributes.

Versions of the RepelSnap magnetic structures have been designed to include a 'radially symmetric' version that will achieve attachment regardless of the rotational alignment of the two magnetic structures, and a 'directional' version that requires a specific rotational alignment to achieve attachment. FIG. 34 depicts complementary RepelSnap-D (for directional) codes and a force vs. separation distance curve for two N42 grade neodymium iron boron (NIB) magnetic structures printed with all maxels having the same field strength (i.e., all were printed with the same voltage of 175V). In this figure, a positive force value corresponds to a repel force and a negative force value corresponds to an attract force. The force curve illustrates the RepelSnap behavior: as the two magnetic structures are brought together, the repel force increases to a peak of about 13.5 pounds at about 0.7 inches separation. Then the repel force rapidly decreases to zero force at about 0.2 inches separation. At this point the two magnetic structures begin to attract each other and latch together with a peak attraction force of about 7 pounds.

A mechanical device such as a spacer can be used to control the amount of force attaching two RepelSnap magnetic structures, and likewise the amount of force required to cause separation (i.e., repel each other). Thus, for the coded magnetic structure pair depicted in FIG. 34, a mechanical spacer of any thickness greater than zero and less than the distance to the transition point (about 0.2 inches) will serve to adjust the amount of attract force from about 7 pounds of force to just slightly more than 0 pounds of force.

Figure 43B:
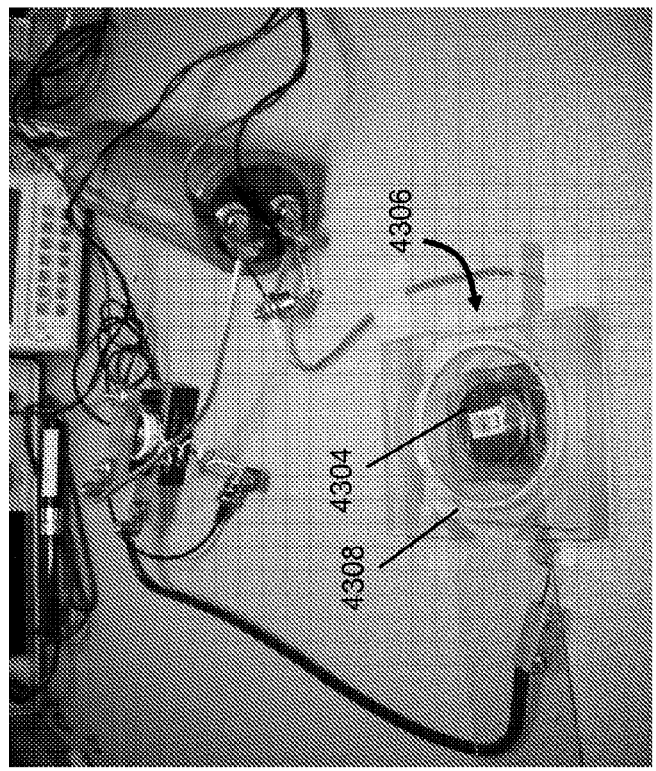
FIGS. 43A-43D depict an exemplary detachable cover system.
Figure 43A:
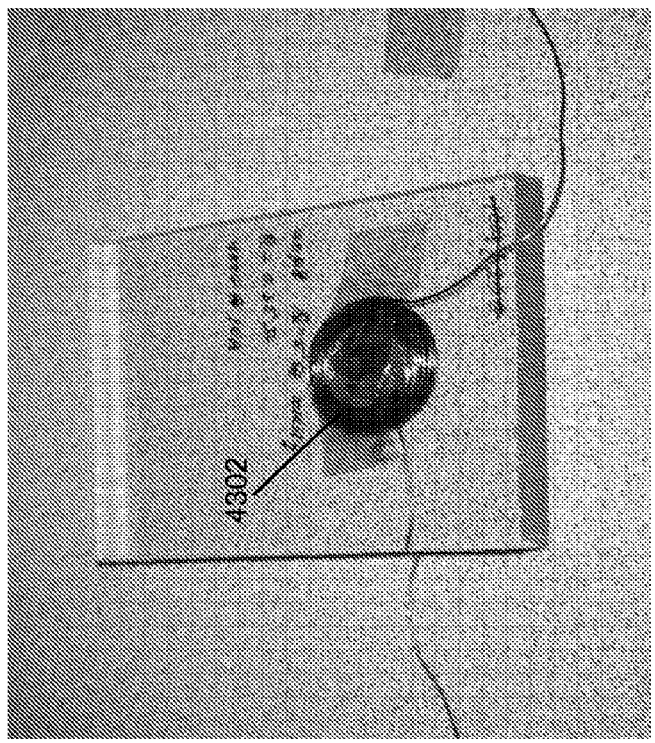
Figures 43C, 43D:
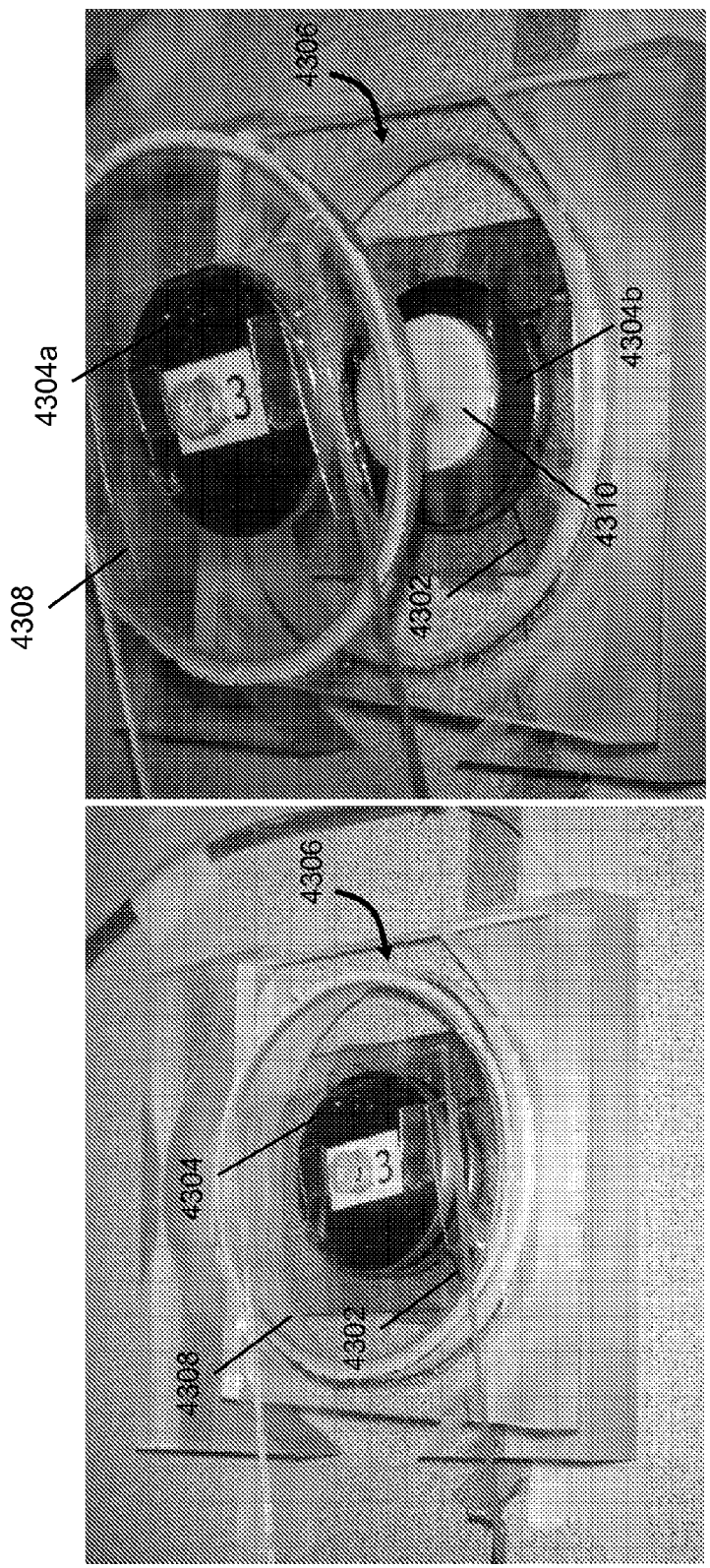

Regardless of the designed release force, the magnetic structures can be separated using an external magnetic (bias) field from either a conventional magnet or from an electromagnet. FIG. 43A depicts a wire coil 4302 and FIG. 43B depicts a RepelSnap coded magnetic structure pair 4304 configured as part of a proof-of-concept detachable cover system 4306, where the bottom magnetic structure 4304b of the RepelSnap coded magnetic structure pair 4304 is taped on top of the coil 4302 and the top magnetic structure 4304a is taped to a removable cover 4308 attached to a hinge (not shown). FIGS. 43C and 43D depict the detachable cover system 4306 before and after an external magnetic field was applied using the electromagnet (wire coil) 4302. For this proof-of-concept system, the thicker the spacer 4310 used, the lesser the external field required to cause separation.

In accordance with the present invention, a correlated magnetic structure pair that does not exhibit multi-level magnetism behavior can also be detached using a bias magnetic field provided by a permanent magnet or by an electromagnet. As such, correlated magnetic structures can be designed to not exhibit multi-level magnetism behavior but meet various other behavioral, alignment, and/or force requirements (e.g., shear force requirements) where the correlated magnetic structures can be detached by a bias field. The following scenario is provided as an example.

It is desirable to design a pair of correlated magnetic structures that achieve a desired movement behavior while providing shear forces that enable them to be used as part of an attachment system involving a first object, a second object, and a stretchable material. One end of the stretchable material is to be attached to a first magnetic structure and the other end of the stretchable material is to be attached to the first object. A second magnetic structure is to be attached to a second object, where it is desirable to use magnetic forces produced by the two magnetic structures to cause the magnetic structures to move from a first relative location to a second relative location such that they attach to each other, where the movement of the first magnetic structure will stretch the stretchable material causing a side load (or pull) force to be applied to the first magnetic structure. The first and second magnetic structures are to be mechanically constrained such that the first magnetic structure can move horizontally and the second magnetic structure can move vertically as shown in FIG. 44. When the first magnetic structure 4402a is at the first position relative to the second magnetic structure 4402b, the stretchable material is to provide no side load force (or pulling force) to the first magnetic structure 4402a. When the first magnetic structure 4402a moves from the first location to the second location and attaches to the second magnetic structure 4402b an initial side load of N pounds of force is to be provided to the first magnetic structure 4402a due to stretching of the stretchable material. The correlated magnetics structures are to be designed to stay attached given a maximum side load force of M pounds of force. As such, the correlated magnetic structures must withstand a shear force of at least M pounds of force from the direction of any pulling force provided by the stretchable material. When a sufficient external bias field is applied, the magnetic structures are to become detached.

To achieve the desired movement and shear force requirements, complementary codes 4502a 4502b such as depicted in FIG. 45 were designed that include first portions 4504a, 4504b used to achieve the desired movement behavior and second portions 4506a used to increase shear forces as necessary to meet desired shear force requirements. The two codes were then used to magnetically program pairs of magnetic structures 4402a 4402b, where optional shunt plates (i.e., very thin saturable metal layers) can be used to increase tensile and shear force characteristics as shown in FIG. 44. FIGS. 46A thru 46D are intended to depict attract and repel forces between each of the six rows of the first and second magnetic structures 4402a 4402b corresponding to the first portions 4504a 4504b of the codes used to program them, where FIGS. 46A thru 46D depict the coding on the top surface of the first magnetic structure 4402a and the coding on the bottom of the second magnetic structure 4402b. As shown in FIG. 46A, when the first magnetic structure 4402a is in a first position relative to second magnetic structure 4402b the two structures produce both repel and attract forces that combine to cause the two structures to begin to move towards the second relative position in accordance with the desired movement behavior. Specifically, five of the opposing magnetic source pairs are in a repel state and one magnetic source pair is in an attract state. A slight imbalance exists where the attract force causes the structures to pull towards the second position and the repel forces causes the structures to push away from the first position. Once the movement from the first position towards the second position begins, the attract forces increase and the repel forces decrease until the complementary magnetic sources achieve alignment and attachment at position 2. It should be noted that FIGS. 46A through 46D do not depict the vertical movement of the second magnetic structure 4402*b*, which would become closer and closer to the first magnetic structure until they attach. This vertical movement also increases the effect of the force interaction being depicted in FIGS. 46A and 46D. The additional vertical movement is shown in FIGS. 47A thru 47D.

Four different complementary coded magnetic structure pair implementations were produced using the codes of FIG. 45 in order to assess different thicknesses and grades of magnetizable material and the effect of using optional shunt plates. Specifically, 1"×1"×⅛" N52 grade NIB material was used to produce coded magnetic structure pairs both with and without shunt plates and 1"×1"×1/16" N42 grade NIB material was used to produce coded magnetic structure pairs both with and without shunt plates. Measured shear and tensile forces for the four coded magnetic structure pairs and also conventional magnets are listed in the following tables.

|  | Max Shear Force at Contact [lb] | Max Tensile Force at Contact [lb] |
| --- | --- | --- |
| Coded Magnetic Structures | | |
| 1" × 1" × 1/16" N42 | 8 | 12.5 |
| 1" × 1" × 1/16" N42 w/Shunt Plate | 12 | 24 |
| 1" × 1" × 1/8" N52* | 16 | 21 |
| 1" × 1" × 1/8" N52 w/Shunt Plate | 21 | 38 |
| Conventional Magnets | | |
| 1" × 1" × 1/16" N42 | 2.5 | 7 |
| 1" × 1" × 1/8" N52 | 5.5 | 17 |

A complementary coded pair of correlated magnetic structures will achieve a peak attractive (tensile) force when their complementary magnetic sources are all aligned. To cause them to detach from their alignment position, a repel force must be provided that is greater than the peak attractive force. In accordance with the present invention, a bias field can be applied to produce a repel force large enough to cause two attached correlated magnetic structures to separate a distance where they will remain in an open state when the bias field is removed. Under another arrangement, a bias field can be applied to produce a repel force large enough to cause two attached correlated magnetic structures to separate a distance where they will reattach in a closed state when the bias field is removed.

There are numerous ways to design and construct an electromagnetic device to interact with a correlated magnetic structure. In order to assess various designs, it is useful to determine magnetic and electromagnetic interaction characteristics that correspond to a design parameter space for designs of an electromagnet based detachment system intended to support an envelope of operation. One approach to generalizing the design parameter space is to provide a parametric characterization (or behavioral model) of an electromagnet interacting with a magnetic structure.

In order to identify design options a test apparatus corresponding to a simple solenoid configuration was assembled and used to measure the repel force produced between a magnet and electromagnet. The test apparatus 4800 is depicted in FIGS. 48A and 48B. Referring to FIGS. 48A and 48B, the test apparatus 4800 includes a conventional magnet 100 located in a fixed position above a coil 4302. A load cell 4802 is used to measure the repel force between the magnet 100 and coil 4302. Measurement can be made for different separation distances between the coil 4302 and magnet 100 by varying the height of the table 4804 to which the load cell 4802 and coil 4302 are attached.

As seen in FIGS. 48A and 48B, the components involved in the test apparatus 4800 include a power supply 4806, a 0.25 F capacitor 4808 rated up to 40 VDC, an electromagnet (i.e., copper wire coil) 4302, a load cell 4802, and a conventional permanent magnet 100. The conventional permanent magnet 100 was a 0.75" square×⅛" thick NIB magnet. The test apparatus 4800 used approximately 2000 amp-turns. The coil inductance was measured at 40 uH at 10 KHz with a resistance of 0.35 Ohms and produced a 400 G DC field at 10 A. The load cell 4802 was placed beneath the electromagnet 4302 to record the repel force produced between the electromagnet 4302 and the conventional permanent magnet 100 when the electromagnet 4302 is activated. The electromagnet 4302 was brought a centimeter from the conventional magnet 100 and a 20V charge was provided to the capacitor. The electromagnet 4302 was then pulsed and the resulting repel force was recorded. It should be noted that the electromagnet 4302 was acting upon a single conventional magnet 100 and not a coded magnet pair.

Figure 49:
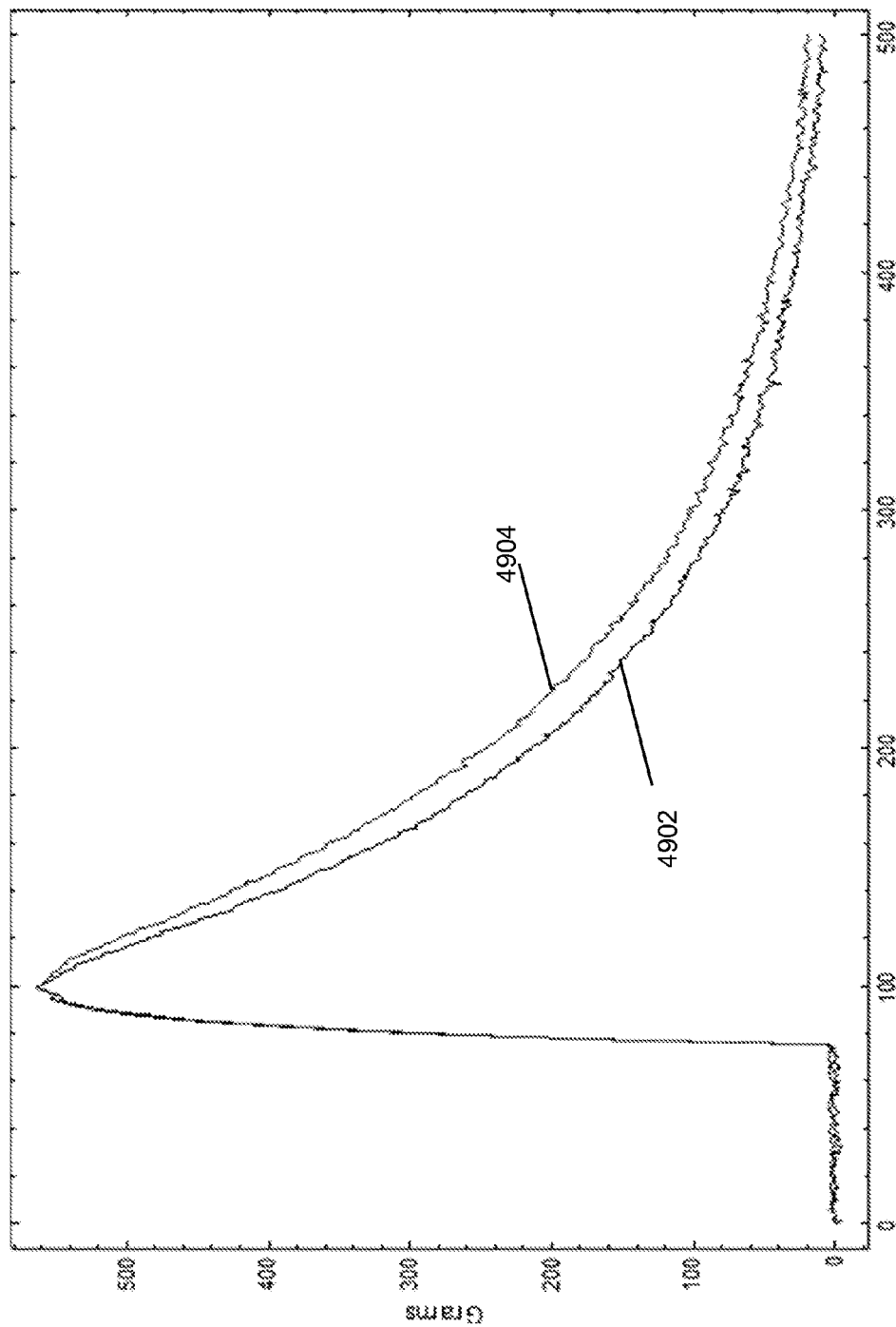
FIG. 49 depicts an exemplary repel force produced during an electromagnetic pulse.
Figure 50A:
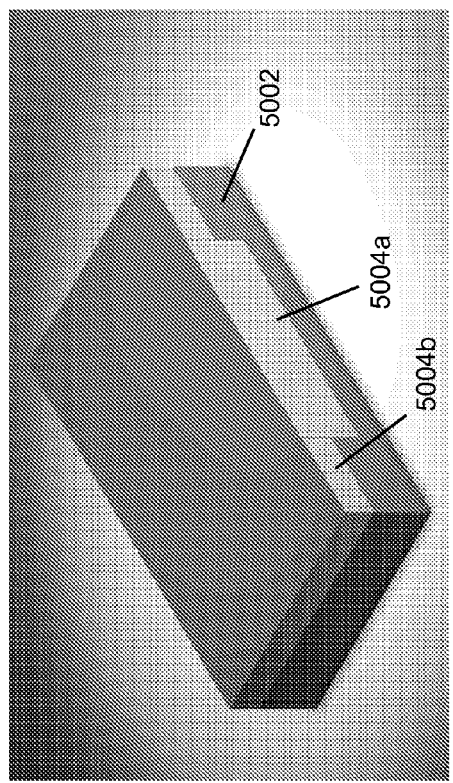
FIGS. 50A and 50B depict an exemplary U-shaped core of an electromagnet.
Figure 50B:
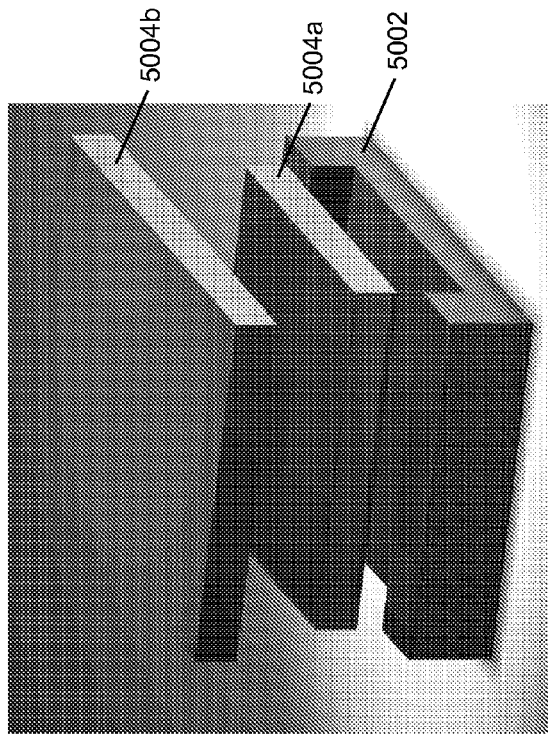

FIG. 49 depicts the repel force produced during the electromagnetic pulse. A first curve 4902 in FIG. 49 shows the repel force produced when the electromagnet was pulsed. The second curve 4904 depicts the repel force produced when a demagnetized 1" square×⅛" thick NIB magnet was placed in the air gap between the electromagnet and the conventional permanent magnet. As seen in FIG. 49, the presence of the demagnetized magnet had some influence but didn't change the peak or rise time of the repel force produced, where the peak repel force produced was around 570 grams (or approximately 1.3 pounds) and the rise time was approximately 25 ms. Although the test apparatus was a simple solenoid configuration, it demonstrated basic repel force characteristics (e.g., rise time, peak force, decay rate) produced when an electromagnet is pulsed relative to a magnet, and illustrated variables in the design parameter space for an electromagnet based detachment system such as the amount of air gap, core characteristics, coil characteristics, capacitor characteristics, etc. In a preferred embodiment of the invention, an electromagnet, shown in FIGS. 50A and 50B, has a U-shaped core, which allows portions of the core to be in close proximity to portions (or regions) of one of the magnetic structures of a pair of correlated magnetic structures. A top magnetic structure has a central region that is the same size as the bottom magnetic structure and has two outer regions that overlap the two side portions of the U-shaped core that extend upward and around the bottom magnetic structure. The central region of the top magnet and the bottom magnet are complementary coded, such as the code design previously described above in relation to FIG. 45. The two outer regions of the top magnetic structure are coded to maximize the repel force once the electromagnet is activated, which produces an electromagnetic field in the regions where the two side portions of the electromagnetic core contacts (or nearly contacts) the top magnetic structure.

Figure 51A:
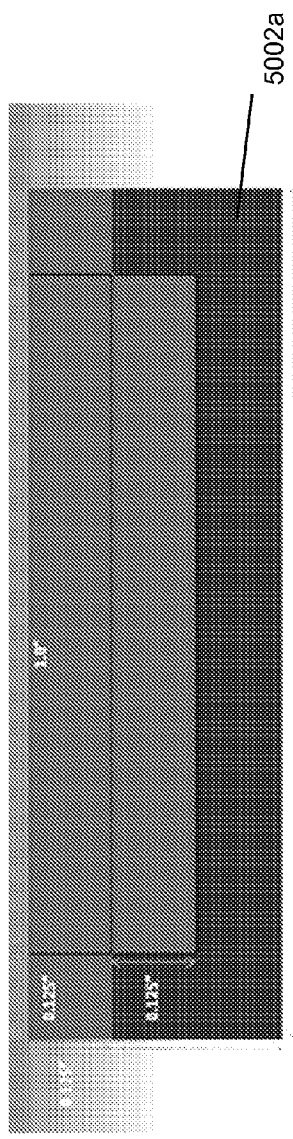
FIGS. 51A-51C depict different size configurations of the U-shaped core of FIGS. 50A and 50B.
Figure 51B:
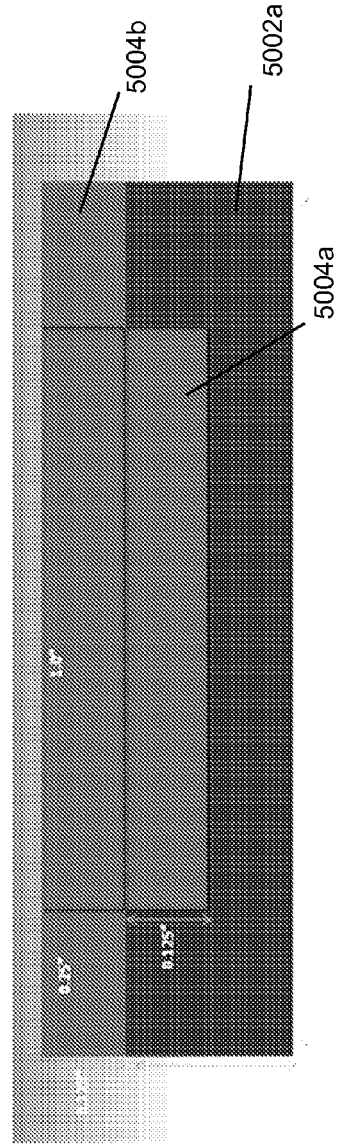
Figure 51C:
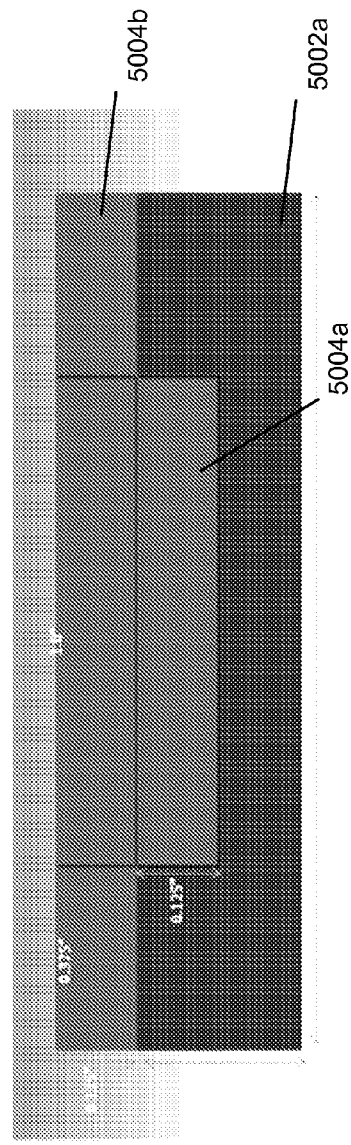

In accordance with one aspect of the invention, dimensions of the U-shaped core can be sized to achieve desirable repel force characteristics. FIGS. 51A thru 51C depict three sizes of the U-shaped core, where the two side portions of top magnetic structures are 0.125", 0.25", and 0.375", respectively, and the central portion of the top magnetic structure and the bottom magnetic structure are 1"×1"×⅛".

Figure 52:
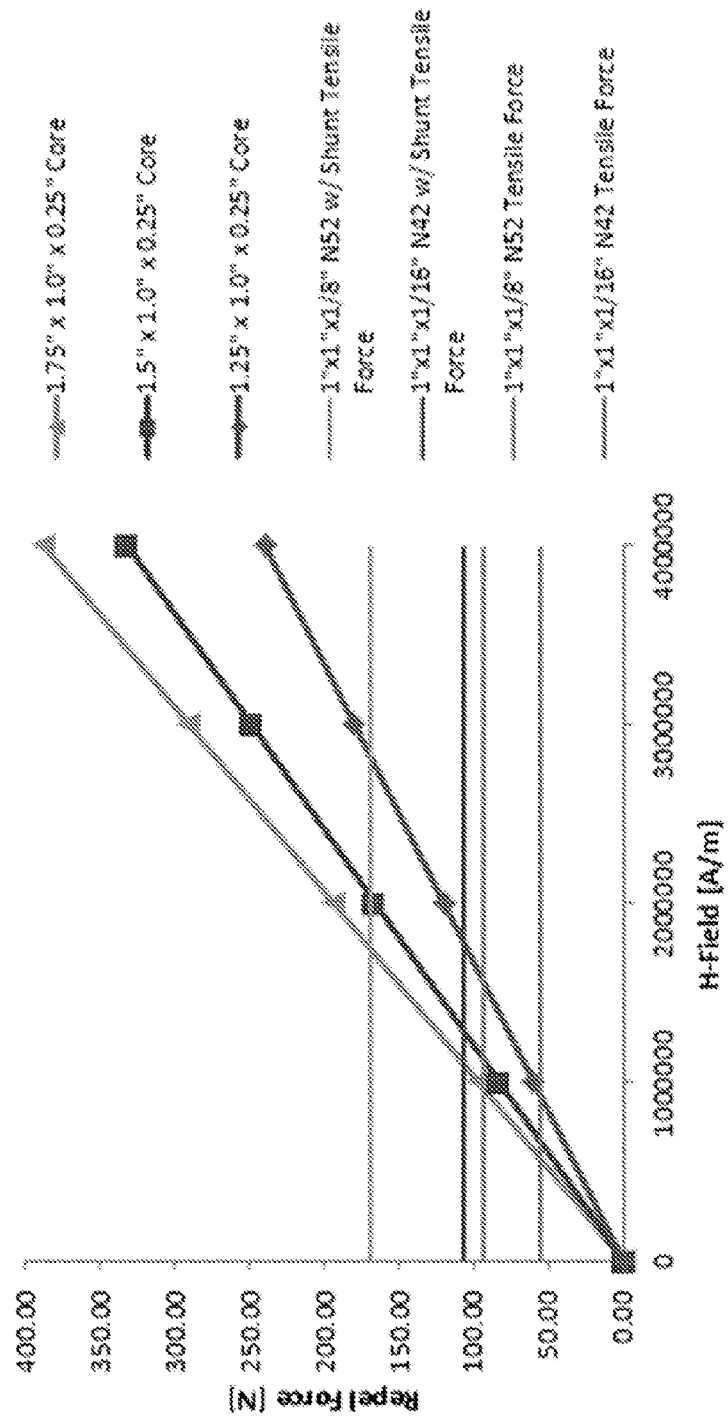
FIG. 52 depicts results of a static model that predicts the Repel Force versus H-Field for three sizes of the selected electromagnet configuration.

FIG. 52 displays the results of a static model that predicts the Repel Force versus H-Field for three sizes of the selected electromagnet configuration. The coil characteristics, capacitor sizes, charge voltages, and the like were not defined for the model. Instead, the static model calculated the peak repel force given maximum magnetic field saturation of the steel making up the core, which would occur at approximately 4,000,000 A/m. As such, the lines graphed for the three configuration sizes represent the repel forces produced from zero to maximum saturation of the cores making up the various sizes. Tensile strength 'thresholds' are shown corresponding to the four implementations of the correlated magnetic structure pairs that indicate minimum repel forces required to cause their magnets to separate. Thus, the amount of saturation required to achieve separation for a given magnet pair and for a given configuration size can be determined. For example, the smallest configuration (1.25"×1.0"×0.25") requires about 70% saturation to repel the strongest of the four magnet pair implementations. It is noteworthy that since the shear forces of the four magnet pair implementations exceeded the 6 lb requirement for shear force, their tensile forces were also much greater thereby making their repel requirements greater. However, this means there is room for reductions in magnetic material to produce a coded magnet pair having 6 lb of shear that would have a tensile force of approximately 7.875 lb, which corresponds to a much lower tensile strength threshold of approximately 35 Newton.

Figure 53:
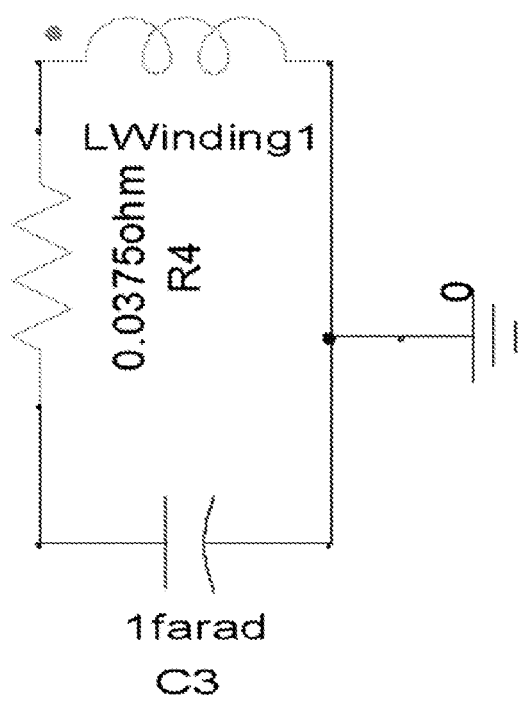
FIG. 53 depicts a circuit used in a transient simulation.

A relatively simple transient simulation was constructed to model the repel force produced by the selected electromagnet-correlated magnet configuration. The circuit used in the simulation employed a 1 F capacitor charged to 10V and used a 0.0375 ohm resistor in series to represent systemic resistance. This circuit is depicted in FIG. 53.

Figure 54:
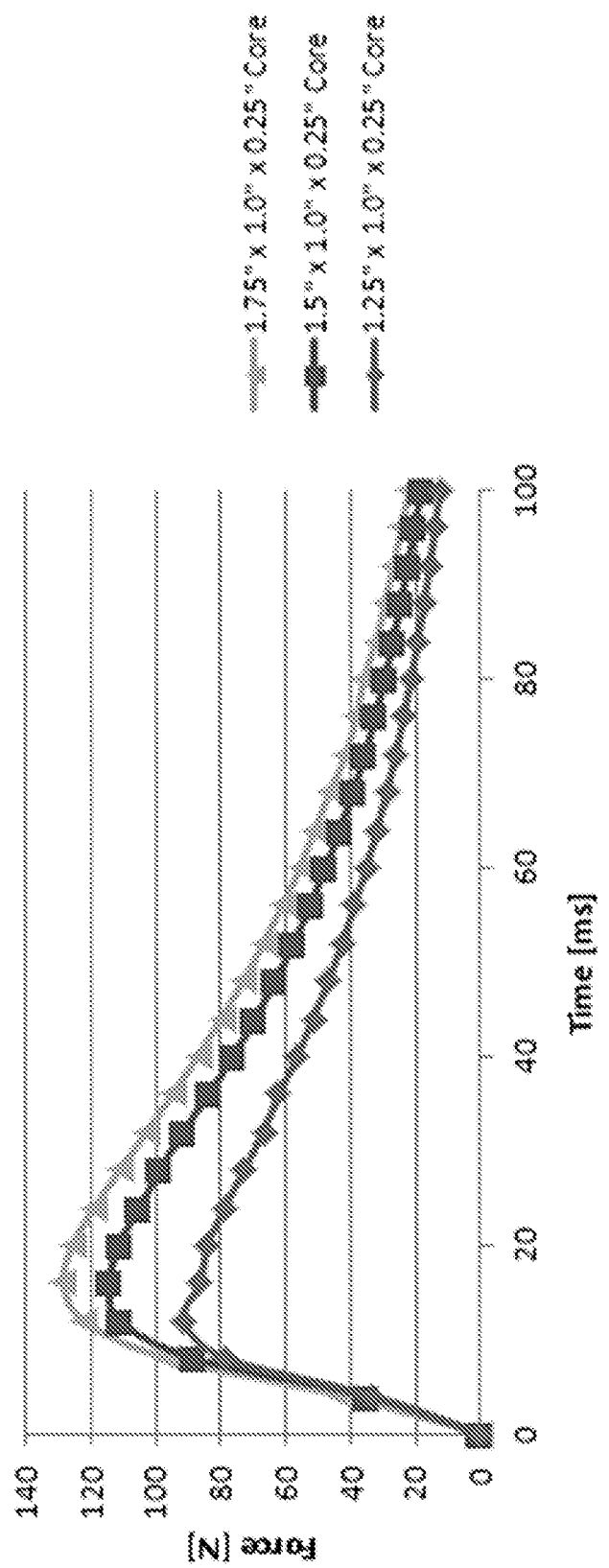
FIG. 54 depicts output from the transient simulation.

FIG. 54 provides output from the simple transient simulation. The three sizes of the selected electromagnet-correlated magnet configurations produced a repel force that had a much faster rise time, far greater peak force, and a faster decay rate than was measured for the simple solenoid configuration. According to the simulation, the largest of the three configuration sizes had a peak repel force of approximately 128 N that decreased to around 20 N over 100 ms, which should be sufficient for detachment of three of the four coded magnet pair implementations described previously and is far greater than a minimum 35 N threshold.

Simulations of the U-shaped electromagnet and correlated magnet pair configuration described above indicated that designs appear to be feasible that can successfully produce enough repel force to cause detachment of a correlated magnet pair coded to meet requirements of the detachment system. Such designs can be implemented in various detailed ways. As such, a large number of design options involving many different variables would need to be assessed as part of a detailed design effort to optimize volume and power requirements to meet more specific system requirements of a particular electromagnet based detachment system. Such variables include correlated magnet pair grade, geometry, and thickness, electromagnet core geometry and size, the spacing between the electromagnet and the top magnet, the number of windings in the coil, voltage, capacitance, resistivity of the wires, and more. Generally, various engineering trade studies could be performed to determine an optimized solution that best meets specific system requirements. For example, the size of the electromagnetic core can be increased or decreased depending on what strength is needed or how much power is allotted to the system. A larger dimension of the electromagnet core would help to mitigate the saturation of the core material. Therefore, if the size of the core was increased, the voltages and currents could be decreased and yet respectable repel forces could be achieved. The simulation results were an exercise to learn what design provided the best repel force for a given area.

As seen in FIG. 52, the repel force varies linearly with the magnetic field strength. This information supports a design decision regarding the electrical power needed to effect a separation for a given hold strength of a magnetic pair. With further optimization, a much more efficient detailed design can be realized. As part of any such detailed design and optimization effort, more relevant tests and measurement regimes that resemble a selected geometry (as opposed to a simple solenoid) would typically be implemented and used to validate simulation results.

Given a successful detailed design, it is expected that the electromagnet based detachment system should be very easy to use. The coded magnetic structure pairs should be easily attached by moving the first magnetic structure downward towards the second magnetic structure at which point they should automatically align and attach. Detachment would only require charging a capacitor, which might be previously charged, and pressing a button to pulse the various electromagnets associated with the magnetic structure pairs to cause them to detach whereby the first magnetic structure would move far enough away from the second magnetic structure so that they remain disengaged.

Although multiple embodiments of the present invention have been illustrated in the accompanying Drawings and described in the foregoing Detailed Description, it should be understood that the present invention is not limited to the disclosed embodiments, but is capable of numerous rearrangements, modifications and substitutions without departing from the invention as set forth and defined by the following claims. It should also be noted that the reference to the "present invention" or "invention" used herein relates to exemplary embodiments and not necessarily to every embodiment that is encompassed by the appended claims.

The invention claimed is:

1. A method for detachment of two objects, said method comprising:

providing a multi-level magnetic system, said multi-level magnetic system comprising a first magnetic structure and a second magnetic structure, said first magnetic structure being associated with a first object, said second magnetic structure being associated with a second object, said multi-level magnetic system producing at least two layers of multi-level magnetism, said at least two layers of multi-level magnetism including an inner attractive layer that transitions to an outer repel layer at a transition distance between said first magnetic structure and said second magnetic structure, said first magnetic structure comprising a plurality of first permanent magnetic field sources, said first magnetic structure being separated from said second magnetic structure by a first distance that is less than said transition distance such that said first magnetic structure is magnetically attached to said second magnetic structure thereby causing attachment of said first object to said second object, said second magnetic structure comprising one or more second permanent magnetic field sources;

associating a bias field source with said multi-level magnetic system, said bias field source being a magnetic field source separate from said plurality of first permanent magnetic field sources and said one or more second permanent magnetic field sources; and using said bias field source to produce a repel force that is added to said at least two layers of multi-level magnetism produced by said multi-level magnetic system, said repel force being large enough to cause said first magnetic structure to separate from said second magnetic structure by a second distance that is greater than said transition distance causing said first magnetic structure to repel said second magnetic structure thereby causing detachment of said first object from said second object.

2. The method of claim 1, wherein said repel force is greater than a peak attract force produced by said first magnetic structure and said second magnetic structure.

3. The method of claim 1, wherein said bias field source comprises an electromagnet.

4. The method of claim 3, wherein said electromagnet comprises a core.

5. The method of claim 1, wherein said bias field source comprises a permanent magnet.

6. The method of claim 1, wherein said bias field source produces a coded bias field.

7. The method of claim 1, further comprising:
providing a spacer between said first magnetic structure and said second magnetic structure.

8. The method of claim 1, wherein the movement of at least one of said first magnetic structure or said second magnetic structure is constrained.

9. The method of claim 1, wherein said plurality of first permanent magnetic field sources have positions and polarities in accordance with a code.

10. The method of claim 9, wherein said code is one of a pseudorandom code, a deterministic code, or a designed code.

11. The method of claim 9, wherein said code is one of a one dimensional code and a two dimensional code.

12. The method of claim 1, wherein said first second magnetic structure is a conventional dipole permanent magnet.

13. The method of claim 1, wherein said second magnetic structure comprises a plurality of second permanent magnetic field sources.

14. The method of claim 13, wherein said plurality of second permanent magnetic field sources have positions and polarities in accordance with a code.

15. The method of claim 14, wherein said code is one of a pseudorandom code, a deterministic code, or a designed code.

16. The method of claim 14, wherein said code is one of a one dimensional code and a two dimensional code.

17. The method of claim 14, wherein said first magnetic structure and said second magnetic structure have a spatial force function that includes at least one attractive spatial force and at least one repellant spatial force.

18. The method of claim 1, further comprising:
disassociating said bias field source from said multi-level magnetic system.

* * * * *